United States Patent
Erskine

(10) Patent No.: US 12,439,126 B2
(45) Date of Patent: *Oct. 7, 2025

(54) AUTOMATICALLY PAYING A RECIPIENT BY PRESENTING PRIVATELY FILTERED CONTENT COMBINED WITH A PUBLIC BROADCAST

(71) Applicant: Timothy Joseph Erskine, Sister Bay, WI (US)

(72) Inventor: Timothy Joseph Erskine, Sister Bay, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/571,459

(22) Filed: Sep. 16, 2019

(65) Prior Publication Data

US 2020/0029128 A1 Jan. 23, 2020

Related U.S. Application Data

(63) Continuation of application No. PCT/US2018/022646, filed on Mar. 15, 2018.

(Continued)

(51) Int. Cl.
*H04N 21/234* (2011.01)
*H04N 21/2343* (2011.01)
*H04N 21/2543* (2011.01)
*H04N 21/2547* (2011.01)
*H04N 21/258* (2011.01)
*H04N 21/2662* (2011.01)
*H04N 21/2668* (2011.01)
*H04N 21/431* (2011.01)

(Continued)

(52) U.S. Cl.
CPC ... *H04N 21/4784* (2013.01); *H04N 21/25866* (2013.01); *H04N 21/2668* (2013.01); *H04N 21/4318* (2013.01); *H04N 21/812* (2013.01)

(58) Field of Classification Search
CPC .............................. H04N 21/812; G06Q 30/02
See application file for complete search history.

(56) References Cited

U.S. PATENT DOCUMENTS

2010/0319020 A1* 12/2010 Yuen ................... H04N 21/4316
725/32
2012/0109755 A1* 5/2012 Birch ................. G06Q 30/0269
705/14.66

(Continued)

*Primary Examiner* — Brian T Pendleton
*Assistant Examiner* — Jean D Saint Cyr
(74) *Attorney, Agent, or Firm* — Hoffman Warnick LLC

(57) ABSTRACT

A system and method including a plurality of device controllers, wherein each device controller is connectable to a network and is configured to integrate with a hardware device adapted to output an AV (audio and/or video) content item, and wherein each device controller includes a system for generating response data that chronologically relates a user input to the AV content item, including an interface associated with each device controller for receiving the user input collected from a user while the AV content item is being outputted. A computing system in communication with the plurality of device controllers including a process for grouping chronologically related response data received from a subset of device controllers, and a process for detecting an AV event, and in response to detecting the AV event, transmitting a detected event indicator to each of the plurality of device controllers is further disclosed.

22 Claims, 38 Drawing Sheets

Related U.S. Application Data

(60) Provisional application No. 62/472,118, filed on Mar. 16, 2017.

(51) Int. Cl.
*H04N 21/442* (2011.01)
*H04N 21/475* (2011.01)
*H04N 21/478* (2011.01)
*H04N 21/4784* (2011.01)
*H04N 21/81* (2011.01)

(56) References Cited

U.S. PATENT DOCUMENTS

| | | | |
|---|---|---|---|
| 2013/0243248 A1* | 9/2013 | Vonolfen | H04N 5/2224 382/103 |
| 2014/0223475 A1* | 8/2014 | Mcintire | G11B 27/036 725/34 |
| 2015/0352450 A1* | 12/2015 | Burrows | A63F 13/338 463/31 |
| 2018/0005447 A1* | 1/2018 | Wallner | G06T 15/04 |

* cited by examiner

FIG. 1 GUIDE TO FIGURES

AD QUEUING

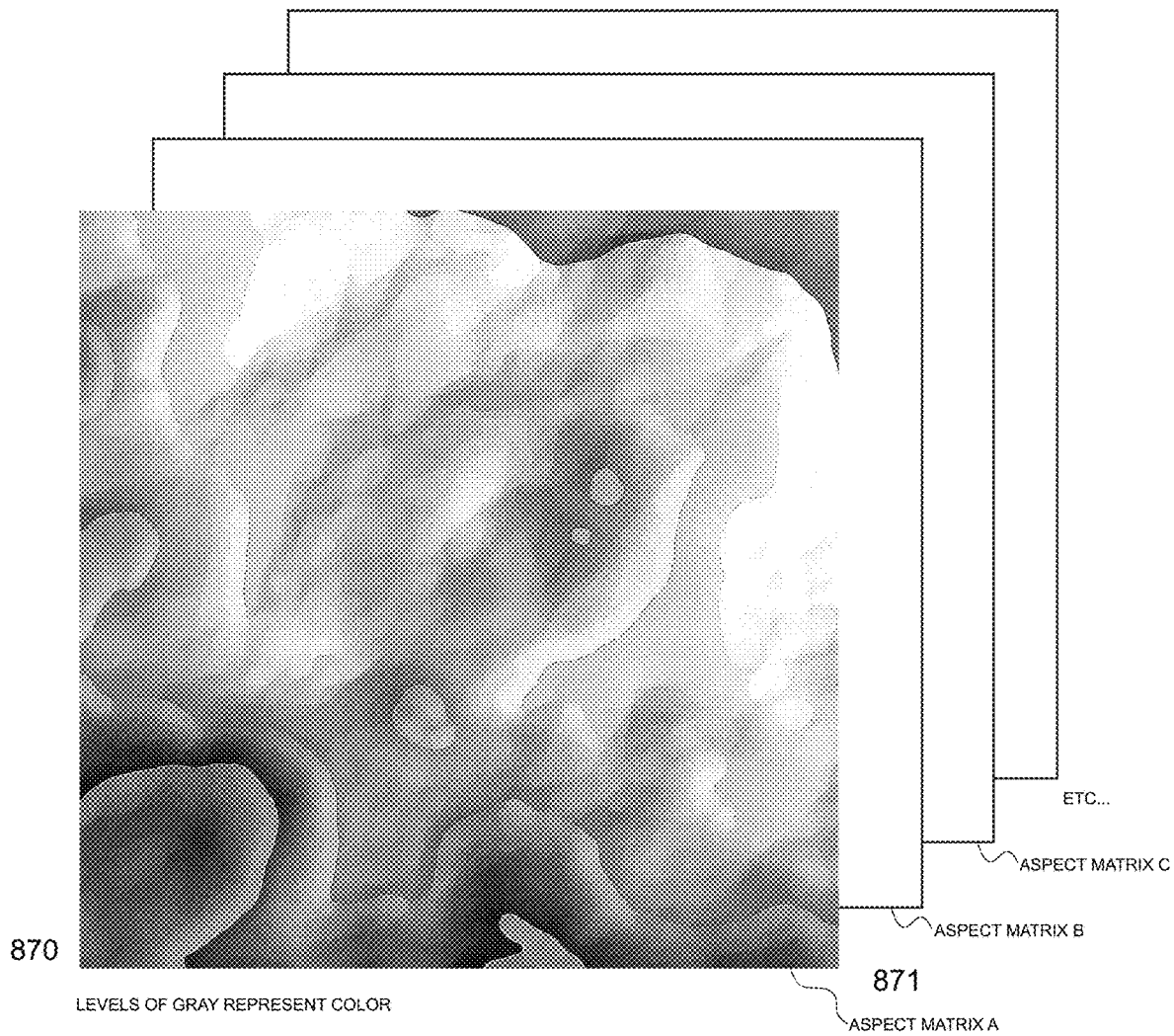
FIG. 5    PROFILE FINGERPRINT IMAGE

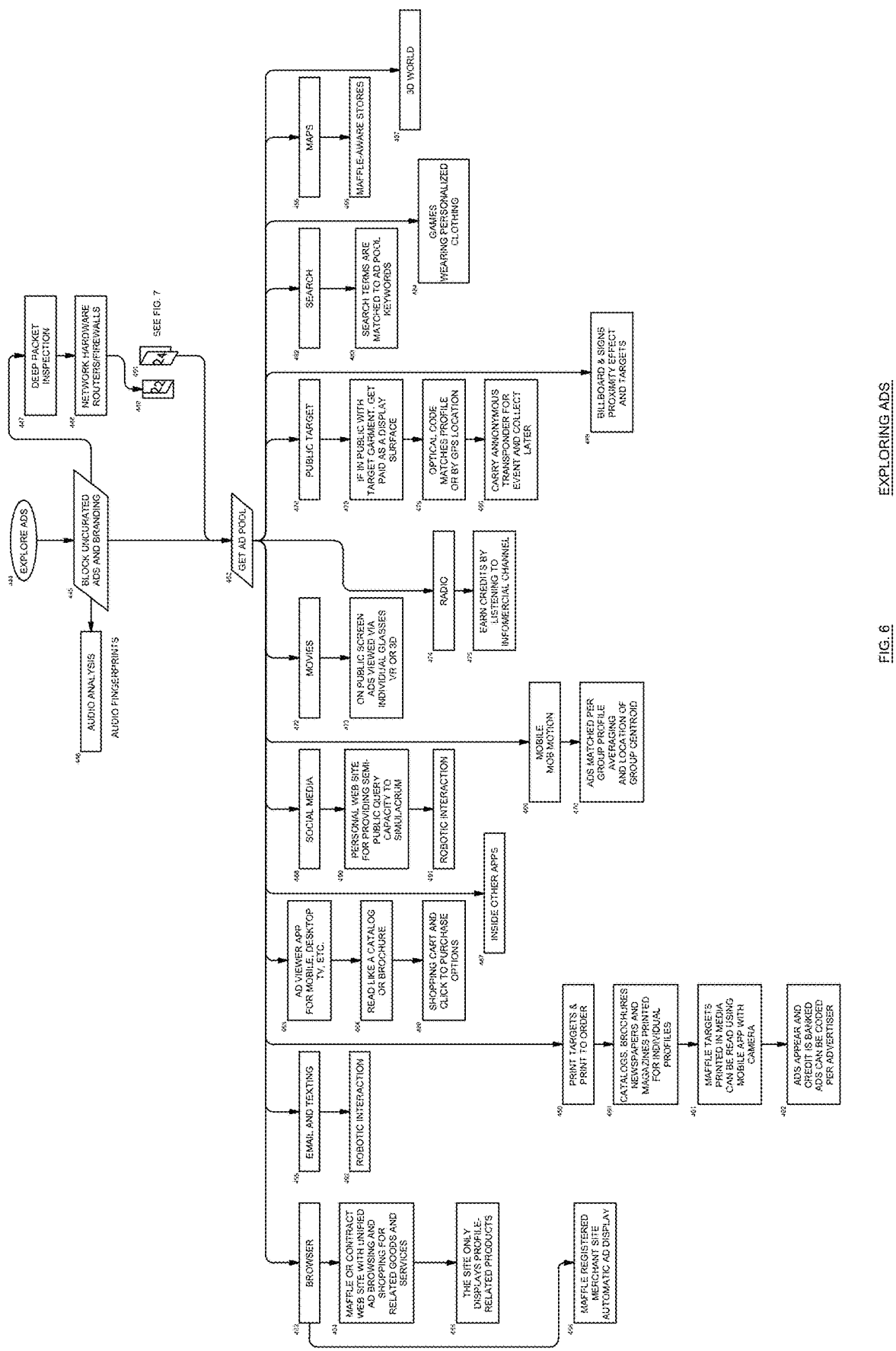
FIG. 6    EXPLORING ADS

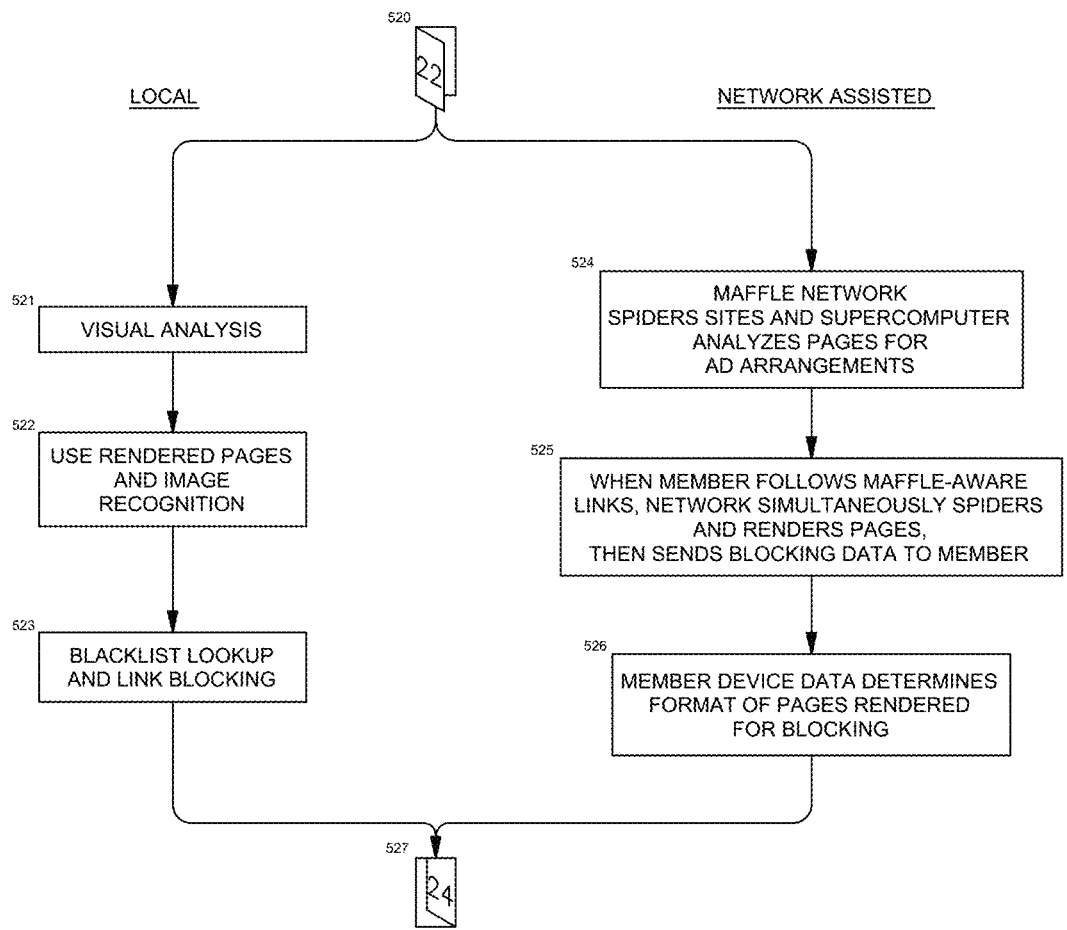
FIG. 7   BLOCKING ADS
*NEXT REF NUMBERS START AT 534

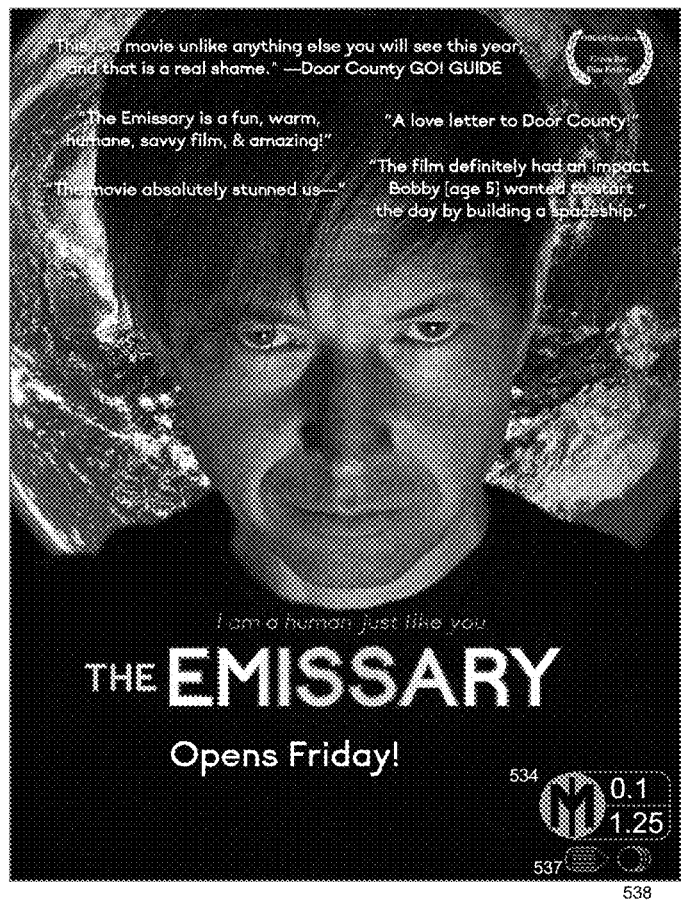
FIG. 8          AD PAYMENT MEDALLION
*NEXT REF NUMBERS START AT 544

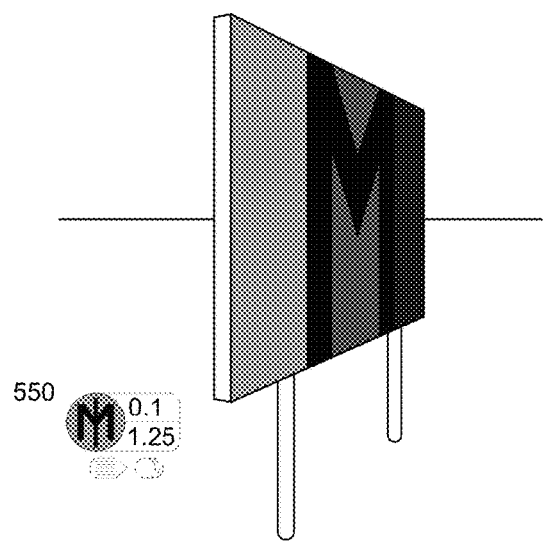
FIG. 10  BILLBOARD TARGET
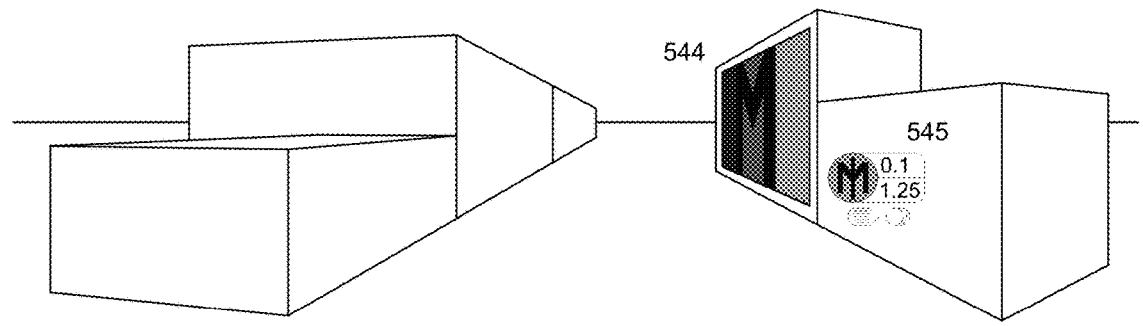
FIG. 9  TARGET IN 3D VIRTUAL SPACE

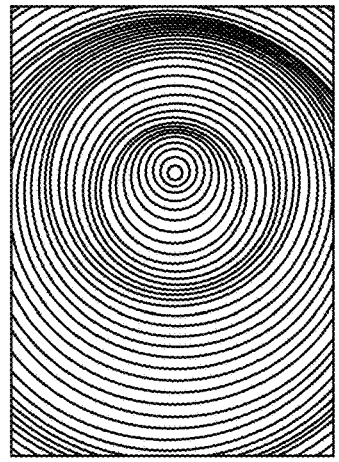
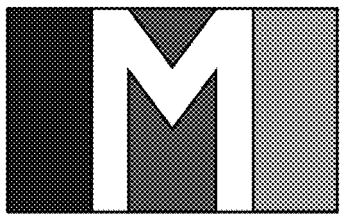
FIG. 11     TARGETS FOR PRINT

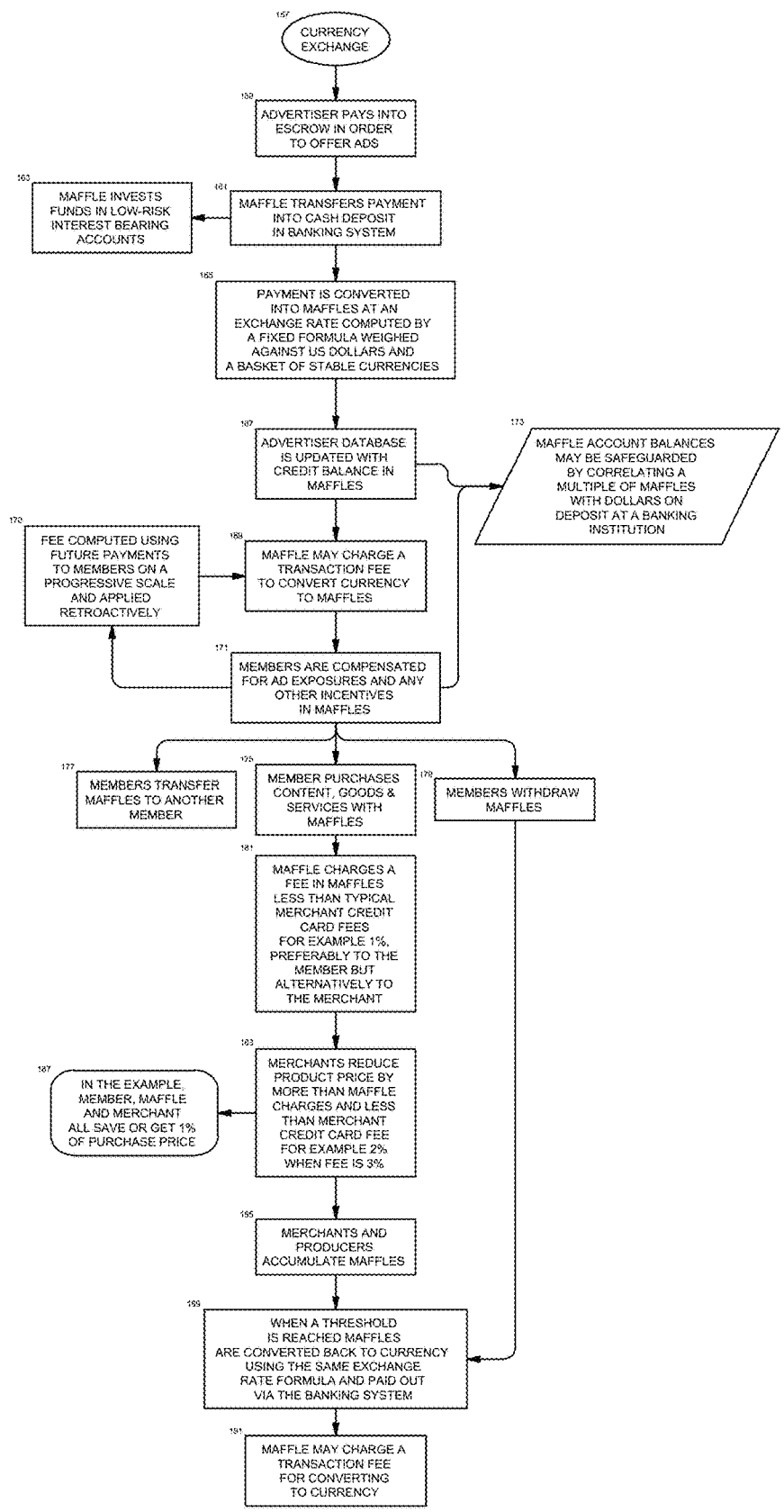
FIG. 12     CURRENCY EXCHANGE AND AD AUTHORS BUYING MAFFLES

FIG. 14  PURCHASE VIA AD CONSUMPTION

BROADCAST STREAM REPLACEMENTS

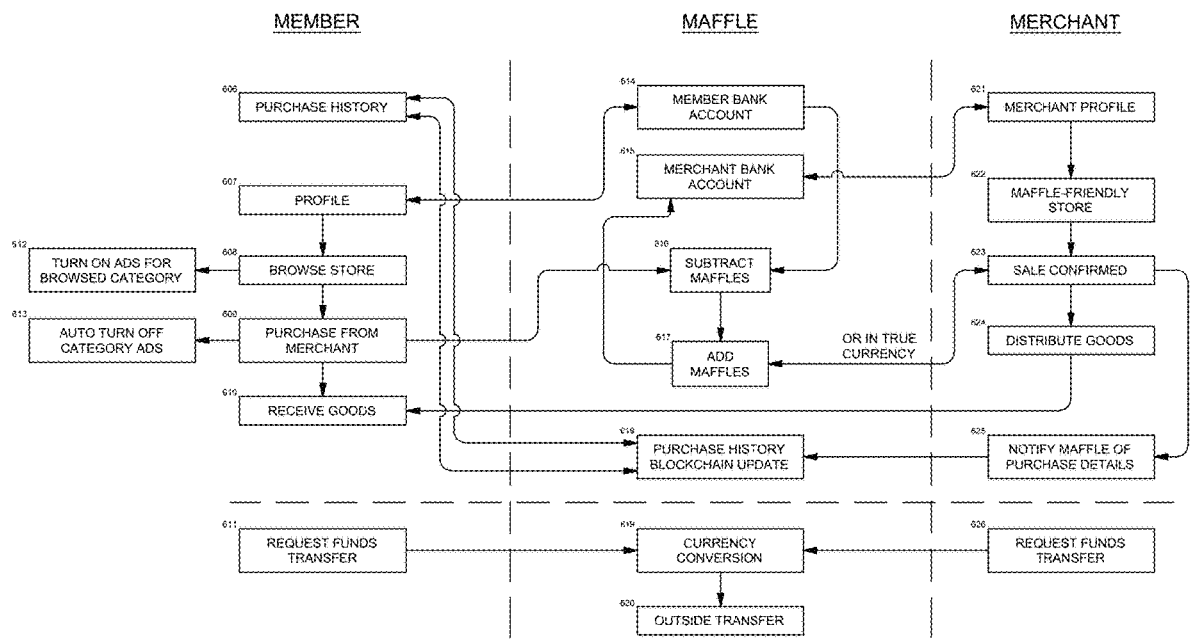
FIG. 16      BUYING GOODS & SERVICES
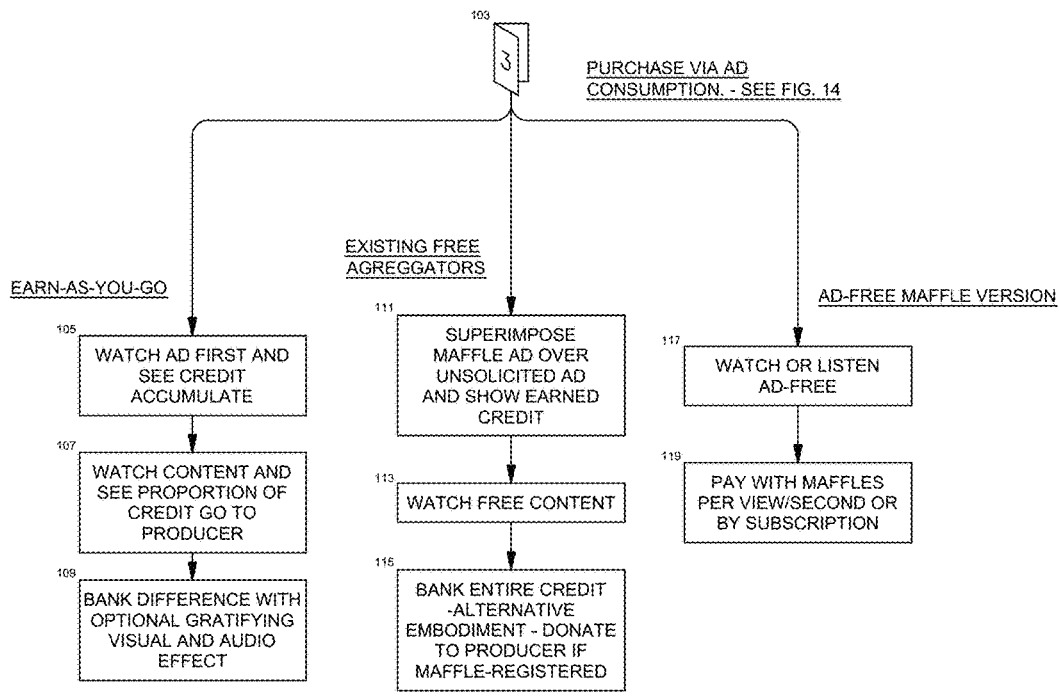
FIG. 17      DIRECT STREAMING

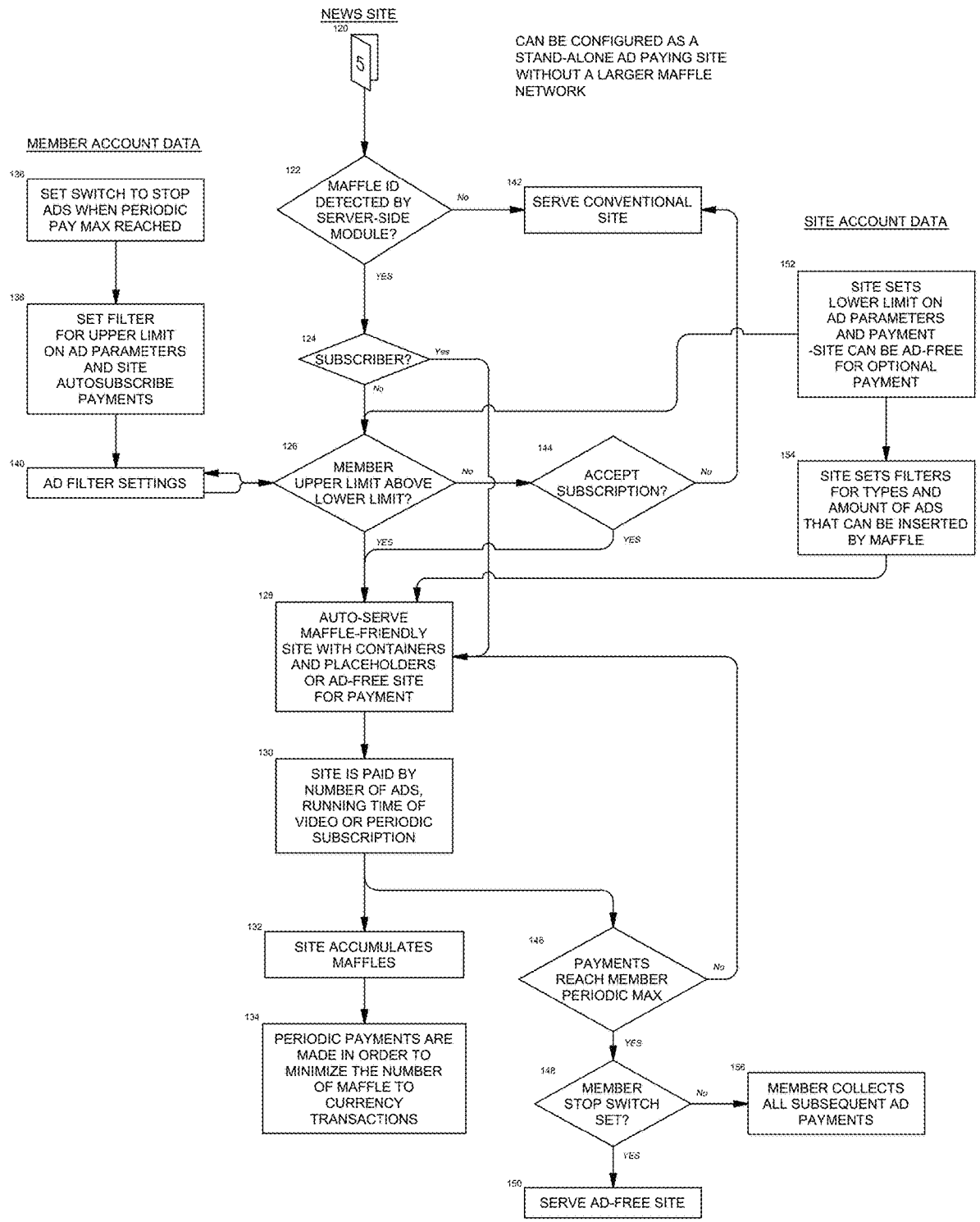
FIG. 18     DIGITAL NEWS SITE

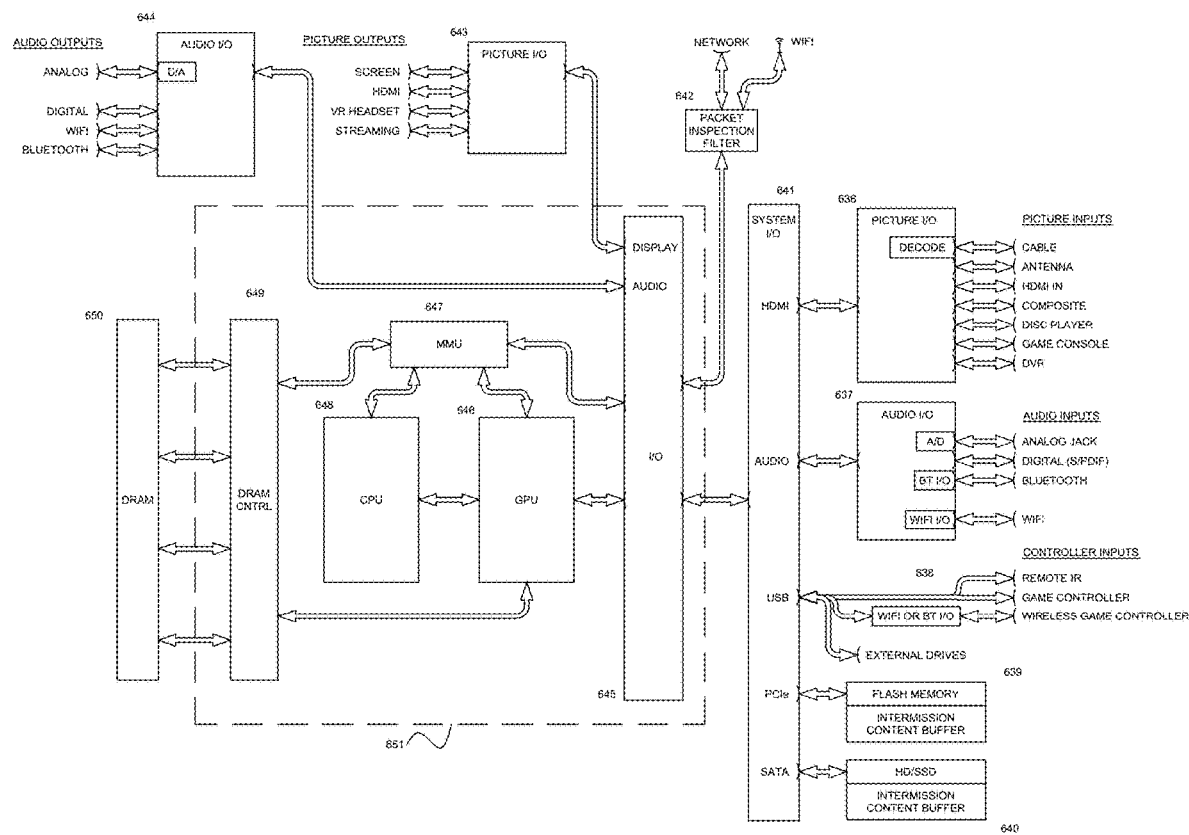
FIG. 19     TV BLOCK DIAGRAM

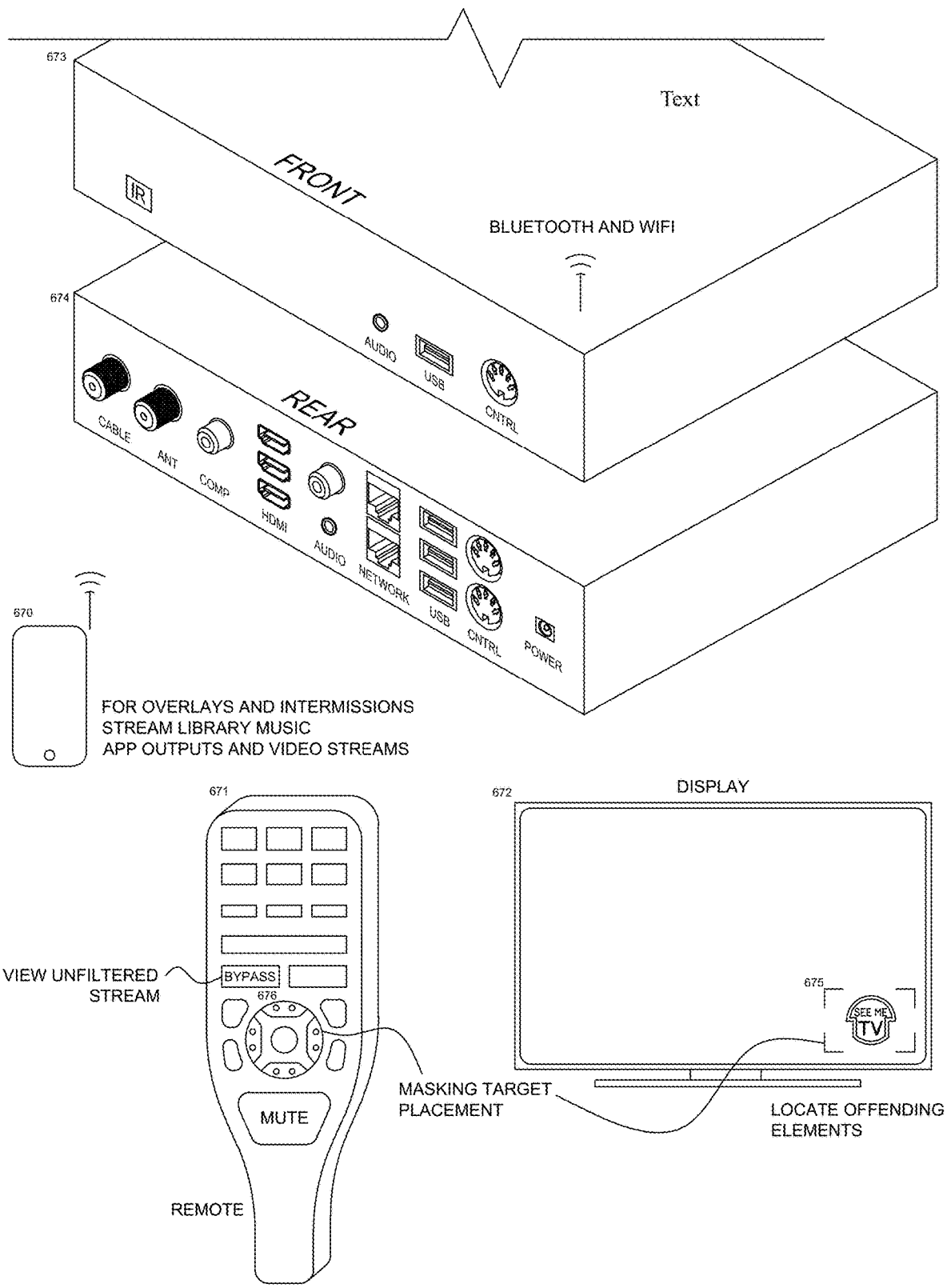
FIG. 20  TV COMPONENTS

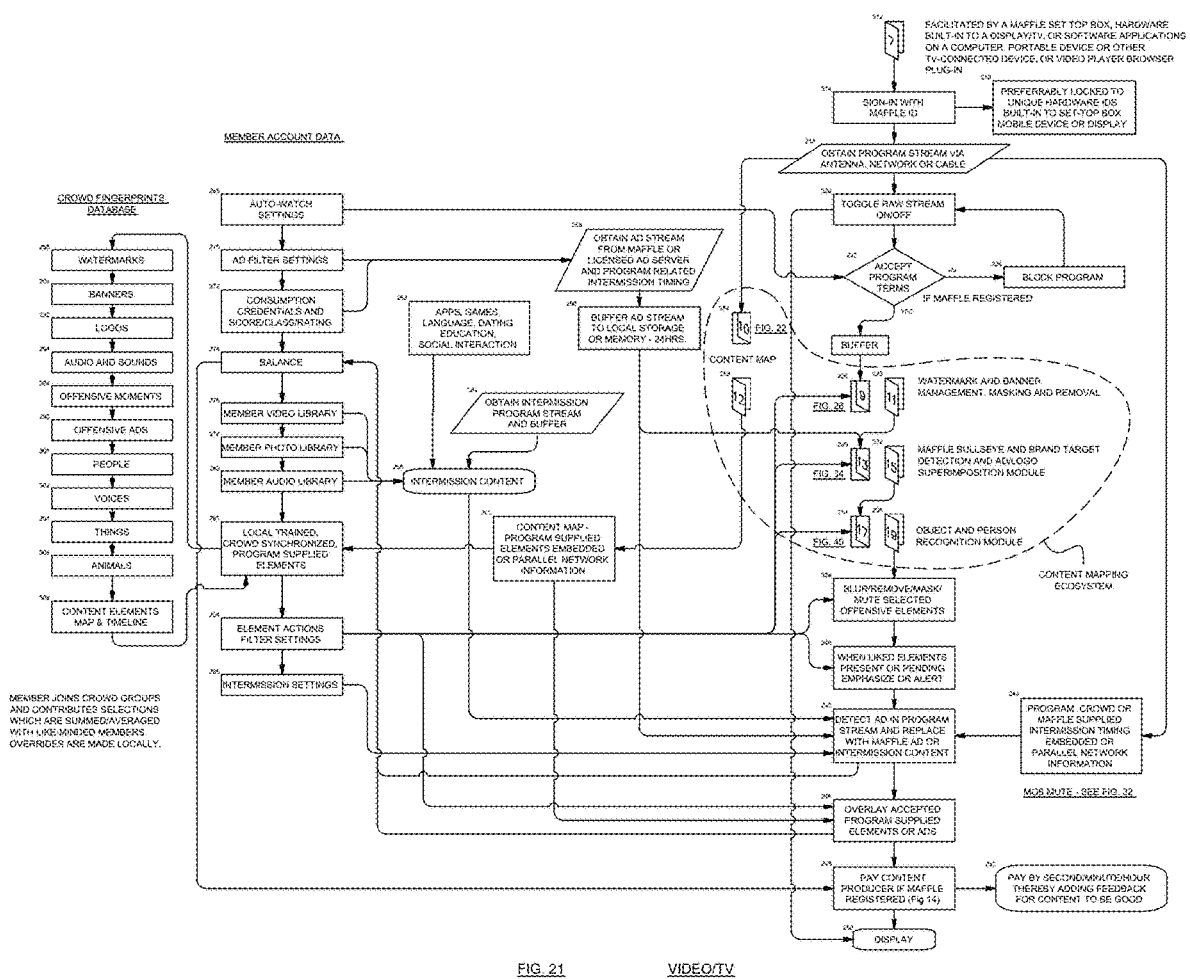
FIG. 21 VIDEO/TV

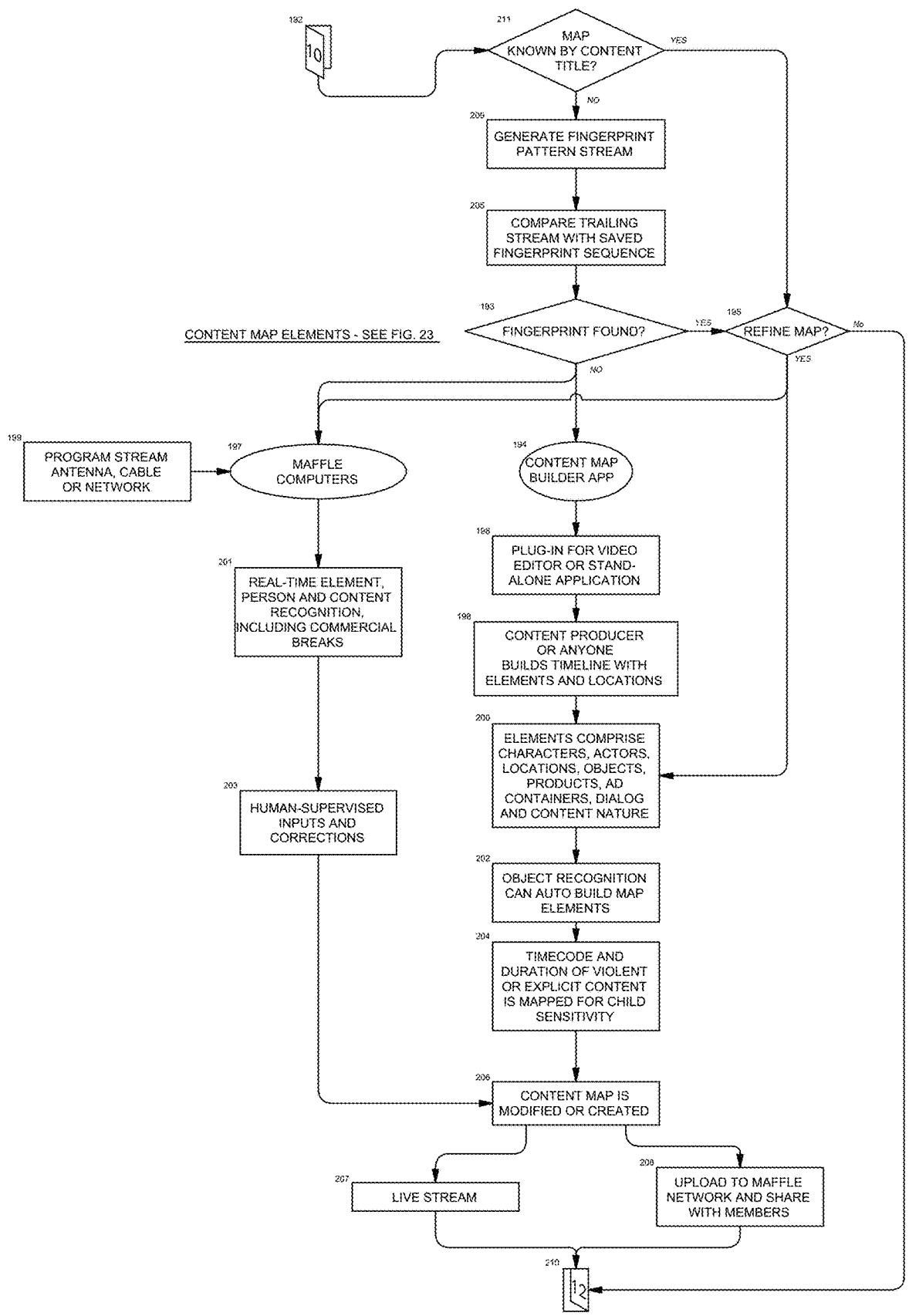
FIG. 22     GENERATING A CONTENT MAP

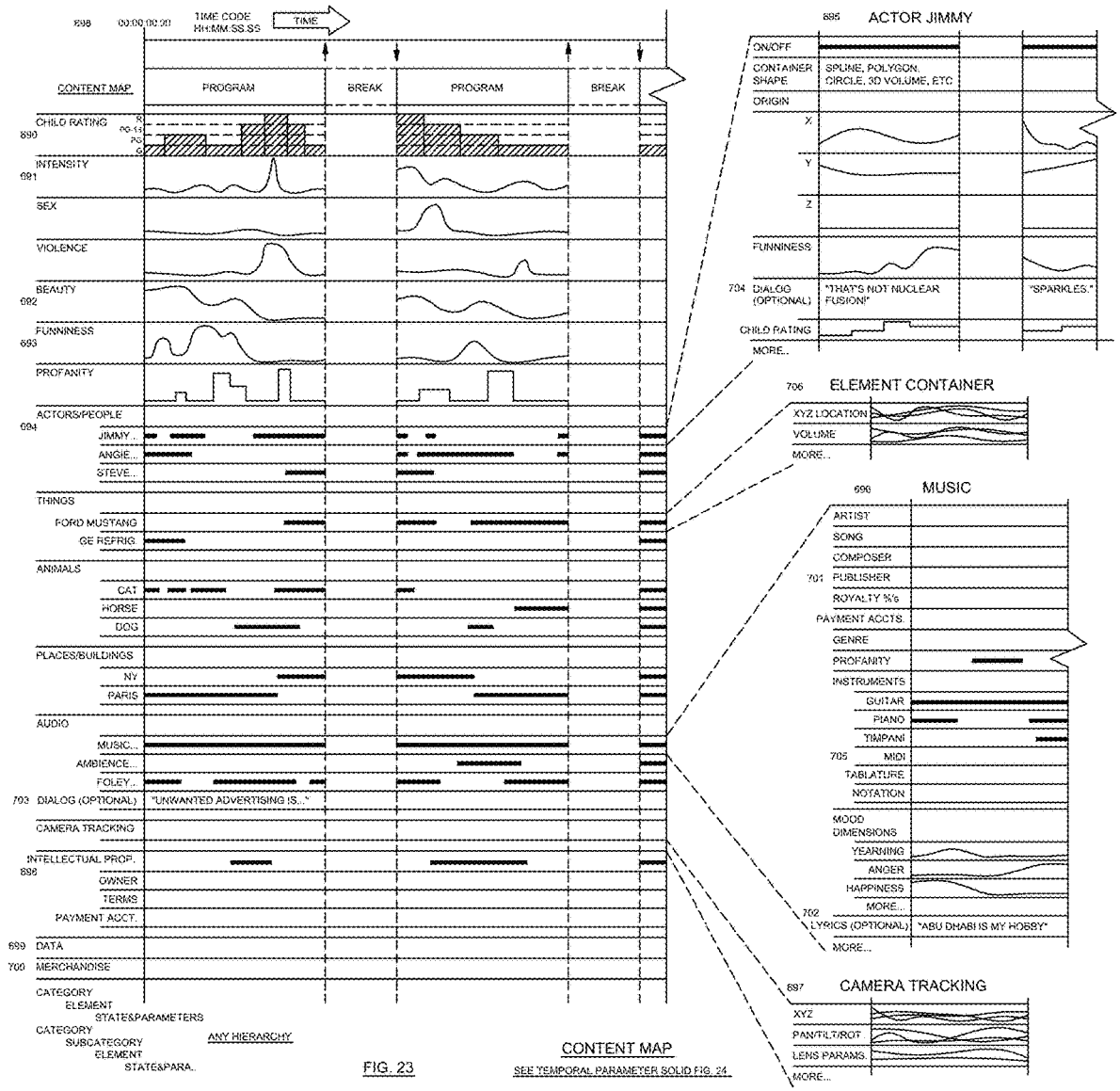

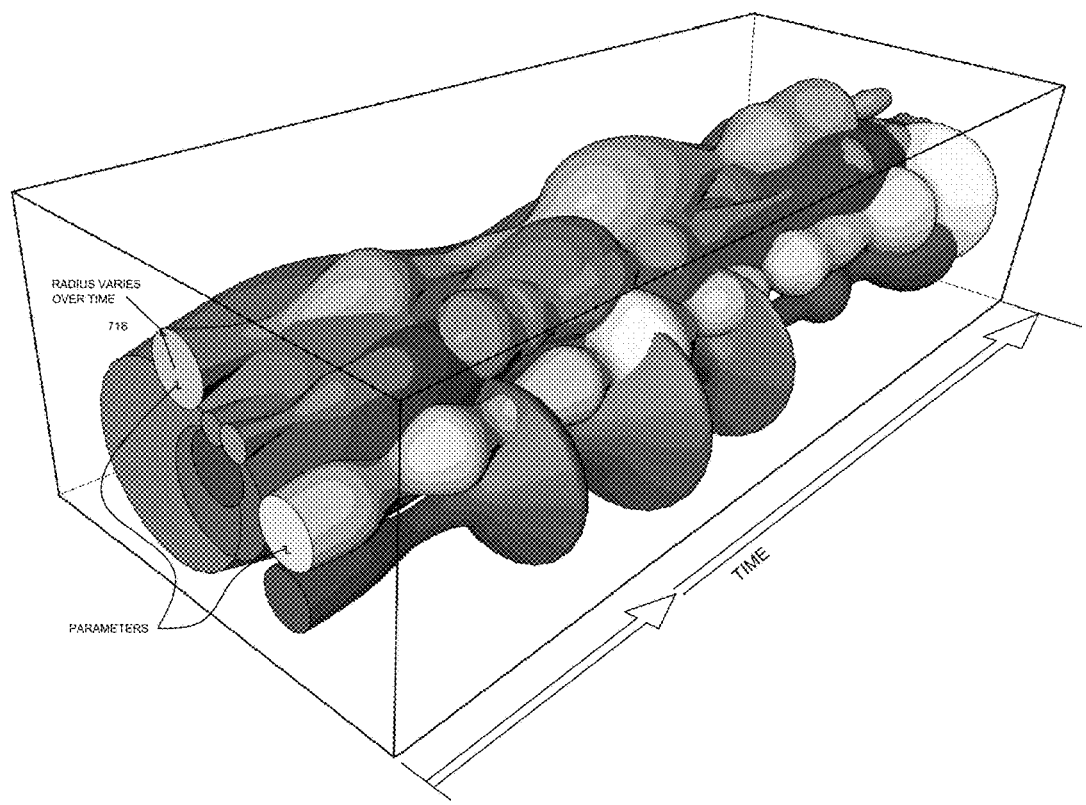
FIG. 24  TEMPORAL PARAMETER SOLID
SEE SECTION VIEW FIG. 25
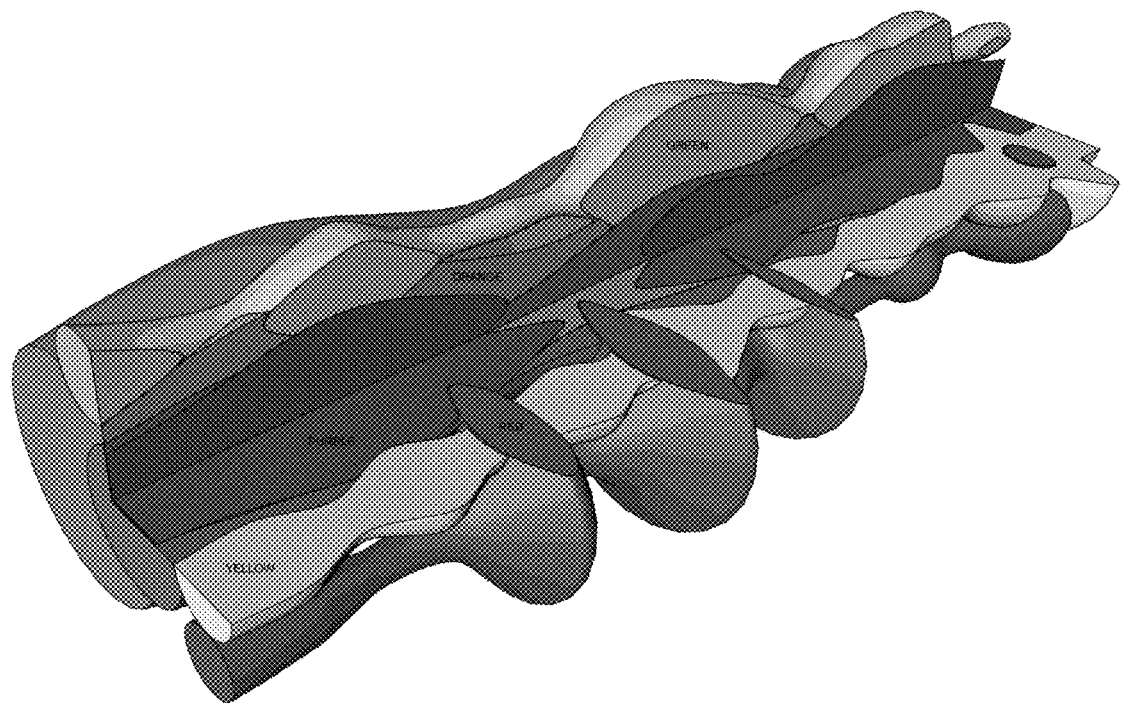
FIG. 25  TEMPORAL PARAMETER SECTION

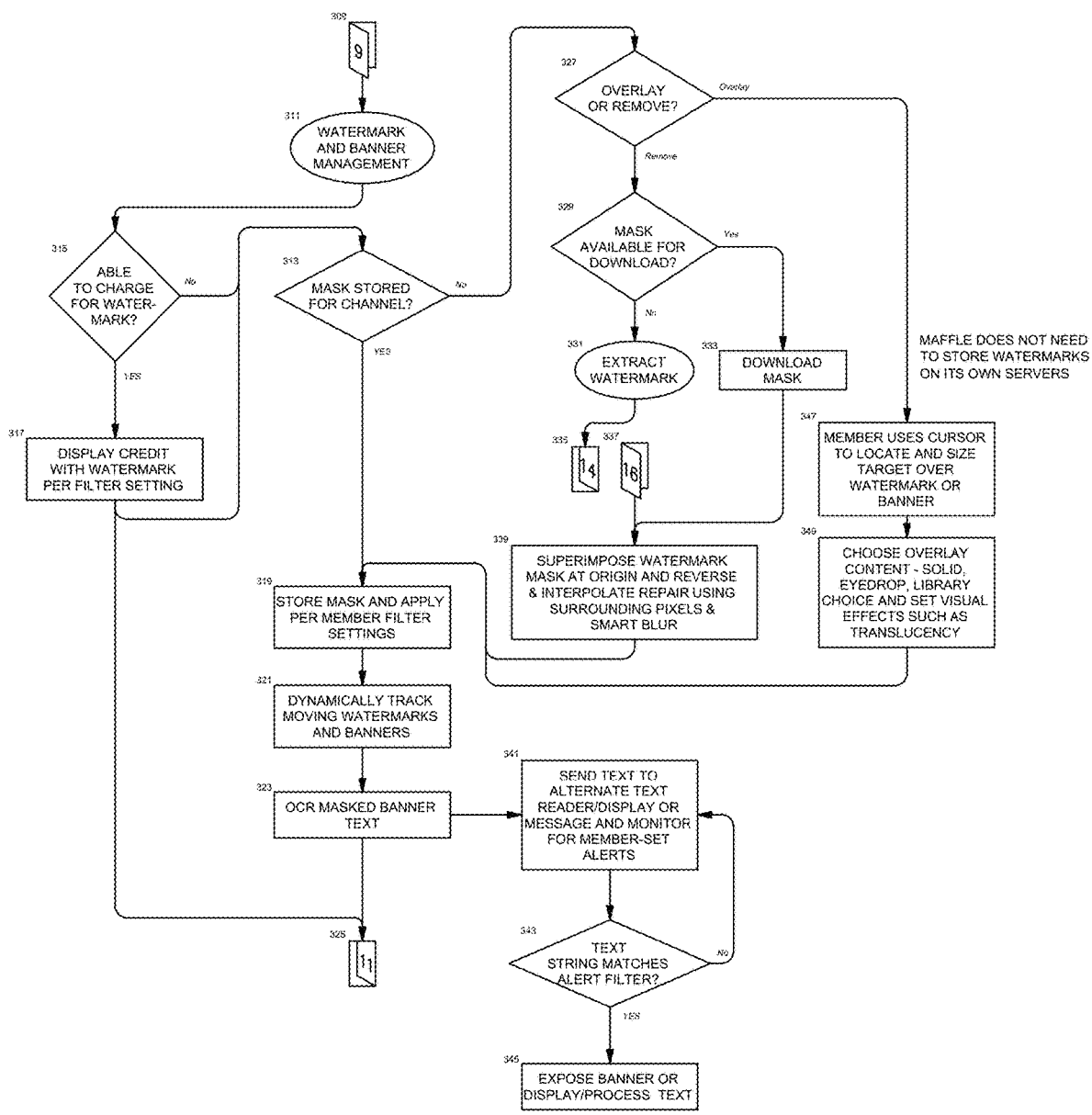
FIG. 26    WATERMARK AND BANNER MANAGEMENT

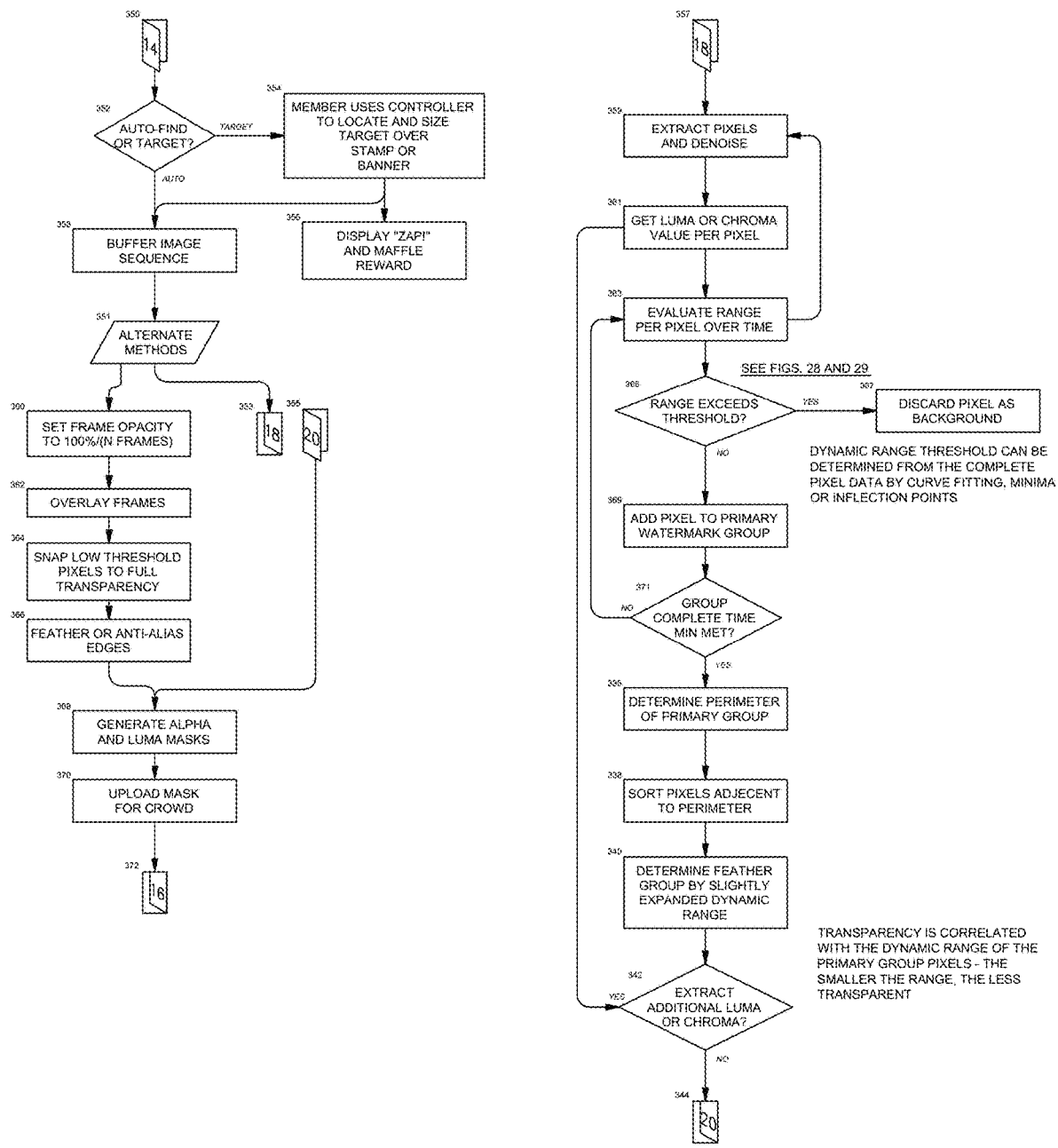
FIG. 27     WATERMARK EXTRACTION

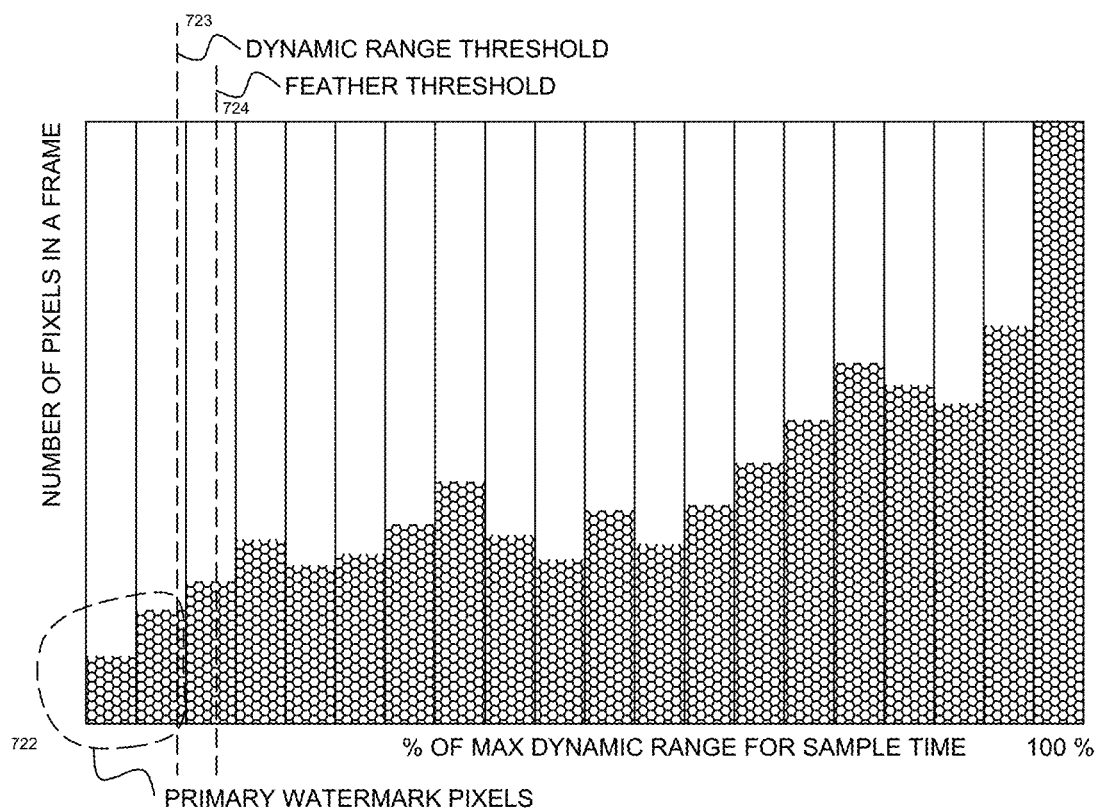
FIG. 28  DYNAMIC RANGE HISTOGRAM

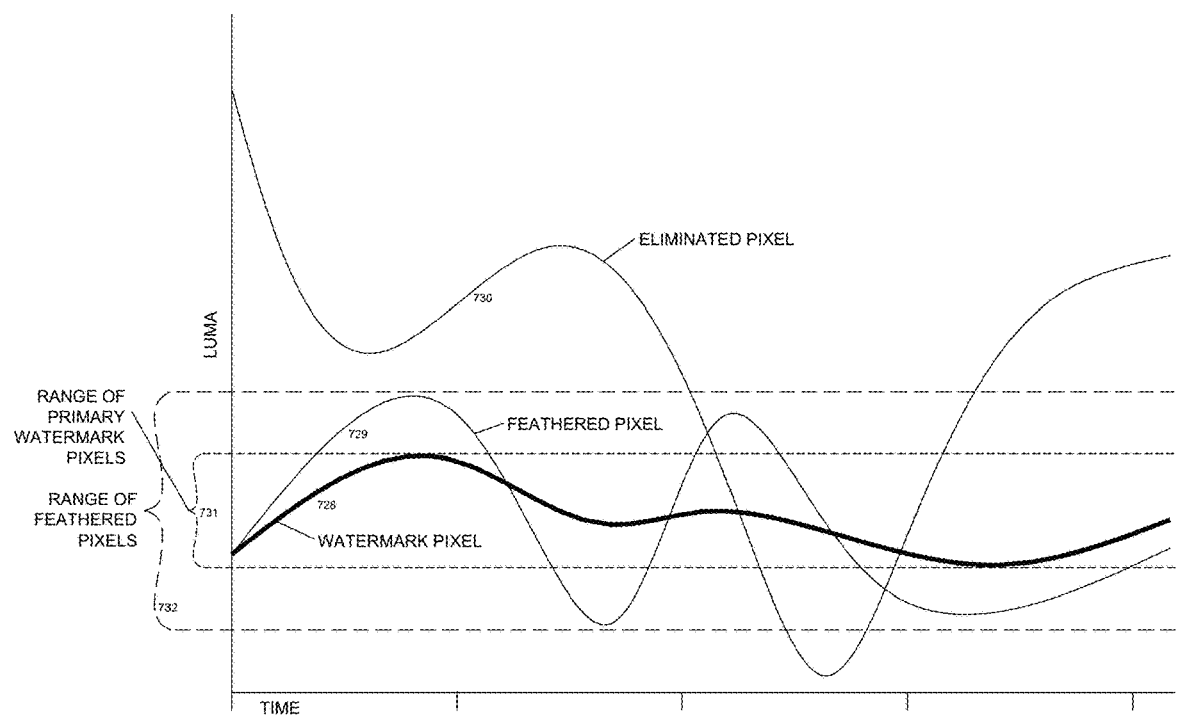
FIG. 29 — DYNAMIC RANGE PIXEL ELIMINATION
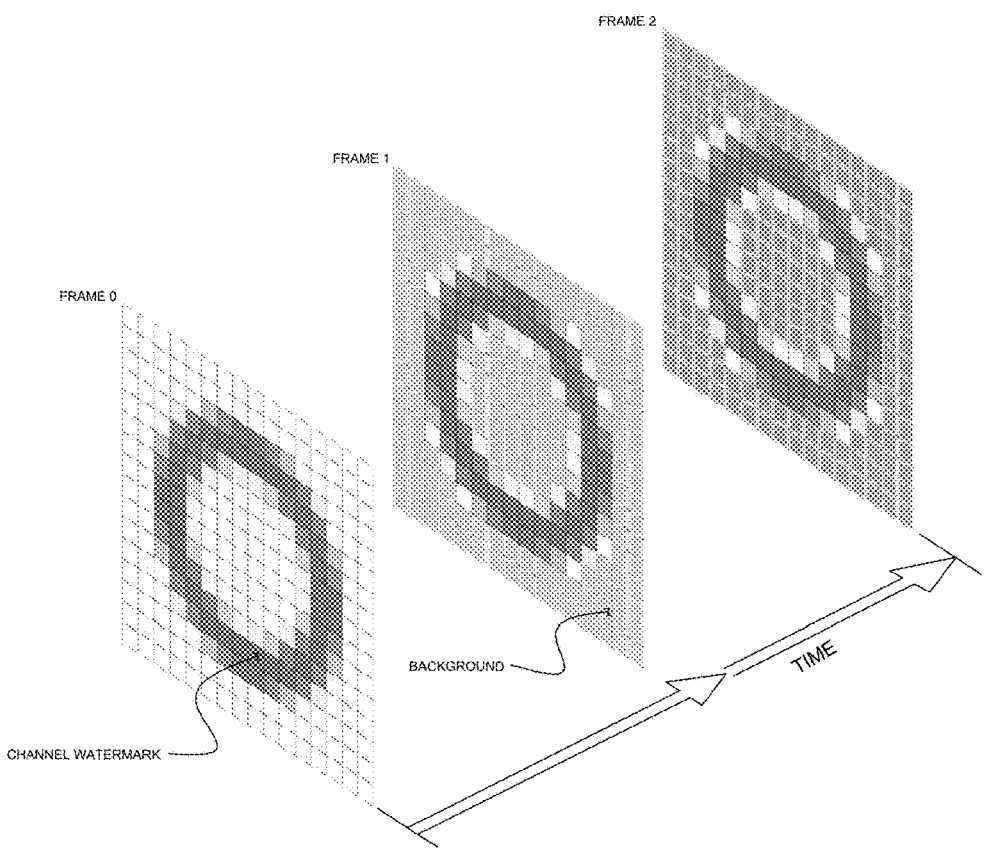
FIG. 30 — CHANNEL WATERMARK EXTRACTION

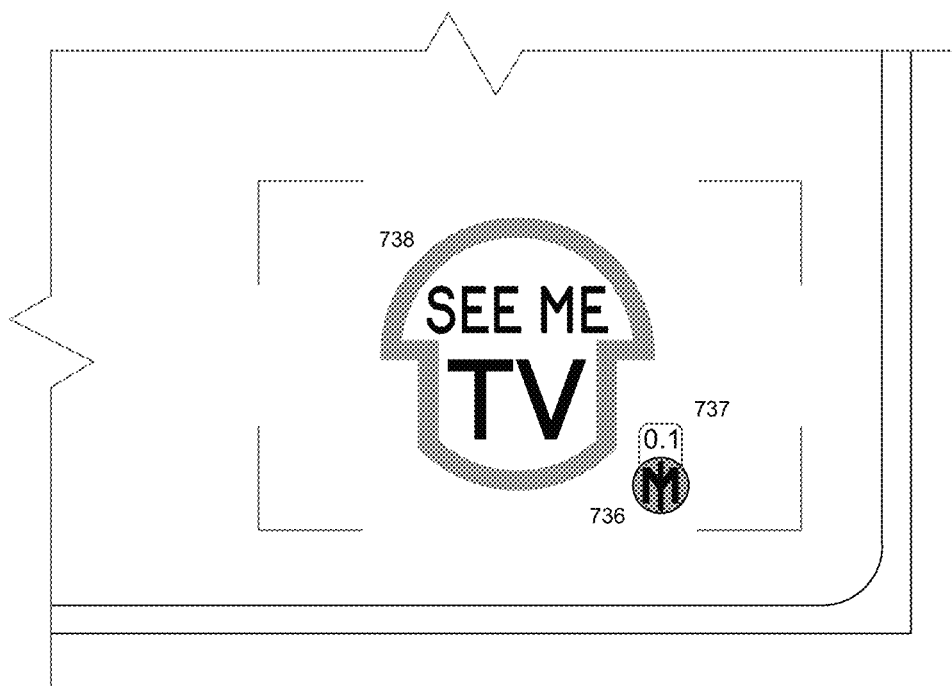
FIG. 31   MAFFLE WATERMARK COMPENSATION INDICATOR

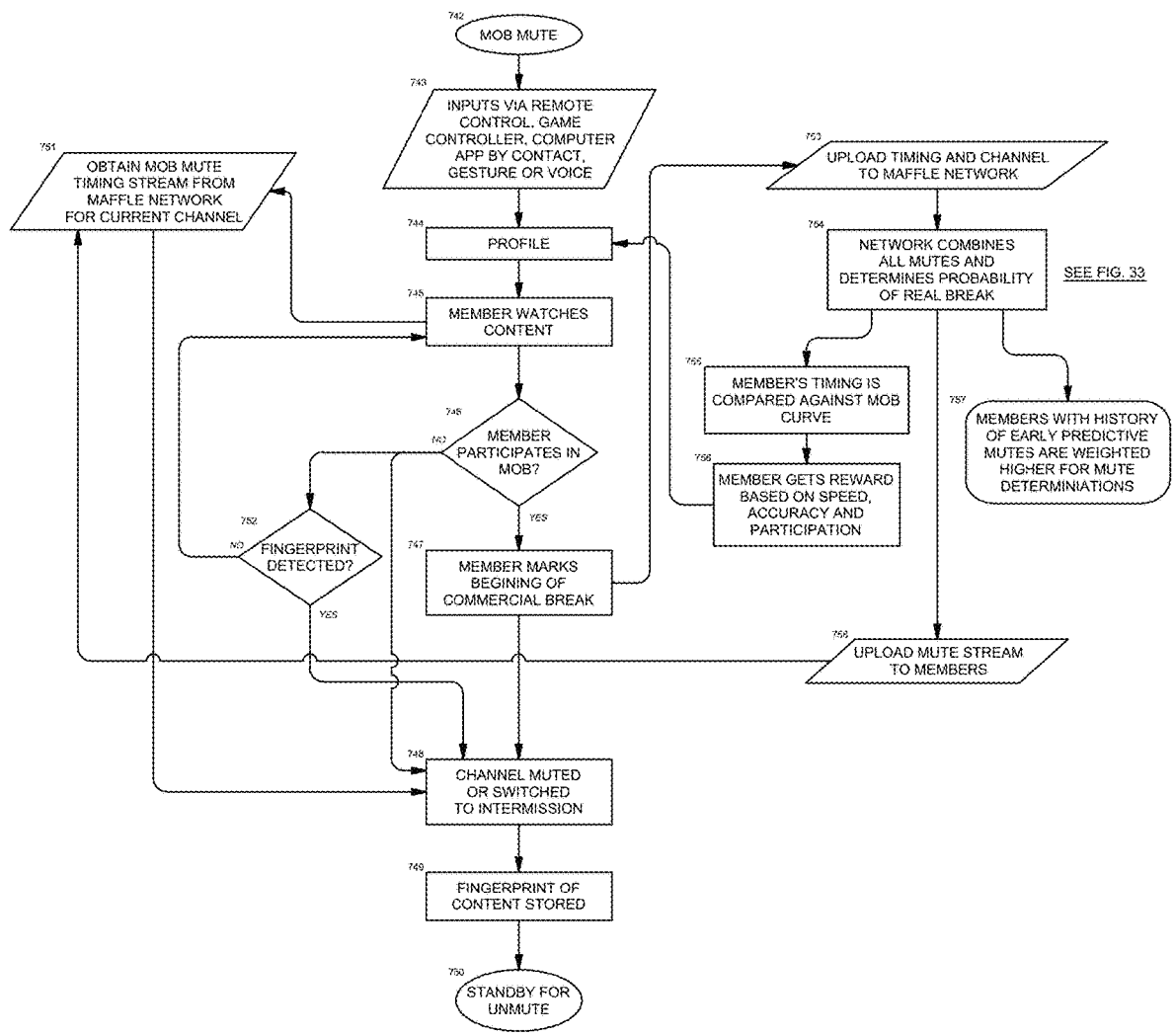
FIG. 32    MOB MUTE
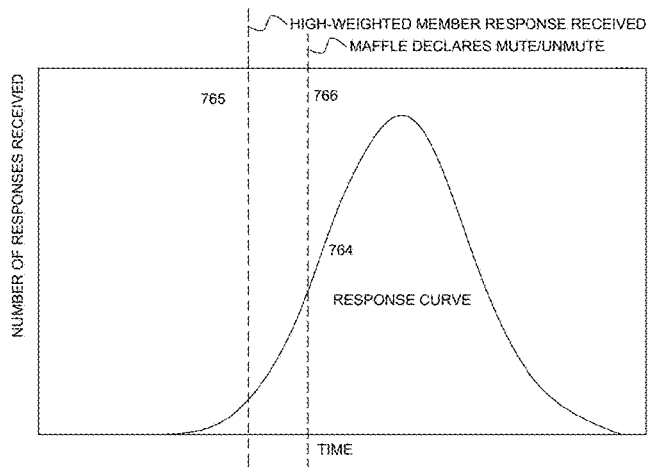
FIG. 33    MUTE/UNMUTE RESPONSE CURVE

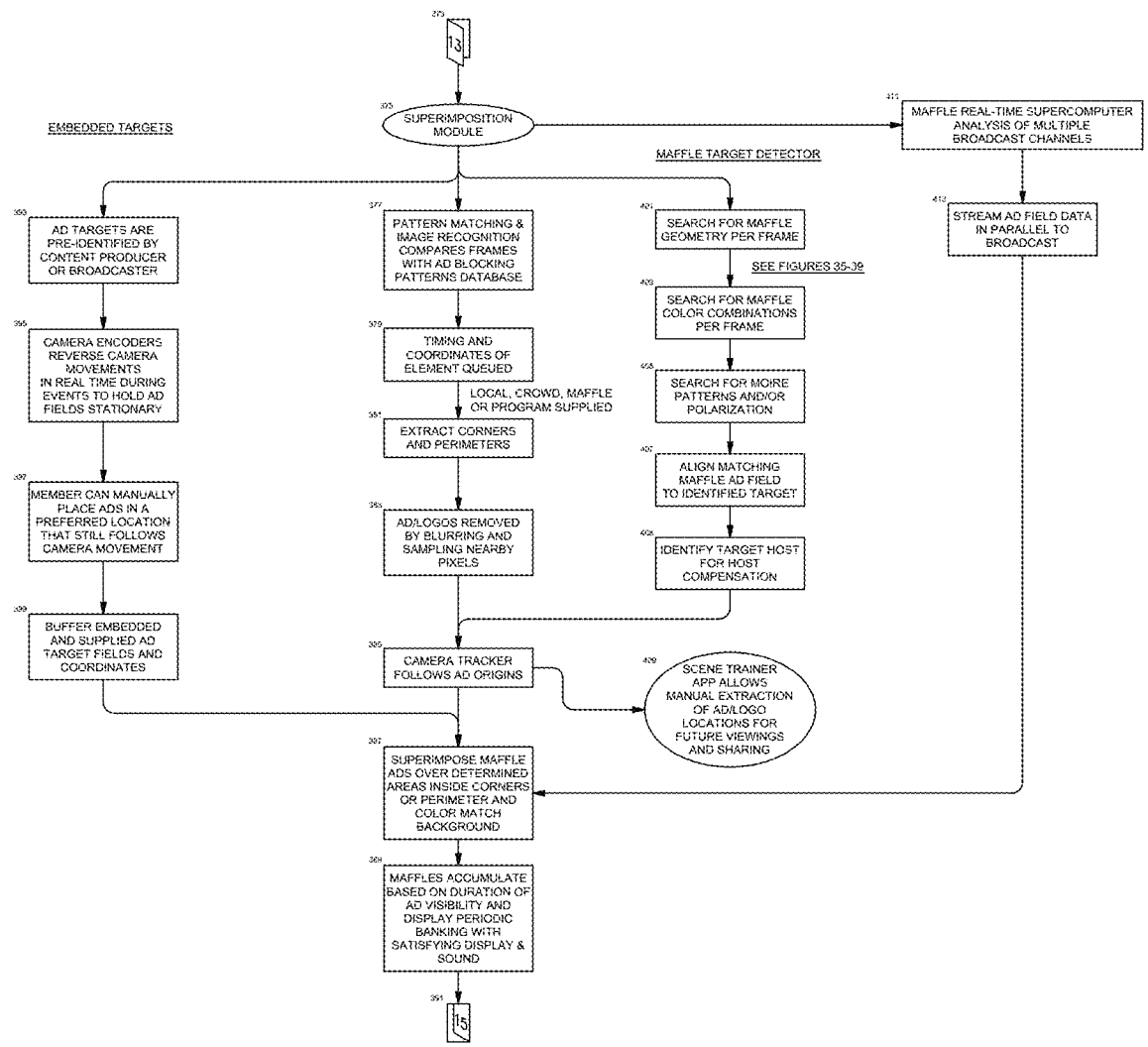
FIG. 34     SUPERIMPOSITION TECHNOLOGY

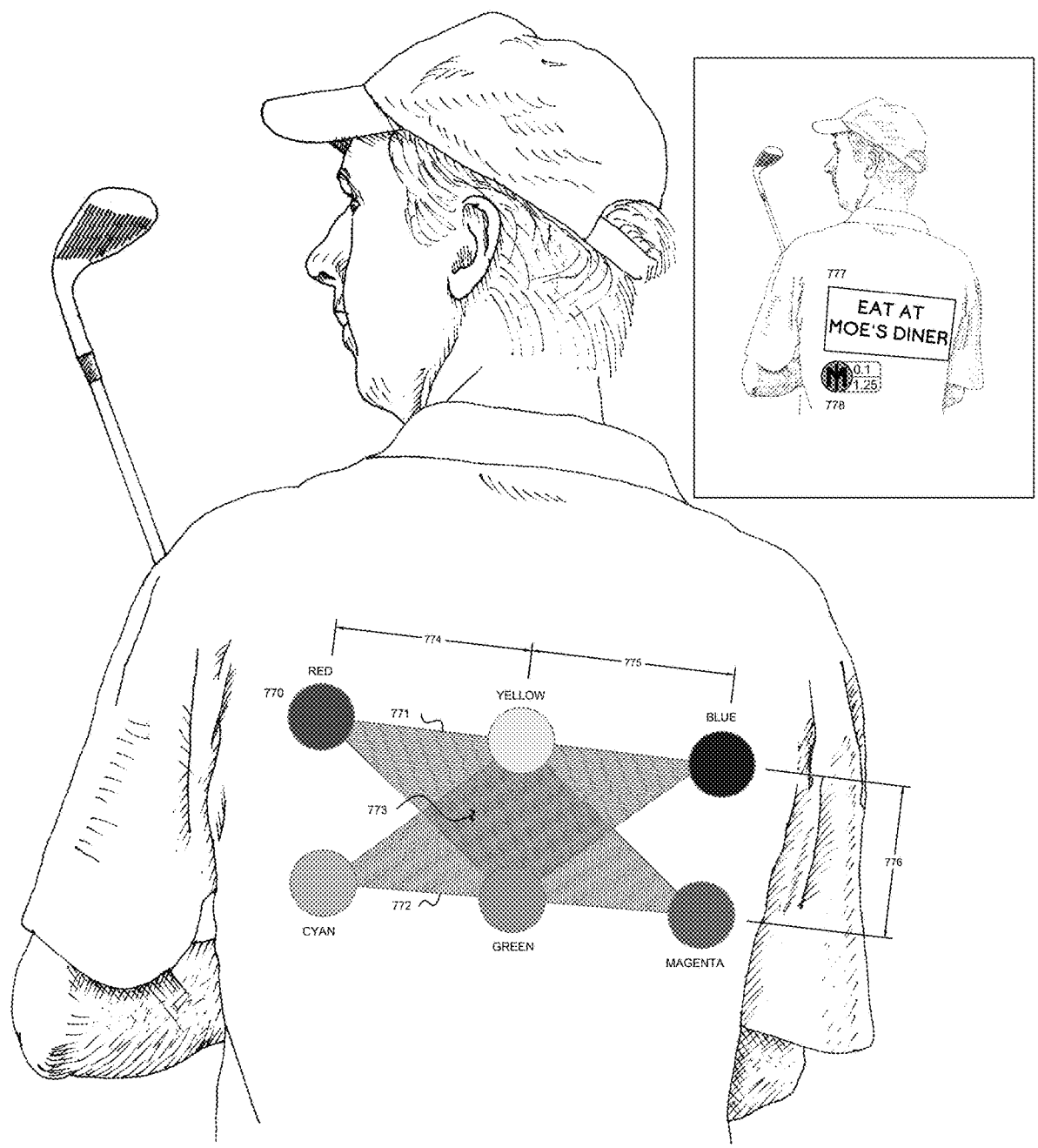
FIG. 35      WEARABLE TARGET

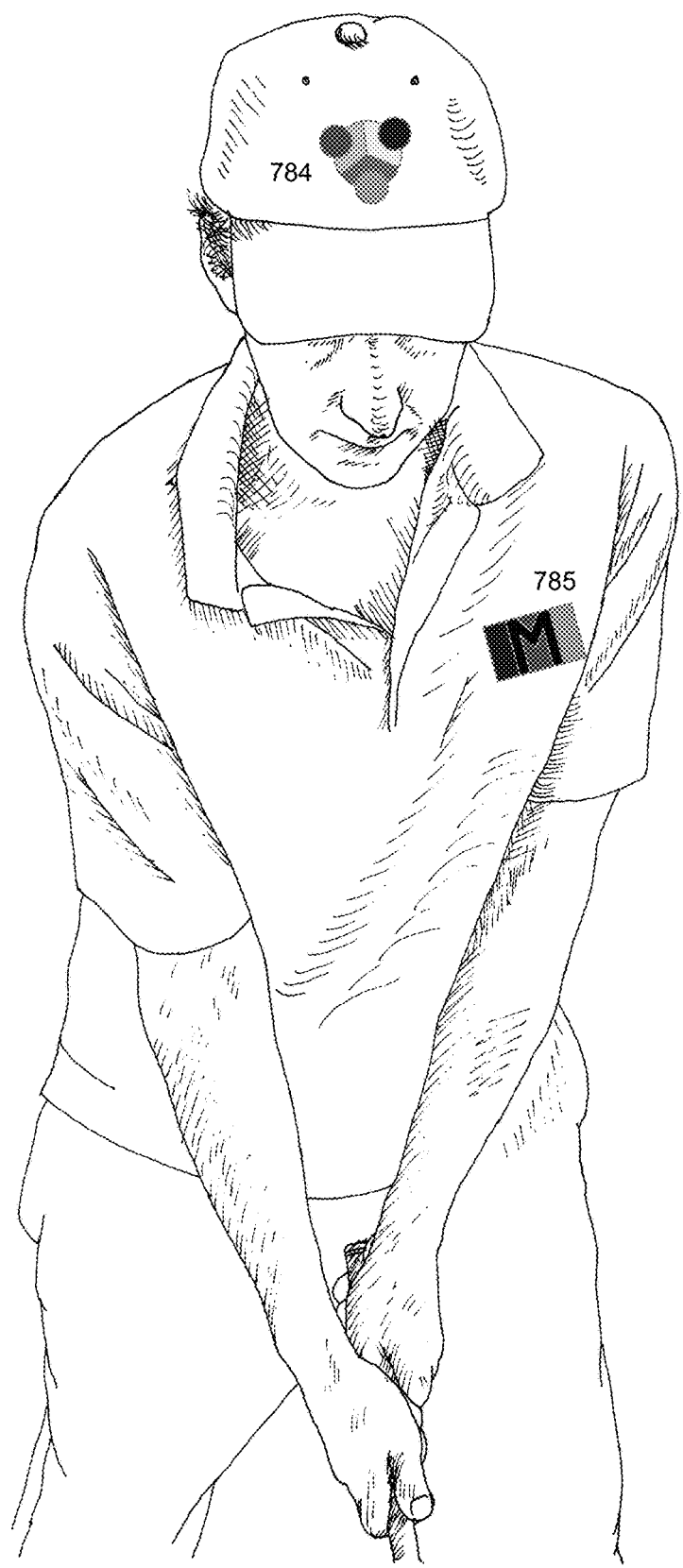
FIG. 36      WEARABLE TARGETS

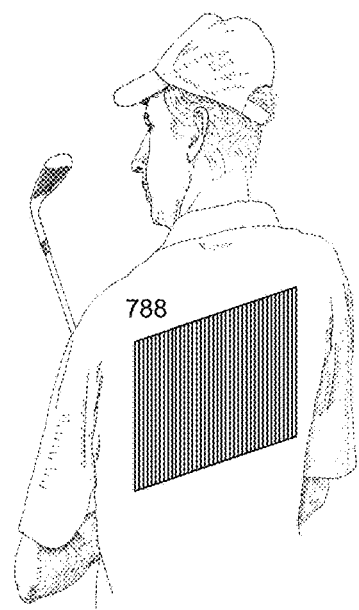
MOIRE PATTERN DETECTION
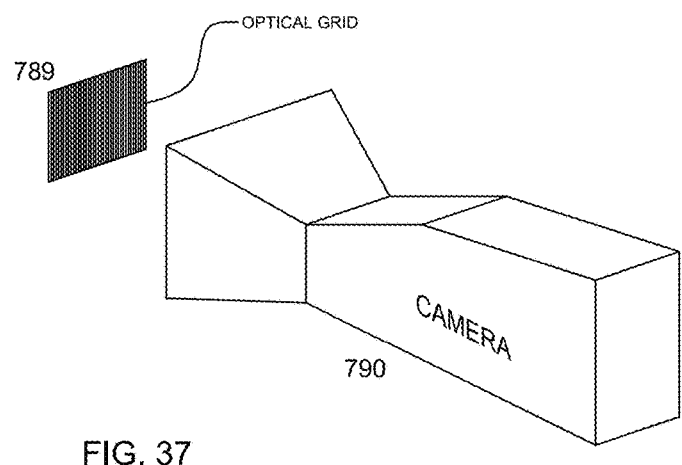
FIG. 37
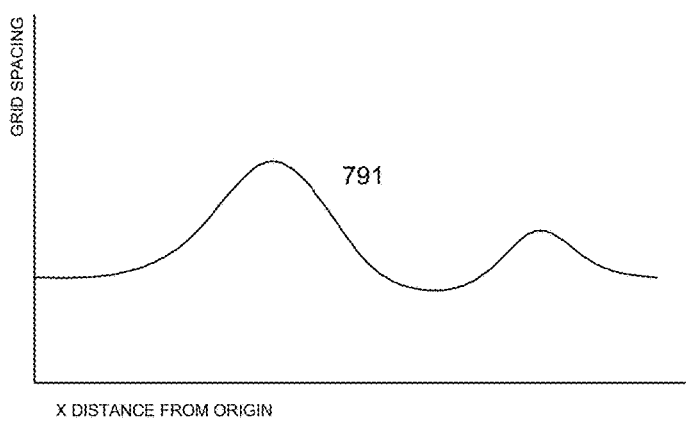
FIG. 38    MOIRE GRID SPACING VARIATION

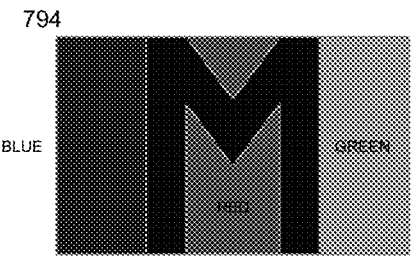
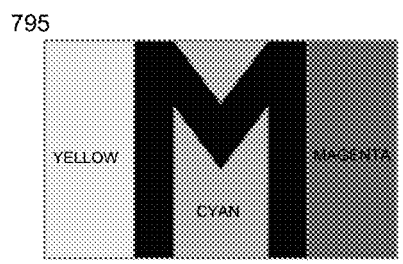
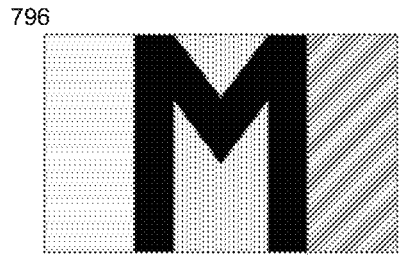
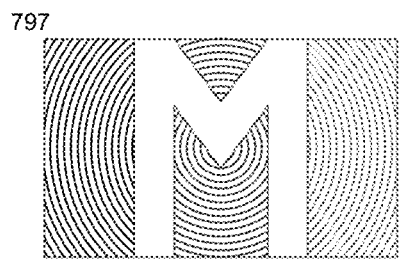
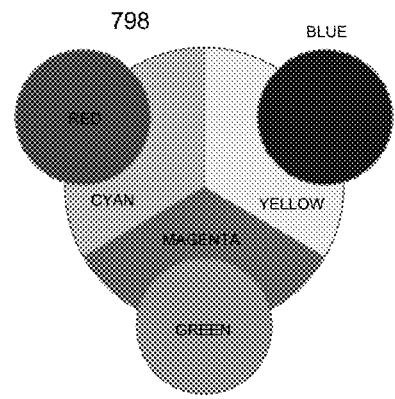
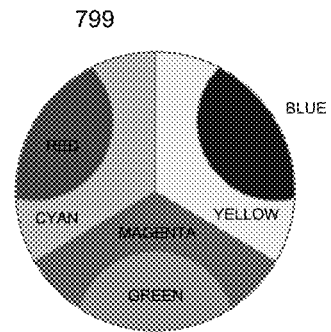
FIG. 39     TARGET VARIATIONS

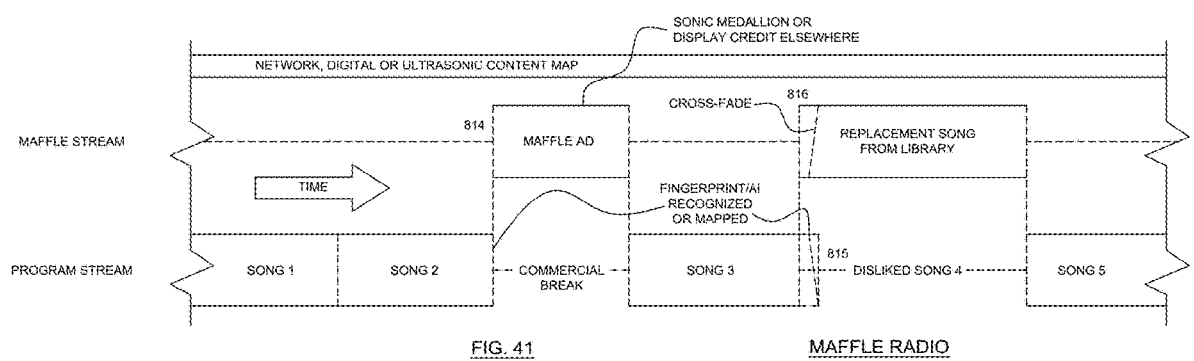
FIG. 41   MAFFLE RADIO

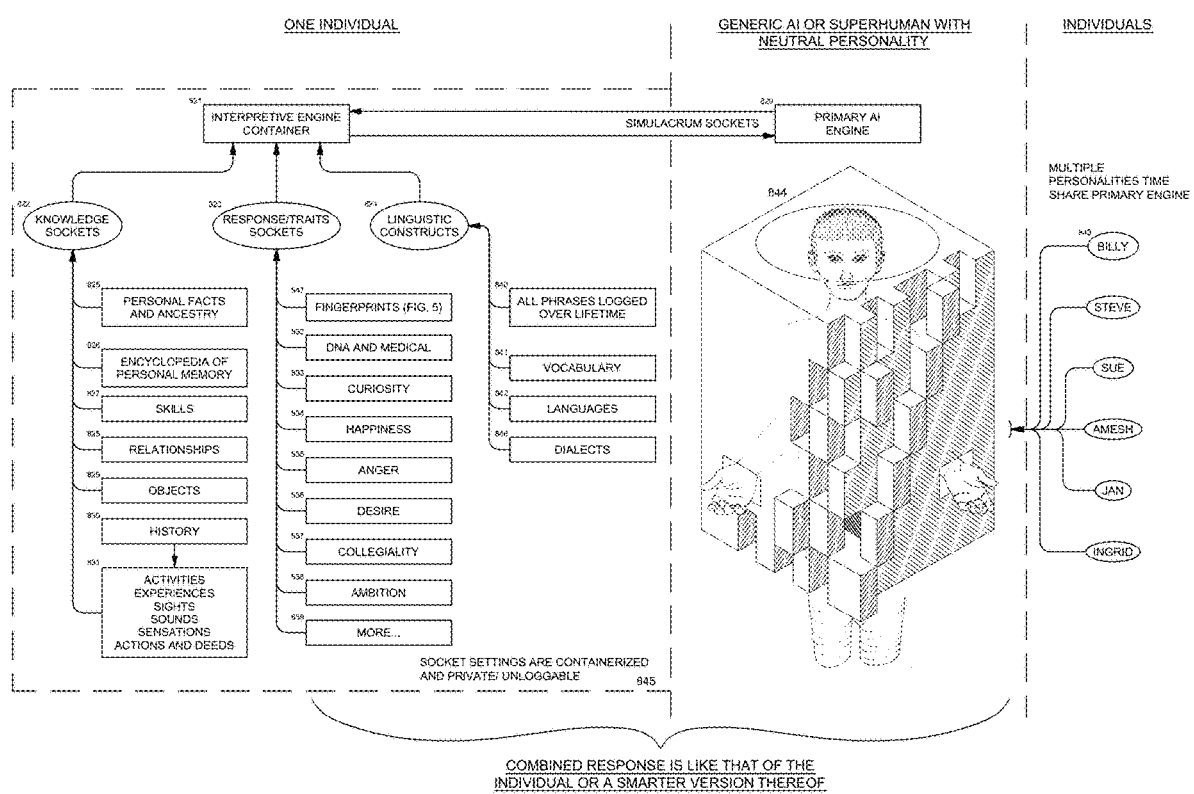
FIG. 42    AI PERSONALITY POSSESSION

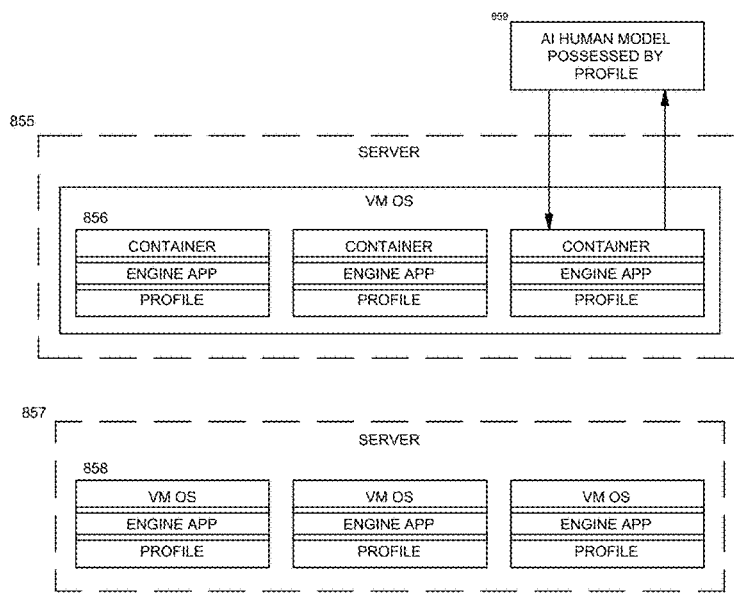
FIG. 43  CONTAINERIZING MATCHING ENGINES
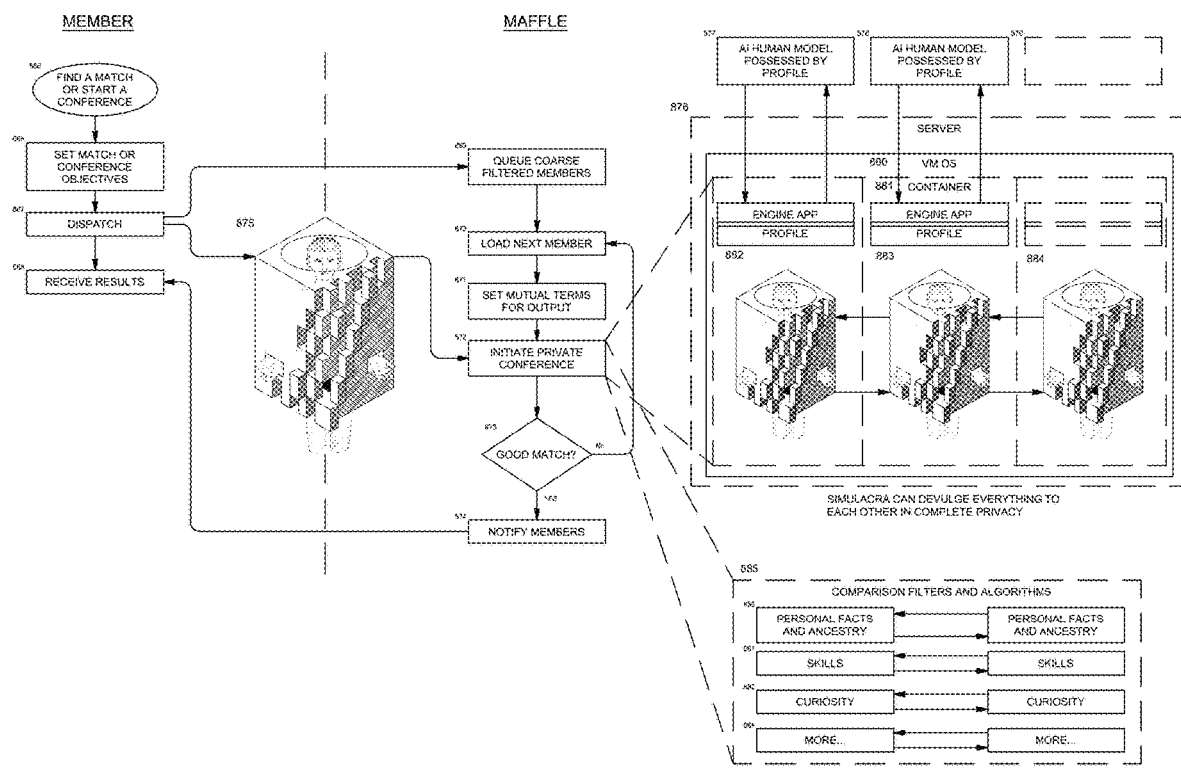
FIG. 44  SIMULACRA PRIVATE MIND MELDING

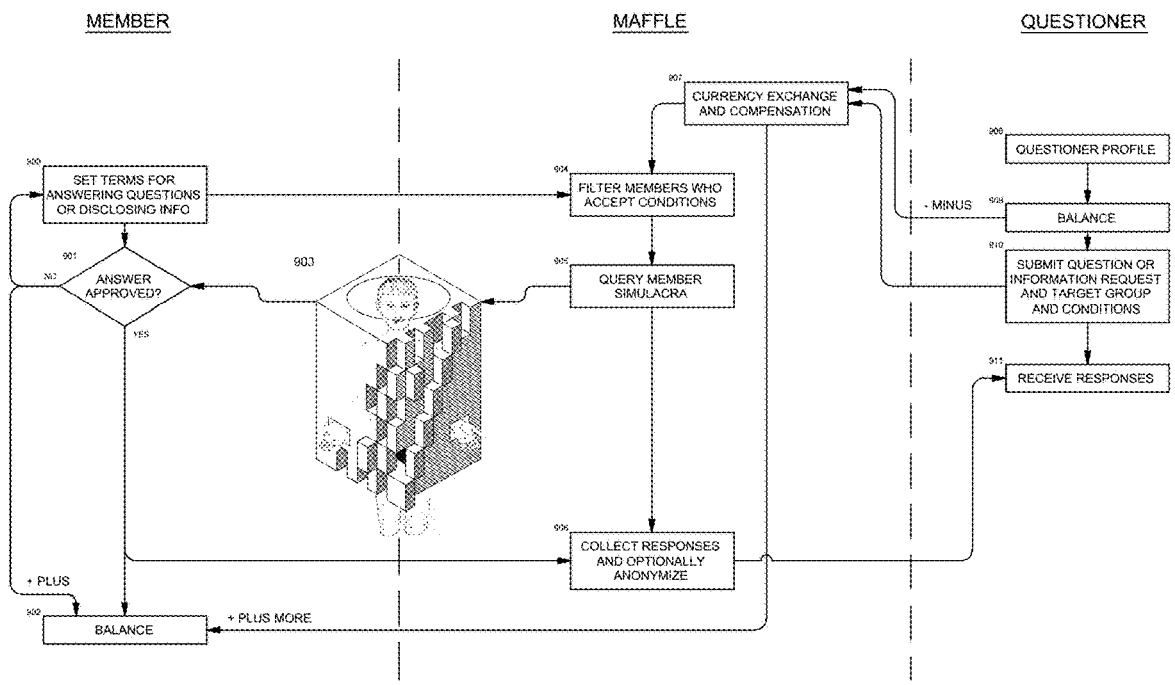
FIG. 45  PAYING FOR PROBING SIMULACRA
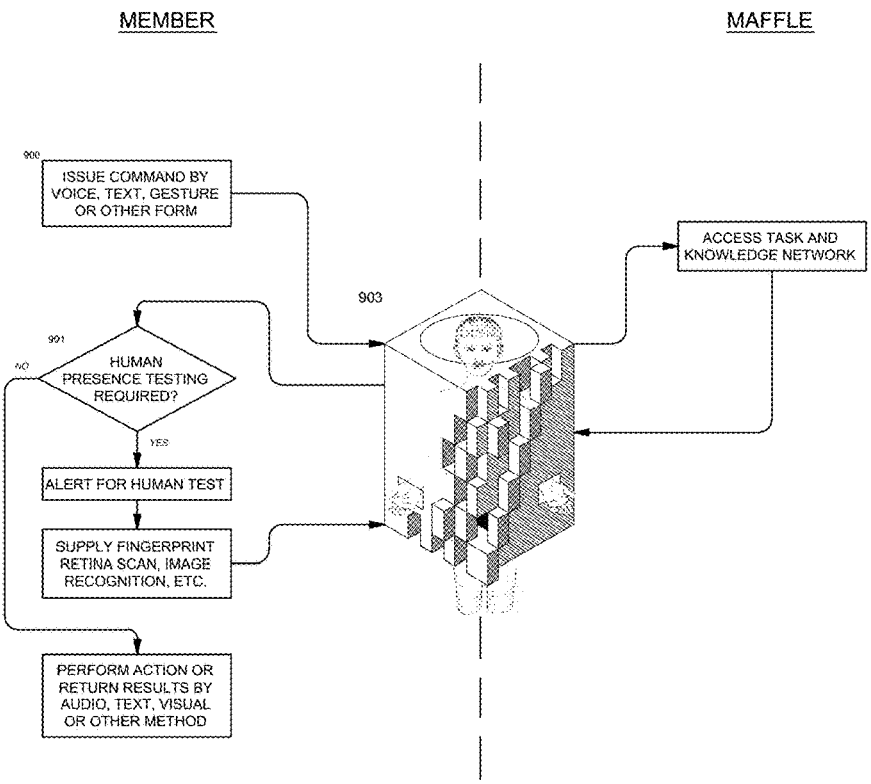
FIG. 46  TASKING A SIMULACRUM

AUTOMATICALLY PAYING A RECIPIENT BY PRESENTING PRIVATELY FILTERED CONTENT COMBINED WITH A PUBLIC BROADCAST

CROSS REFERENCE TO RELATED APPLICATIONS

This application is a continuation of PCT/US18/22646 filed on Mar. 15, 2018, which claims the benefit of U.S. Provisional Patent Application Ser. No. 62/472,118 filed on Mar. 16, 2017.

BACKGROUND

This patent application generally relates to technology used to control the audio or display output of audio or video hardware, and technology used to manage and control exposure to content. Little detailed or automated control is typically provided over the output of audio or video data in its many forms, relying instead on the whims of the data source for presentation decisions and content transitions. The structure of the content is often at odds with the desires of the user, and there are few ways for a user to conveniently define how content of differing types should be presented.

SUMMARY OF THE INVENTION

A first aspect of the disclosure provides for a system comprising a plurality of device controllers, wherein each device controller is connectable to a network and is configured to integrate with a hardware device adapted to output an AV (audio and/or video) content item, and wherein each device controller includes a system for generating response data that chronologically relates a user input to the AV content item; an interface associated with each device controller for receiving the user input collected from a user while the AV content item is being outputted; a computing system in communication with the plurality of device controllers, wherein the computing system includes: a process for grouping chronologically related response data received from a subset of device controllers; a process for detecting whether the chronologically related response data from the subset of device controllers comprises an AV event, and in response to detecting the AV event, transmitting a detected event indicator to each of the plurality of device controllers.

Another aspect of the disclosure provides a method of altering delivered AV (audio and/or video) content, comprising: providing a plurality of device controllers, where each device controller is connectable to a network and is configured to integrate with an associated hardware device, wherein each device controller includes an associated interface; receiving user inputs from a subset of the interfaces while an AV content item is outputted by at least one hardware device; generating response data that chronologically relates the user inputs to the AV content item; transmitting the response data to a computing system that is in communication with the plurality of device controllers; analyzing chronologically related response data obtained from the subset of device controllers; detecting whether the chronologically related response data from the subset of device controllers comprises an AV event, and in response to detecting the AV event, transmitting a detected event indicator to each of the plurality of device controllers.

Another aspect of the disclosure provides a first source, a second source and a television system comprising a picture from the first source and a graphics processor such that an area within the picture specified in a content map is modified to comprise elements from the second source, or modified to obfuscate elements within the area.

Another aspect of the disclosure provides for television muting, input and channel switching by a remote computer over a network per settings in a member profile.

Another aspect of the disclosure provides the delineation of content map elements including commercial breaks occurring on a channel on a television system by the combined responses of a multiplicity of members on a network.

Another aspect of the disclosure provides for a television system comprising a display and controlling hardware and software with multiple input sources, whereby an input source is automatically changed based on a content map and settings in a member profile.

Another aspect of the disclosure provides a television system comprising audio and video inputs, and a local computational device and remote computational device working in cooperation over a network such that the audio and video inputs are switched automatically in accordance with member settings such that non-negotiated ads and undesired content are muted or replaced with desired content or negotiated ads.

Another aspect of the disclosure provides a content map comprising chronologically related specifications of elements including subjective elements occurring in a movie, video or television program, song or sound recording, live performance, video game, text in a book, magazine, newspaper or digital newspaper, or still image.

Another aspect of the disclosure provides a television system comprising a graphics processor and displaying a channel carrying a watermark whereby all the pixels of a sequence of frames are evaluated for the dynamic range of pixel luma over the duration of the sequence and a group of pixels within a narrowed dynamic range of luma are collected to determine the pixel area of the watermark.

Another aspect of the disclosure provides for the computational identification and reversal of a channel watermark based on a narrowing of dynamic range of pixel luma over a sequence of images.

Another aspect of the disclosure is a content map comprising the image data of a watermark, whereby the watermark is combined with the content by a television system per a member profile.

Another aspect of the disclosure is a target grid and an interference grid situated between the target grid and an image sensor, whereby the two grids optically interfere to create a unique moire pattern.

Another aspect of the disclosure is a transparent display screen located in front of an image sensor comprising the display screen computationally programmed to display varying grid patterns causing optical interference with a target grid.

Another aspect of the disclosure provides a transportable private profile of a human comprising facts and desires of the human, and further comprising knowledge, behavioral traits and linguistic constructs of the human.

Another aspect of the disclosure provides a simulacrum of a person that comprises a private profile of the person in combination with a generic artificial intelligence.

Another aspect of the disclosure provides a secure computational container comprising a private profile and a standardized, secure interface to a generic artificial intelligence.

Another aspect of the disclosure provides a simulacrum comprising combining the profile of the person with generic AI engines of varying degrees of computational power, optionally comprising cost increases based on computational power.

Another aspect of the disclosure provides for computationally combining two or more quantifiable responses of a human into a single trait matrix, and further comprising the trait matrix modifying the linguistic output of a simulacrum.

Another aspect of the disclosure is providing two or more simulacra with private conferencing, such that some or all private knowledge and essence of the conferencing simulacra can be mutually shared inside of the computational space, further comprising that the details of the information exchanged by the simulacra is undetectable and unrecordable.

Another aspect of the disclosure is providing a question-and-answer interface to a membership of simulacra, comprising member settings constraining responsiveness, answers and compensation;

Another aspect of the disclosure is providing a question-and-answer interface to the simulacra of the deceased, comprising answers from the deceased that comprise information about the deceased, such information comprising text, numbers, images, videos and audio recordings.

Another aspect of the disclosure is providing a dating service that locates compatible individuals based on a private virtual mind meld between the individual's simulacra, comprising that the details of the exchange between the simulacra is undetectable and unrecordable.

Another aspect of the disclosure provides a computational robot (hereafter meaning one or more robots) under a person's exclusive control that confidentially locates advertisements for products or services for which the person may have an interest, and presents those ads to the person when and where the person specifies.

Another aspect of the disclosure is printed material comprising a machine recognizable optical target whereby the target area is superimposed upon with negotiated ads or content per the member's profile when the member views the printed material with a display or through a transparent device.

Another aspect of the disclosure is a virtual billboard comprising geospatial coordinates forming a virtual surface area or three dimensional volume upon or within which content is superimposed.

Another aspect of the disclosure provides for a payment to a member from a channel for not computationally reversing a watermark.

Another aspect of the disclosure provides a member profile comprising a payment account and an advertiser profile comprising an ad reference and a payment account, and a computational process confidential to the member that negotiates mutually agreeable payment terms whereby the subsequent exposure of the ad to the member causes the negotiated payment to be transferred to the member's payment account from the advertiser's payment account.

Another aspect of the disclosure provides for a payment medallion comprising an icon, text or sound correlated with an ad exposure that varies based on the negotiated terms.

Another aspect of the disclosure provides for a television such that a pool of negotiated ads are exposed to a member interspersed with television content in accordance with settings in a member profile.

Another aspect of the disclosure provides for negotiated ads to be superimposed on a television over non-negotiated ads.

Another aspect of the disclosure provides a human presence test whereby the confirmation of the presence of a human modifies an ad exposure payment.

Another aspect of this disclosure provides a content map comprising chronologically related specifications of purchasable items whereby an item may identified by a member without interrupting the content.

Another aspect of this disclosure provides a content map comprising chronologically related specifications of intellectual property comprising the ownership, rules of access and recipients of access payments, whereby accessing the intellectual property automatically causes a payment to be made to a recipient.

Another aspect of the disclosure provides a producer or broadcast channel profile comprising a content reference and a payment account, and a computational process confidential to the member that negotiates mutually agreeable payment terms for the member's consumption of the content whereby the subsequent consumption of content by the member causes the negotiated payment to be transferred to the producer or broadcast channel's payment account.

Another aspect of the disclosure provides that incremental payments paid by a member to a producer or broadcast channel are made in chronological relationship to the consumption of the content.

Another aspect of the disclosure provides the redirection of negotiated payments due to a member by an ad exposure whereby all or a portion thereof of the payments are instead paid to a content producer or broadcast channel chronologically related to the ad exposure to the member and the consumption of content by the member.

Another aspect of the disclosure provides an ad content map comprising personalizable elements whereby text and images appearing with the ad are confidentially tailored to suit a member per the settings in the member profile.

Another aspect of the disclosure provides for the payment from advertisers to the person for each exposure of the person to the advertiser's ad or brand, the amount for which is negotiated confidentially by the person's robot.

Another aspect of the disclosure provides a robot eliminating from the person's sight and other senses, ads and brand markings for which the person has not requested exposure to and for which the person is not collecting payment.

Another aspect of the disclosure is provides for the payment of content, goods and services purchased by a person by transferring some or all of the payments received by that person for their exposure to advertisements, such payments optionally comprise being made automatically.

Another aspect of the disclosure provides predictive and automated control to a person over the exact nature of content, media and ads before the person is exposed to it.

Another aspect of the disclosure provides a robot under the control of an advertiser that publishes advertisements for parsing by the robots of potential customers, and negotiates pricing to pay interested customers for being exposed to the ad content, while verifying the customer's genuine interest in the product and thwarting frauds.

Another aspect of the disclosure provides a robot under the control of a publisher that negotiates with a prospective consumer's robot for the automatic payment of access to the publisher's content, such payment optionally comprising compensation to the consumer for exposure to ads chronologically related to the consumption of the publisher's content.

Another aspect of the disclosure provides a machine recognizable optical target with an area or a volume, such that when observed on a display or through a transparent device, the target area or volume is superimposed with content per a member profile.

Another aspect of the disclosure provides a celebrity comprising a profile and payment account and an optical target emblazoned on the celebrity whereby when the celebrity is viewed by a member on a display or transparent device, the target is superimposed with a negotiated ad, and a payment is transferred to the celebrity's payment account.

Another aspect of the disclosure provides a first member with an optical target and a personal message for a second member, and the second member with a display, whereby when the second member views the first member on the display, the personal message is displayed to the second member.

Another aspect of the disclosure provides optical targets on a multiplicity of members or celebrities forming an area or a volume whereby the superimposition of a negotiated ad causes payments to be transferred to the accounts of all the members or celebrities defining the area or volume.

Another aspect of the disclosure provides the identification of a member emblazoned with a target by computationally correlating a GPS member location with the aim, field of view and GPS location of a camera.

These and numerous other aspects will be apparent from the detailed description, which is not intended to be limiting, and when taken altogether with the drawings and the other information herein, disclose embodiments of the invention.

BRIEF DESCRIPTION OF THE DRAWINGS

FIG. 5 is an image of a profile image fingerprint for machine matching;
FIG. 6 is a flow chart of exploring Maffle-curated ads;
FIG. 7 is a flow chart of blocking unwanted digital ads;
FIG. 8 is an ad with an inset Maffle payment medallion;
FIG. 9 is a drawing of a Maffle target appearing in a virtual 3D environment;
FIG. 10 is a drawing of a billboard with a Maffle target;
FIG. 11 is a printed newspaper bearing Maffle targets;
FIG. 12 is a flow chart of converting currency into Maffles (virtual currency) and back into currency;
FIG. 16 is a flow chart of a member buying goods & services;
FIG. 17 is a flow chart of watching streaming media;
FIG. 18 is a flow chart of one possible configuration for a Maffle-friendly interne news site;
FIG. 19 is a hardware block diagram of an embodiment of a Maffle TV;
FIG. 20 is a drawing of Maffle TV hardware components;
FIG. 21 is a flow chart of one possible Maffle TV implementation;
FIG. 22 is a flow chart of content map generation;
FIG. 23 is a timeline of one embodiment of a content map;
FIG. 24 is an isometric view of a temporal parameter solid;
FIG. 25 is an isometric view of a temporal parameter solid in section view;
FIG. 26 is a flow chart of watermark and banner masking and management;
FIG. 27 is a flow chart of one embodiment of watermark extraction;
FIG. 28 is a histogram of the dynamic range of a parameter of pixels in a frame;
FIG. 29 is a graph of pixel luma vs. time for eliminating pixels from a channel watermark extraction;
FIG. 30 is an isometric view of a stack of pixelated images bearing a channel watermark;
FIG. 31 is a drawing of a watermark visibility compensation indicator;
FIG. 32 is a flow chart of mobs participating in network mute timing;
FIG. 33 is a graph of a mob mute response curve;
FIG. 34 is a flow chart of the detection and superimposition of desired content over targets or unwanted elements;
FIG. 35 is one embodiment of a target used for element superimposition on a person;
FIG. 36 are two embodiments of superimposition targets on a person;
FIG. 37 is a diagram of an optical grid and garment grid pair used for creating a detectable moire pattern by a distant camera;
FIG. 38 is a diagram of grid line spacing varying over the width of a grid pattern to create a unique moire pattern;
FIG. 39 are embodiments of superimposition targets with varying patterns and color combinations;
FIG. 41 is a timeline of Maffle radio replacing ads and content per member profile;
FIG. 42 is a flow chart of the quantified personality of an individual possessing a generic AI;
FIG. 43 is a diagram of network servers running containerized engines with profiles;
FIG. 44 is a diagram of simulacra privately exchanging information for dating or other purposes;
FIG. 45 is a diagram of requesting information or asking questions of simulacra;
FIG. 46 is a diagram of issuing commands to a simulacrum and intervening with a human presence testing requirement;

DETAILED DESCRIPTION

Introduction

Figure 1:
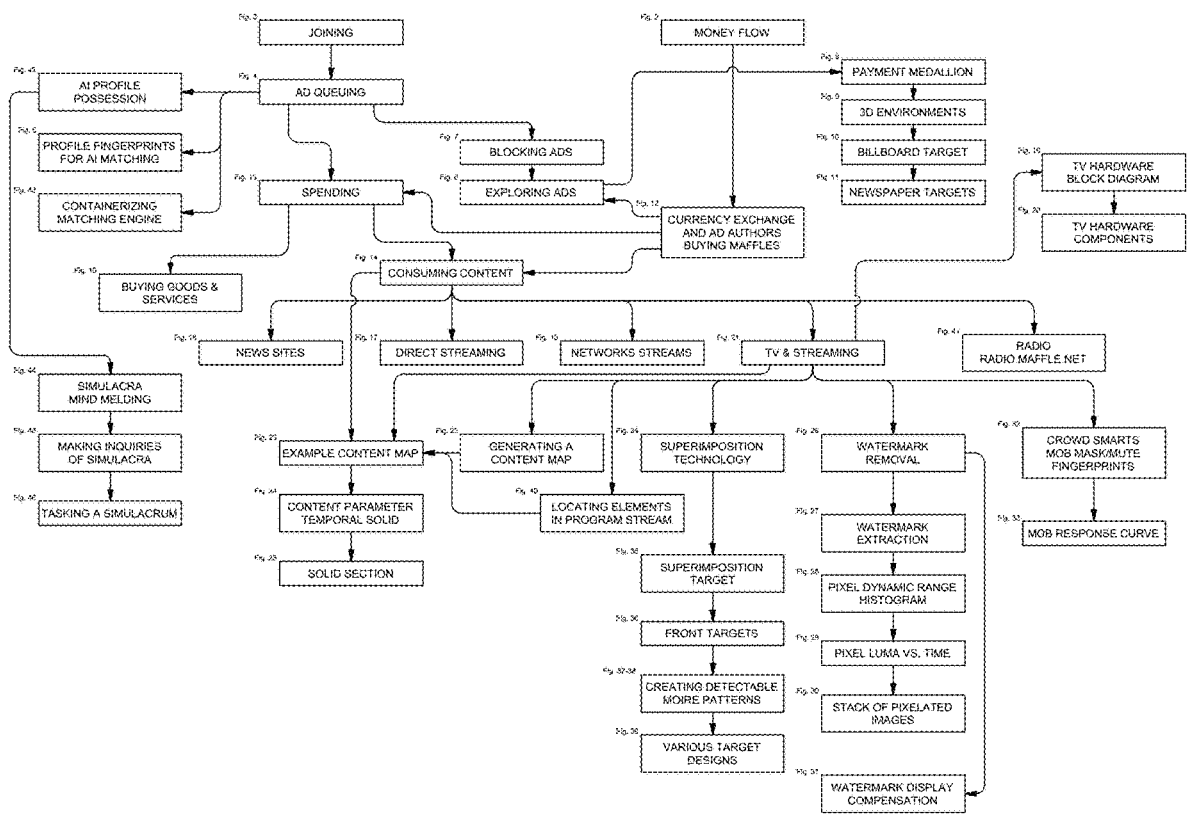
FIG. 1 is a guide to the other figures.

The description is not intended to be limiting, and one skilled in the art will recognize the extensive variations possible based on the drawings and specification that now follow.

The subject of this disclosure is a new and heretofore unforeseen combination of technologies that together provide specific control over a user's exposure to content, media and data in all forms on every type of device and display surface, with a presumption and first priority being the user's privacy, and that any information about the user, and additionally the user's attention, has commercial value to the user.

An additional subject of this disclosure is a new and heretofore unforeseen combination of technologies whereby exposure to an advertisement is treated as a depletion of the life-energy of the living watcher or listener, which deserves compensatory payment in some form for each exposure. An ecosystem is established whereby a world-wide community of human beings mutually agree and accept that it their right not to be exposed to any form of unwanted or unsolicited advertisement, brand marking or logo.

The community further recognizes the need to learn about and make decisions regarding the consumption of goods, services and entertainments, and that the companies and individuals that provide such things deserve fair and equitable payment.

The human beings in this new community (hereafter referred to as MEMBERS or a MEMBER), now in an uncluttered, ad-free ecosystem throughout their digital and corporeal lives, and in the course of deciding that they wish to learn about a good, service or entertainment, ask to be advertised to; in the preferred embodiment, the member gets paid by the advertiser for each and every exposure to an ad, brand marking or logo.

A careful and new construct of technologies facilitates this new paradigm, in such a way that honors the sensitivity of the member, conveys the information they need to make purchasing decisions, and provides a fair and profitable methodology for companies to inform their prospective customers about their products in an open, rather than deceptive and manipulative, manner.

An additional benefit of the aspects of this disclosure are the vast savings provided to the producers of the various products and services by eliminating billions of useless ads that serve no purpose but to annoy virtually the entire human population, besmirch our environments, and enrich parasitic middlemen, aggregators and third-parties.

Furthermore, since the preferred embodiment provisions a robotic emissary, or simulacrum, for each member with which to negotiate automatically with advertisers and producers and locate desired content, the simulacrum is also available to find a prospective mate, produce income for the member by automatically answering opinion polls, answer messages and carry out errands. The simulacrum can further possess a mechanical body and work in the member's stead in the physical world.

In exchange for operating this new ecosystem and paradigm, (henceforth referred to as MAFFLE—an alliteration of the acronym of "My Ad Free Life"—M.A.F.L.), Maffle profits by any of the following methods, without limiting the additional methods possible, all without the need for a single unsolicited ad:

1) charges made to advertisers for providing access to Maffle members;
2) charges for currency conversions between government-issued currencies and a virtual currency (MAFFLES);
3) profits from the sale of Maffle-produced devices such as televisions, set-top hardware, computers, mobile devices, viewers and heads-up glasses and displays with built-in ad exposure management hardware and software;
4) Each member is preferably provisioned with their own robotic simulacrum as described in detail later in this disclosure, therefore providing, for example, these three profit opportunities:
   by charging for robotic simulacra services such as dating, negotiating and conferencing;
   by charging entities to poll and question member simulacra;
   by charging to provide the perpetuation of the simulacra of deceased members;
5) by payment processing fees from purchases made by members using credits from ad exposures;
6) by a percentage of retail sales made from Maffle-friendly storefronts and virtual shopping malls;
7) by fees charged to merchants and content producers using a Maffle server-side store or content module;
8) profits from the sale of network hardware such as wi-fi routers that pre-filter and sterilize incoming network content;
9) licensing of Maffle ad-exposing technology to be incorporated into the products and services of other companies, such as television sets, set top hardware, cable and broadcast networks, satellite and terrestrial radio and more;
10) by purchase fees or percentages charged to producers of content made for sale to members;
11) by the sale of hardware privacy keys to members that verify identity and store private information used by the Maffle system;

Each of the aspects introduced in this section are based upon aspects described later in this disclosure in more detail.

A consumer joins Maffle and begins to develop a profile to which only they have access and may edit. The profile preferably comprises the quantifiable facts and measurable essence of the consumer and is refined and improved upon by the consumer over their lifetime with Maffle.

Automatic computational processes privately access the profile and compare it with the target profiles of all the ads in the universe accessible to the computational processes. An ad pool is determined for the consumer and made available everywhere the consumer may see or hear an ad.

The consumer sets in their profile, the rules under which they would like to be presented the contents of the ad pool, and during the subsequent course of conducting their normal lives, see the ads interspersed in a non-obtrusive manner, and furthermore collect a payment of money from each advertiser for each appearance of an ad, brand name or logo.

The money collected is subsequently or concurrently used to purchase content, goods or services.

Maffle Television Example

As a member watches TV, she sets her profile rating limit to PG-13 because she is watching with her children. She sets the channel to her favorite show, and turns on the display of ad pool ads during commercial breaks. Now, as the family watches the show together and a moment of explicit violence occurs that exceeds the rating, that moment is muted and blurred automatically by her television until the violence passes. At the commercial break, an ad about an appliance plays because she is shopping for a new dishwasher. A payment medallion appears on screen to show that she was paid the equivalent of five dollars to watch the ad because she has an excellent Maffle purchase history rating, and she will receive a twenty-dollar coupon if she clicks the ad for more details. Her program resumes automatically at the end of the commercial break.

Introduction Cont . . .

An additional and recognized benefit of the disclosure is that because each ad has been solicited by a member who is contemplating a specific purchase, the value of the ad to the advertiser is many times that of an indiscriminate ad. The advertiser will then happily pay many times the amount per ad view to use Maffle because the total number of ad views needed is correspondingly smaller.

An additional aspect of the disclosure is a method to establish the credibility of members to the advertisers. The interne is filled with frauds and crooks, therefore a method is needed to reassure advertisers that when a member solicits an ad and expects payment for such exposure, they are truly interested in the category of product for which they have made their request.

Another aspect of the disclosure, and an additional and never before contemplated benefit of the virtual bank system of ad exposure credits is that until a member had proven their veracity as a consumer, such credits can be taken away should such proof not materialize. Advertisers then have a vehicle through which they may recapture advertising expense from ads shown to exposed weasels and the like. Additionally and specifically for large purchases such as cars, houses and major appliances, the credit may be optionally paid only after the proof of an actual purchase has been registered.

An aspect of the disclosure comprises a gradual building of member value to the advertiser based on measured and stored correlation between the ad requests in a given product category made by a member, and their future actual purchase within that category. The longer the track record a member has in Maffle whereby they have requested ads in a category, then proven that they have indeed made a purchase in that category, the more credit they receive from an advertiser for having endured exposure to their ad. Furthermore, the more willing the member is to forestall credit payment until after the purchase is made, the higher the payment for each ad exposure may be. Additionally, Maffle serves as escrow and holds payments made by advertisers so they cannot renege on the payment for an ad exposure.

Display of Ad Exposure Credit with the Ad

Another part of the disclosure is the realtime display of how much credit a member is earning upon exposure to a given ad. Since the Maffle system inherently has control over each and every ad and when and where and to whom it appears, it can also superimpose or indicate in any manner exactly how much the advertiser is paying to the member for that ad.

Another brand new aspect never before contemplated is giving the member the means for objecting to all aspects of the ad, such as, since they now can see exactly how much they are being compensated for that ad exposure, the amount they are being compensated, the time of exposure, the sensitivity of the ad design and production and it's offensive index.

Because of this feedback, each member can over time taylor their ad exposures to fit within their personal tolerance limits and satisfaction with offered compensation. Furthermore, the ad provider may be assessed a penalty, payable to the member, should the offensive index of the ad exceed a certain threshold.

Content Map Content Rating System

Content maps are described in detail later for FIG. 23. Any aspect of any content including ads can be specified within a content map.

The content map comprises not just the chronological identification of individuals, things and events, but also of subjective elements such as the "rating" of the storyline, action and images. Such ratings may be equivalent to the movie ratings G, PG, PG-13, R, etc. For example, if an actor appears in the nude, the region of nudity is determined and rated and included in the content map. If, for example, a parent has chosen to mask all content rated PG-13 or higher, the region on the screen is automatically masked, blurred, or otherwise made indiscernible. This applies to occurrences of graphic or excessive violence. Ratings can be determined for the conversation in the story and the story line itself, so adult conversation and language can be identified in the sound track, and in/out points determined.

Now follows a detailed description of each drawing and the further aspects of this disclosure.

Guide to the Figures

Referring to FIG. 1, which is a guide to the other figures, joining (FIG. 3) begins involvement with the Maffle ecosystem. The joining step comprises initial settings for aspects of the member's personality, which may comprise ingesting a credit report and starting with a template of a similar personality and various ad "channels". Once any measure of the member's PROFILE, which comprises all theoretical dimensions that may define who and what the member is, what they say, how they behave, what they believe and what they want (see FIGS. 5, 42 and 43), ads may be curated for the member and buffered into an AD POOL per FIG. 4. This ad pool is periodically updated to stay current, and is the source of all ads subsequently displayed to the member throughout their lives as they conduct their normal business and activities. It is accessible via locally stored digital ads, or on network servers that can place the ads within any digitally accessible realm, including browsers, apps, TV and radio and more per FIG. 6, in addition to printed and physical media. In FIG. 7, a host of technologies attempt to block any ad outside of Maffle that is not accompanied with a payment upon exposure to the member.

At FIG. 8, informative MEDALLIONS are displayed in association with ads comprising how much a member is being compensated for exposure to the ad. FIG. 9 depicts ad TARGETS displayed within virtual environments such as games upon which ads from a member's ad pool are superimposed, and FIG. 10 depicts an ad target on a physical billboard in public. In FIG. 11, a newspaper is printed with targets that can be superimposed with pool ads using a mobile camera, overlay glasses or the like.

Figure 2:
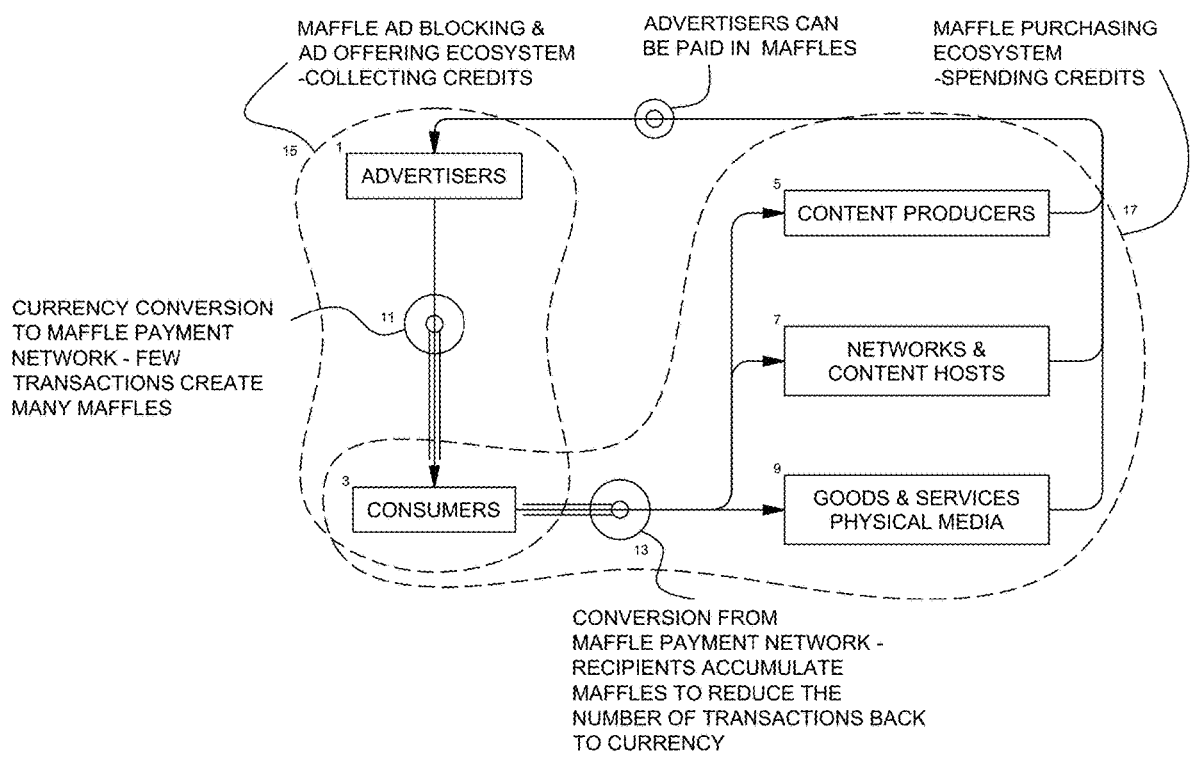
FIG. 2 is a flow chart of the general money flow of the network.

At FIG. 2, the money flow within the Maffle ecosystem is depicted, showing how money is given to advertisers by the entities consumers pay for goods and services. Such money is then paid to consumers for exposure to advertising, then back to the goods and services producers, optionally comprising various currency conversions. Absent from this figure are the third-parties that are the current recipients of virtually all advertising money. At FIG. 12, advertisers join the Maffle ecosystem and purchase credits with which to compensate members for curated ad exposures. At FIG. 13, Maffle credits are spent on goods, services, content and entertainments, consumption optionally comprising the step of collecting further credits for curated ad exposures used to offset the cost of the content, as depicted in FIG. 14. At FIG. 16 a member buys goods and services using Maffle credits which updates their purchase history/consumption credentials and Maffle credit rating.

The remaining figures detail the operation of the Maffle ecosystem in various consumption technologies and media types.

The following detailed descriptions of each figure combined with the figures themselves comprise the many aspects of the disclosure, such descriptions not intended to be limiting. The myriad of possible combinations of the various aspects of the disclosure are numerous and will be readily apparent to one skilled in art after reading the disclosure in its entirety.

Money Flow

FIG. 2 is a flow chart of the general money flow of the network. In the preferred embodiment, a majority of the money paid by an advertiser to expose an ad to a member is paid directly to that member, preferably all of the money paid by the advertiser for that particular ad exposure. The advertiser preferably pays Maffle a fee for access to the ecosystem or currency conversion from real currency to virtual currency. Alternatively, Maffle charges a percentage of the amount paid to the member for an ad exposure. Maffle preferentially institutes a progressive advertiser fee schedule for the purpose of increasing the advertising cost for luxury goods and services and for members with progressing income levels. The purpose of such a progressive schedule being to equalize the cost of operating the Maffle ecosystem as a percentage of individual member wealth.

In step 1, advertisers are paid to advertise by the collective of content producers 5, network and content hosts 7, and the providers of goods, services and physical media 9. Advertisers are preferably paid comprising Maffles 10 that have been paid by members/consumers 3 to the collective within the Maffle purchasing ecosystem 17. Advertisers 1 give currency to Maffle, that charges a percentage of preferably 1-30 percent (based on a progressive schedule) to change the currency into a virtual currency (hereafter MAFFLES) 11. The advertiser is now within the Maffle ad blocking & ad offering ecosystem 15, where it has access to all Maffle members/consumers 3. Members/consumers 3 accumulate Maffles during the course of their normal activity by being exposed to curated ads they have specified as having an interest in being exposed to, and spend such Maffles on the collective of goods, services and content producers, etc. Maffles are preferably exchanged between all participants within the Maffle ecosystem without fees. Maffles may be converted back to international currency at 13 preferably at a charge of 1-30 percent (based on a progressive schedule).

Joining And Using Maffle

Figure 3:
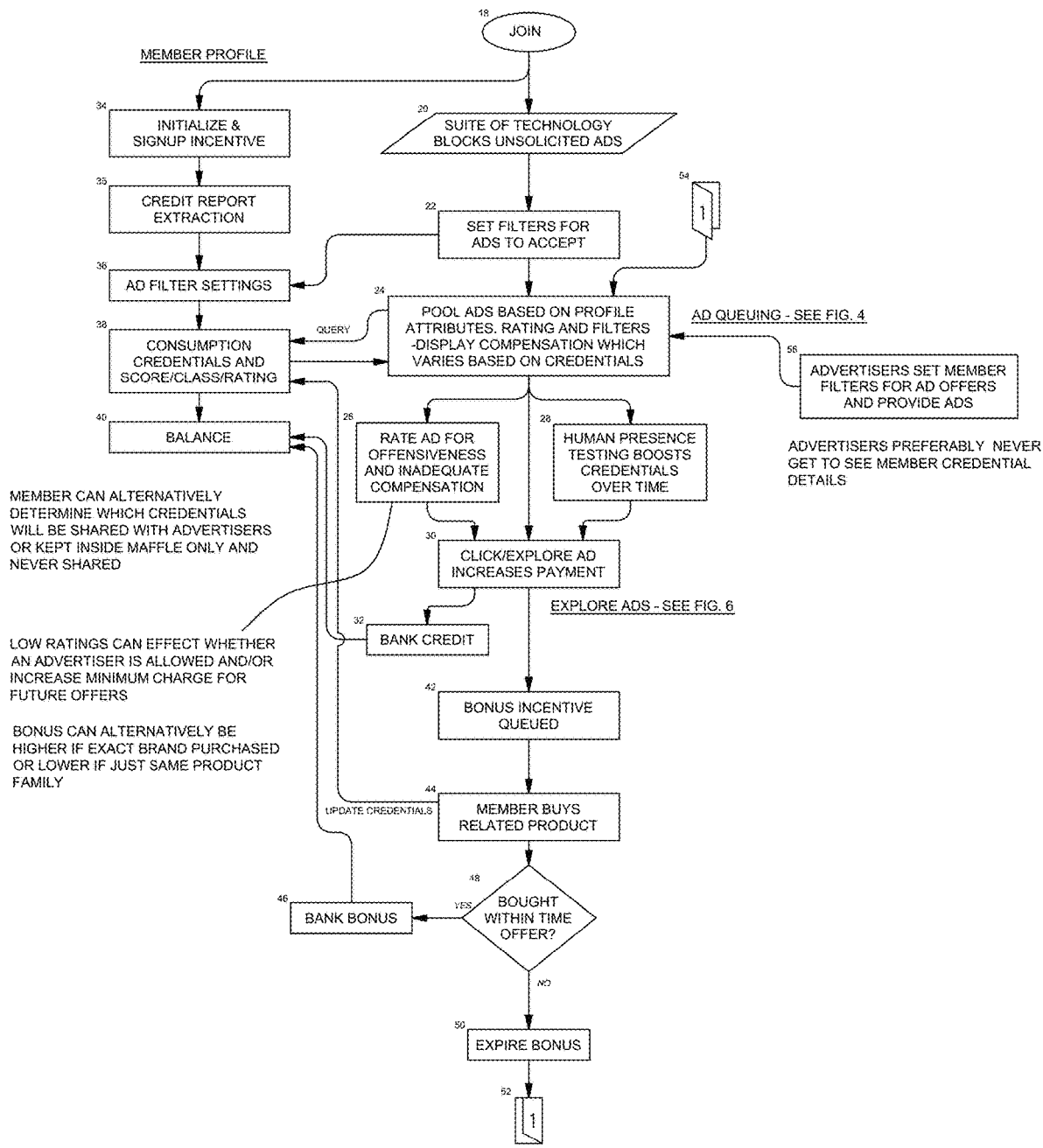
FIG. 3 is a flow chart of joining and using the network and accumulating credit.

FIG. 3 is a flow chart of joining and using the Maffle network and accumulating credit. Consumers join Maffle and become members at 18, and are provided a suite of technology to block unwanted non-Maffle ads 20 for which they are not being paid upon exposure. At step 34, a member PROFILE is initialized preferably with an incentive for the member comprising a benefit such as the automated extraction of the member's credit report data from credit bureaus 35. Maffle preferably facilitates the transfer of the credit report or other data that would be tempting to manipulate by the member, such that a blockchain (see steps 426 and 433 of FIG. 4) or other verification approach simultaneously generates a data record that can be used in the future to validate voluntary disclosure by the member of their credit history as described later and in FIG. 45. Furthermore, and for example, the member's network of friends may be exported from a social media platform and imported into their profile, as well as a purchase history from an online retailer.

The profile comprises the facts and desires of the member and is preferably stored confidentially in an encrypted form by the member and is preferably non-extractable by Maffle or any other agency including governments. The profile is stored digitally, electronically, optically or by using any present or future data storage technology. The profile may be stored in an encrypted form on a network and accessed by the member from a variety of devices.

Maffle preferably maintains a record of the identity of each member, such record preferably stored at arms-length by an independent organization outside of Maffle formed under an uncorrupt nation state. The independent organization preferably has binding rules that place record access limits on Maffle itself so that innocent privacy is stringently protected. Maffle is preferably therefore not an anonymous member network in order to avoid member malfeasance.

At step 22, the member sets filters that determine which ads are exposed to the member in all possible formats such as digitally, on TV or radio. Filters comprise manually set toggles and descriptions of ad categories, products, vendors, formats, styles, brands and any quantifiable aspect of any possible ad. Setting the filters can comprise the step of choosing one or more ad CHANNELS, which are curated collections of ads tailored for a particular type of individual comprising age, gender, lifestyle, geographical location, income, job, etc. The member can browse human representations and descriptions to locate the closest match to themselves as a way of initializing their profile settings. Referencing FIG. 42, which will be described in detail later, a member's profile preferably comprises a computational and data replication of facts, characteristics, behaviors and desires of the member. Manually setting filters is a highly simplified way of setting inputs for optimal matching of ads to members. One skilled in the art will readily determine the many additional ways of measuring and storing personality facets of individual members, such as reaction testing, physiological measurements, question and answer hierarchies, history of consumption choices, etc. See description of FIGS. 4 and 5 that follow.

At step 24, a computational engine comprising hardware and software (MATCHING ENGINE) analyzes the universe of ads cataloged by the Maffle ecosystem, and compares them against the estimated and computed (and manually set) desires of the member and target member attributes of the advertiser. This process is further described in FIG. 4, the details of which will follow. The matching engine can be as simple as typical filter settings, for example, "I want to see all ads about refrigerators with prices lower than $1000", but preferably comprises the step of choosing ads to pool based on a multi-dimensional model of the member so that the member is pleased with the ad selections without having to always explicitly choose exact ad parameters. This artificial intelligence and machine learning matching engine paradigm will be discussed later and relates to FIGS. 4, 5 and 42 and 43.

At step 38, the history of purchases made by the member are stored confidentially, but verifiably. Over time, a numerical representation or RATING (SCORE/CLASS) evolves for the member. The rating comprises the likelihood the member will eventually make a purchase within a category the member has specified as a category of interest. The rating may further comprise the amounts spent and any other conceivable detail about item purchases. The member purchase history and rating are used by the matching engine to calculate how much the member will be paid for ad exposures, and preferably correlates with how much the advertiser pays Maffle for exposing ads to that member. For example, a member with a high rating and who spends a lot of money, preferably gets high compensation per ad exposure and pays Maffle high fees for exposing ads to that member. The higher fees may be in the form of a higher percentage paid to Maffle per ad exposure, or preferably with higher fees for access to the Maffle ecosystem as a whole. Higher fees for wealthy members or luxury goods may also be in the form of higher currency exchange fees (see FIG. 12) or during the step of using Maffles to purchase goods, services or entertainments.

Step 38 preferably comprises the step of starting with a low default rating for new members that allows for advertisers to pay starting amounts at a low rate until the member establishes credibility for following through with related purchases. This step further may comprise putting ad exposure credits into escrow, so that new and developing members don't receive any payments until they begin making purchases.

Step 38 further comprises the step of Maffle computationally verifying all transactions made by a member while maintaining the member's privacy. A blockchain is one possible way to securely record and verify a member's purchase history so that it cannot be faked by a malfeasant member. The blockchain is preferably updated automatically when the member makes any purchase from vendors registered within the Maffle ecosystem, otherwise the blockchain may be manually updated by Maffle via evidence using digital or physical receipts.

As will be described in FIG. 4 and others, the matching engine can analyze and access the member's profile in isolation from Maffle itself so that Maffle need not store or have access to any private information about the member.

At step 40 the balance preferably in Maffles but alternatively in government issued currency is registered for the member and is added to or subtracted from based on ad-related interactions and purchases.

At step 56 advertisers register ads with Maffle such registration comprising the step of specifying the ad content and the desired target members for the ad. See FIG. 4.

At step 28, human presence testing may be utilized to modify ad exposure payment amounts and member profile ratings and credentials. Such testing is comprised of fingerprint capturing, infrared imaging, retina scanning, voice recognition, body motion measurement, physiological measurements, for example of brainwaves, the proximity of a detectable tissue implant or wearable device, or any current or future way to confirm that a human is either present or paying attention.

A member who is more often confirmed present and paying attention during ad exposures may merit higher payments in general or per exposure. For example, a popup on TV asking for presence confirmation is satisfied with a thumbs up or finger raise, or perhaps a shouted "Plus one" or "Booya!", which increases the collected Maffles for an ad exposure. Alternatively, a hot IR lump detected on a couch distinguishable from a dog ought to be sufficient. It should be noted that in the current TV advertising paradigm, there is zero human presence testing while ads are muted or play to empty rooms.

At step 26 members have the option to rate and reject ads based on any criteria, such as whether or not the ad is wanted, if it offends the member, or if it pays an inadequate amount for the exposure or incentives. Members may penalize advertisers with charges if they mis-represent an ad or underpay the member. Members with higher credentials and ratings may charge higher penalties for offensive ads. At this step, advertisers may also offer additional credit to members for providing feedback about the ad, such as it's production quality, appeal and effectiveness, over and above the interest the member has in the product advertised. Ads with low ratings may require higher exposure payments throughout the entire Maffle ecosystem or be blocked altogether.

At step 30 members may choose to click or explore ads, which preferably provides them additional credits. Such bonus fees and the default fees are preferably visible with the ad exposure as now described.

Maffle Medallions

Figure 4:
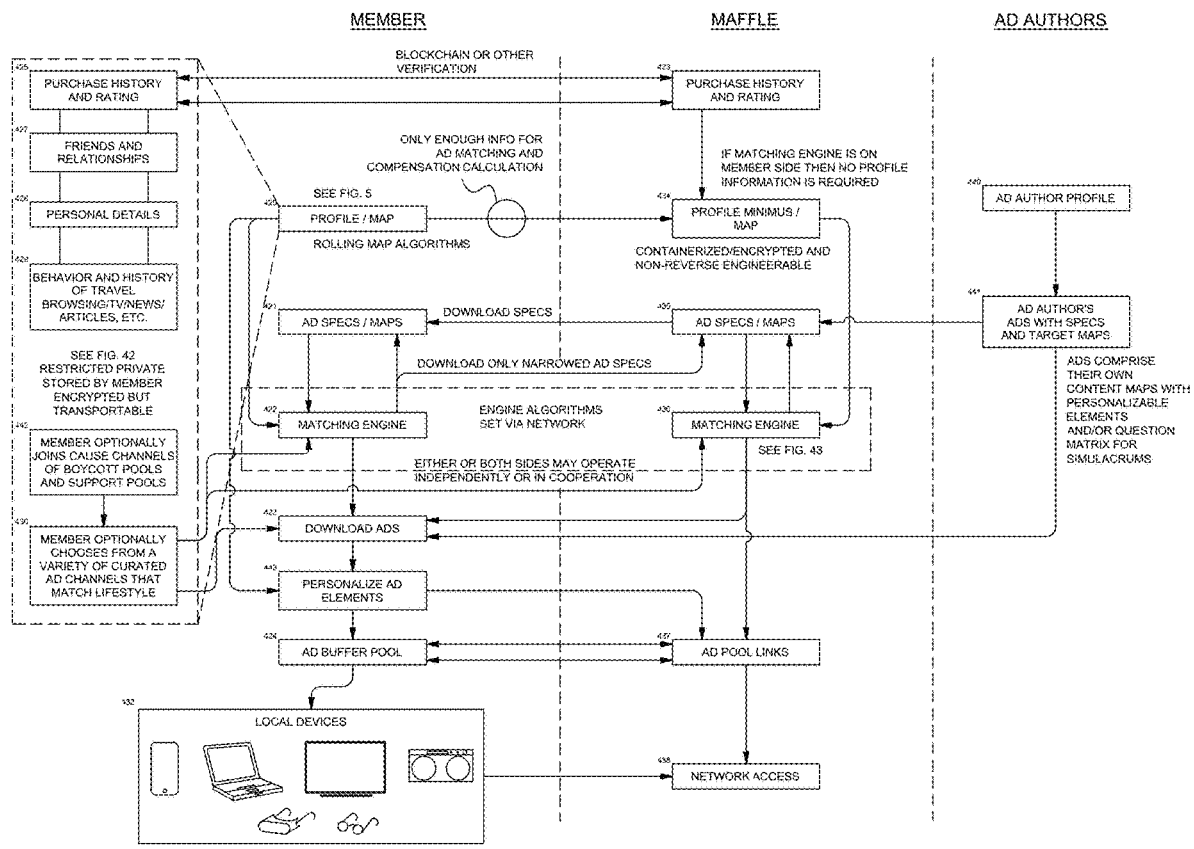
FIG. 4 is a flow chart of filtering and selecting ads to queue for consuming by a member.

Referring now to FIG. 8, which is an image of an ad with an inset Maffle payment MEDALLION 534, a Maffle-sanctioned ad that has been added to the member's ad pool per FIG. 4, which through a preferably computer-mediated, i.e. robotic, negotiation (or data filtering paradigm familiar to one skilled in the art) between the advertiser and the member, determined an acceptable payout to the member for an exposure, is displayed to the member, for example, while they are browsing the internet. As will be described in FIG. 6 and elsewhere, the ad may alternatively appear anywhere within the Maffle ecosystem which comprises the universe of all the possible places an ad or brand logo or name can be exposed to a member.

In the lower right corner of the ad image, a preferably but not necessarily clickable medallion is superimposed preferably over the ad 534. One skilled in the art will recognize all the possible places such a medallion can appear in relation to the ad, such as adjacent to the ad, or partly or completely hidden until hover brings up an information window, etc. Alternately, the medallion information can be displayed elsewhere on the device or on another device. This disclosure relates to the payment and bonus information being made available preferably to the member comprising near the time the ad is exposed, simultaneously, before or after.

The medallion 534 preferably is readily recognizable graphically at small size and comprises the payout amount 535 to the member for the mere appearance of the ad, either preferably in Maffles, or in a government-issued currency. Another payout amount 536 the member will receive upon clicking or further inquiry may also appear, such amount preferably being higher than the appearance amount 535. This incentive amount 536 may be in the form of a bonus such that the member will not collect it unless the member makes a purchase of the product or within the product category. The terms of the bonus rules preferably comprise being negotiated in advance by the robots of the member and the advertiser, or by conventional computational filtering and matching known to one skilled in the art.

Additional icons or indications of further incentives of any number or type, may optionally be presented to the member, such as, for example, a special red-tag sale 537, or special additional bonus incentive 538 as a coin stack, whereby investigating the ad further results in additional payouts. At step 26 in FIG. 3 and described previously, the member may negatively rate the advertiser or request additional payment if such additional incentives prove to be inadequate or falsely presented.

Another aspect of this disclosure is providing a "leave a tip" selection option preferably with the medallion, so members may gift Maffles to deserving artists and entities. Another aspect is a profile setting whereby a tip of a preset amount or percentage is given to a recipient automatically upon otherwise signifying appreciation of the work of the recipient.

Another aspect of the disclosure related to payment medallions is a coin or other icon representing value that appears briefly preferably with a togglable sound signifying a payout into the members balance, when the member takes an action that earns Maffles, such as shooting an unwanted ad in the Moon Hunter game described later. Such "coin banking" may appear for actions taken anywhere within the Maffle ecosystem. Bonus may be paid and coins collected if members make ad-related selections or acknowledgements within certain time frames, and alternately in relation to human-presence testing.

Another aspect of the disclosure described later in FIG. 17 and others, is using ad exposure payments to compensate content producers, preferably in close chronology to consuming the content. For example, while watching a program on television, an ad is shown during a commercial break along with a payment medallion. When the ad concludes, a message comprising a visual, audio or numerical event, preferably related to the medallion, indicates that some or all of the payment credited for the ad exposure is being paid to the content producer.

For audio-only ads, equivalent information may be provided to the member in the form of tones or audio clips, such as informative beeps and boops, and available for further details visually elsewhere on the playback device or on another of the member's devices. For example, a satellite radio player may display digits representing payments in a corner of the text display showing the station and song playing, including a running total of payments collected in the last increment of time such as an hour, day, etc. Maffle-friendly radios are furthermore part of this disclosure as a source of licensing revenue for Maffle. A Maffle-friendly radio comprises a dedicated visual display indicating Maffle ad payments, and optional selectors for purchasing songs and tipping artists. Another aspect of the disclosure is a close-range data connection such as bluetooth comprising transmitting Maffle payment information to a nearby device. See FIG. 41 for additional details regarding radio.

Joining and Using Cont. . .

Returning to FIG. 3, At step 32 credits for ad exposure are added to the members balance, and at step 42, bonus incentives for further exploration or clicking of an ad 536 (FIG. 8) are queued for possible collection based on mutually accepted criteria between the advertiser and the member.

At step 44 the member buys a product related to their profile settings, which updates their profile credentials and improves their rating and potential payment amounts for future ad exposures. Bonuses are collected and may be higher if a particular brand is purchased or simply based on purchase within a particular product category. At step 48 time-limited bonus offers accepted in step 42 are collected and added to the member's balance at step 46 if within the time limits, or expire in step 50 if not. Further ad exploration continues at step 52.

The maximum amount paid to any single member for ad exposures for a product or product category may be limited to match a company's advertising percentage expense against the cost of a product or to a fixed maximum, allowing a company to limit the total percent paid for advertising, or may be limited to the maximum percentage advertising expense for an average cost product for all products in the category. In this manner, companies will not exceed an advertising budget individually or as a market segment, and no member will collect ad exposure payments out of proportion with the value of a product. Payments to members may further be limited over periods of time, factoring in purchase history and consumption credentials.

Currency Conversion

FIG. 12 is a flow chart of converting currency into Maffles (virtual currency) and back into currency. The following description is not intended to be limiting as one skilled in the art will recognize from reading this disclosure other combinations of banking and recording payment transactions using government-issued currency or virtual currency. None of the aspects of this disclosure depend upon Maffle virtual currency or any other form of virtual currency to be put into practice, and may be implemented for example using US dollars, Euros or any other currencies or legal tenders.

At step 157 currency enters the Maffle ecosystem. At step 159, an advertiser preferably transfers payment to Maffle in order to offer ads, which Maffle puts into escrow against accrued ad payments credited to members or any other debit. Alternatively, advertisers with excellent credit may be on account and occur debt that is later reconciled with periodic payments. At step 161, Maffle transfers payment into the banking system and uses it for a variety of investment purposes at 163 such as money market accounts, treasury bills, stock investments, etc. At step 165 the advertiser's payment is converted into Maffles preferably at an exchange rate computed by a fixed formula weighted against US dollars and a basket of stable currencies, preferably updated daily. Since Maffle is a world-wide ecosystem, an agnostic currency valuation is desirable so purchases may be made globally using Maffles, regardless of the daily movement of a particular currency. Furthermore, the averaging of the value of Maffles against multiple currencies provides incentive for participants in the Maffle ecosystem to leave their balances invested in Maffles.

At step 167 the profile of the advertiser (step 440 in FIG. 4) is credited with the payment and carries a balance in Maffles. An alternative embodiment of Maffle valuation is at step 173, where Maffles comprise having a fixed value in relation to a government-issued currency such as US dollars, and additionally, escrowed funds may be insured with funds on deposit at banking institutions. At step 169, Maffle preferably charges a transaction fee as a varying percentage of the amount added to the advertiser balance. Maffle preferably considers the commodity or luxury aspects of the products the advertiser is promoting, as well as the income and purchase history of the members targeted by the advertiser.

An aspect of this disclosure is delaying the computation and declaration to the advertiser of the transaction fee until after the exposure payments for a representative sampling of target members has been negotiated by the robots of the parties or determined computationally, shown at step 170, such fee comprising being higher than an average fee when the target member's incomes are higher than average income, and further comprising being higher if the product is a luxury product. The Maffle currency conversion fee is preferably progressive.

At step 171 members earn Maffles by being exposed to ads and related incentives throughout the Maffle ecosystem in ways further described in FIG. 3 and FIG. 6 and elsewhere in this disclosure.

At step 175 members spend accumulated Maffles to purchase content, goods and services as described in FIGS. 13, 14, 16, 18, 17, 21 and elsewhere in this disclosure. At step 181 Maffle preferably charges the member a variable transaction fee for purchases less than typical credit card fees, for example one percent of the purchase price, such fees preferably being higher for luxury goods and services. Maffle may charge the fees to the merchant instead of the member per typical bank practice.

At step 183 because the transaction fee is less than bank issued credit card fees, the merchant preferably lowers the price when a member purchases the product using Maffles instead of government-issued currency. For example, at step 187 if the merchant reduces the product price by two percent, and the member pays a one percent fee to Maffle, the member still saves one percent off the price of the product. The merchant also saves one percent, since the merchant would have otherwise paid a three percent fee to the bank credit card issuer.

At step 185 merchants and producers accumulate Maffles by selling products to members or between themselves. At steps 179 and 189 preferably when a minimum balance of Maffles has been accumulated by a member or other Maffle ecosystem participant, the Maffles are converted back to government-issued currency (or any other form of currency including other virtual currencies such as Bitcoin or Paypal balances), such exchange rate preferably being calculated as the reverse of that described previously, and transferred back into the banking system. At step 191 Maffle preferably charges a transaction fee for converting Maffles to currency, in accordance with steps 169, 170 and 171 described above in preferably a progressive manner.

Alternatively, no fee is charged for converting Maffles to currency, when fees are charged for converting currency to Maffles and vice-versa. The combination of fees charged at various steps of transferring currency and Maffles between ecosystem participants is not intended to be limiting and one of skill in the art will recognize the many combinations possible based on the entirety of this disclosure.

At step 177 members transfer Maffles to other members preferably without any fees. Such member-to-member direct payments are useful for classified ad-type selling or auction selling, and one aspect of the disclosure is a Maffle auction and classified selling web site, whereby all items are preferably paid for with Maffles with or without listing charges, thereby avoiding typical bank transaction fees. See FIG. 6 step 489.

Ad Matching and Queuing Part I

FIG. 4 is a flow chart of filtering and selecting ads to queue for consuming by a member. The left column labeled "Member" indicates processing and data under the control of the member. The center column labeled "Maffle" indicates processing and data under the control of Maffle, and the right column labeled "Ad Authors" indicates processing and data under control of advertisers.

"Ads" comprise advertisements in any form, brands, logos, and any information about products, services and entertainments, and is not intended to be limiting. Anything about which a calculation can determine a probability of member interest in, may be called an ad for the purpose of describing the aspects of this disclosure.

At periodic intervals, a subset of all the ads in the universe that can be displayed within the Maffle ecosystem are computed and extracted to match the desires of each Maffle member, such that ads within the subset may be exposed to the member upon request or in the course of their normal activities.

Ads are chosen by a computational system comprising hardware and software (robot) using the desires of the member compared against the facts, essence, customer behavior and makeup of individual ads whereby an ad is determined to have a high probability of being of interest to the member and the member is of interest to the advertiser.

The desires of the member are computationally determined using information comprising one or a combination of: information provided personally by the member, such as answers to questions, yes/no toggles, multiple choice answers, numerical information, statements in language, vocalizations, body behaviors, physiological responses or any member input recorded by a device—settings familiar to one skilled in the art as preferences, account information, personal or health history, settings or the like, (see FIG. 3 step 22); member identification with curated life "channels", for example with ads chosen for a certain type of person and lifestyle (step 430); choices made for the member by another person familiar with the member, and as calculated by a computational system (robot) using data taken from the universe of sources that comprises the facts, essence, behavior and makeup of the member, for example records of interne exploration by the member, content consumption, product purchases and public records.

For example at step 430, a member subscribes to the curated channel of a favorite lifestyle magazine that influences the matching engine 422 and 436 regarding product choices for the member's infrastructure, style, and personal efficiency.

At step 420, the profile of the member begins interaction with the Maffle ecosystem. The profile, in continuation of the profile introduced in FIG. 3, comprises the purchase history and "rating" of the member, such rating comprising a comparable scale that is a measure of the member's trustworthiness, timeliness and spending power. The rating may be comprised of scores in many different categories or a summation. The rating may comprise the duration of Maffle membership and other chronological aspects of ad consumption and spending. The purchase history is preferably encrypted and private but verifiable by Maffle at step 433 using a method such as a blockchain so that a member cannot insert false purchases or tamper with their rating, scores and credentials.

At step 427, the profile further comprises their network of friends and relationships, and personal details at step 428, such as facts and figures of their life—place of birth, birth date, gender, physical characteristics, etc. At step 429, the member's behavior and digital history is stored.

The privacy of the member's profile is of extreme importance, so the profile is preferably encrypted and unreadable by Maffle or any agency including governmental agencies, thus preventing hackers from stealing the otherwise centralized data of many members.

Profile Simulacra Part I

Referring now to FIG. 42, which is a flow chart of the quantified personality of an individual POSSESSING a generic AI (artificial intelligence), a member's profile AI is preferably a robotic representation of the member that may be dispatched by the member to perform desired tasks—a SIMULACRUM. The profile and simulacrum therefore require the same privacy protections as the member themselves as the robotic representation embodies as much knowledge as possible about the member and eventually will become a de facto clone of the member as the power of computation and artificial intelligence progresses into the future. Furthermore, the simulacrum requires power-of-attorney and effective co-ownership of the possessions of the member in order to serve as an autonomous representative of the member for all possible tasks, further strengthening the need for the equal privacy protections of a member and their simulacrum and profile.

The preferred embodiment is the establishment of member profiles integrated with evolvable computational constructs that over time, and with the evolution of computers and machine intelligence, may be dispatched to perform autonomous tasks on behalf of the member, such tasks for example comprising building an ad pool of desirable ads. Simulacrums may further comprise mechanical bodies that move and perform physical operations as emissaries of a member comprising detailed knowledge about the member.

This preferred embodiment is not meant to limit in any way the more conventional ways in which a member profile may be used to build, for example, an ad pool. This more conventional approach, still highly useful and commercially viable, is for member profiles and ad specifications to be computationally queried similar to databases to look for matches by an application running either on a network or a member-controlled device.

Furthermore, this description of AI possession does not in any way limit the other ways in which machine intelligence may enhance a member profile, for example, a self-contained AI running as an application on one or more computers under the control of the member, may query the profile data of the member in order to determine the behavior and response of the AI to inputs and to carry out tasks. This configuration may not require containerization for privacy purposes.

Thus, a simulacrum is defined for the purposes of this disclosure as any aspect of a profile subject to computational interaction and is not intended to be limiting.

At step 820, an AI computational model running on one or a network/cluster of computers (computing system) provides a responsive engine that mimics the thought and feeling processes of a generic, average or neutral human or superhuman (there being no reason to limit the capacity of the AI model). The AI comprises language, sensory, motor and numerical inputs and outputs. The AI comprises any number of algorithmic, procedural and neural network sub-processing modules (performing any kind of computation or pattern processing) centrally organized to process and respond at various outputs to any input.

The quantification of an aspect of a particular individual can be seen as the difference between the way the generic AI and individual respond in that aspect. Each aspect of the AI that can be overlaid with this difference in a profile can be called a SOCKET.

At step 821, an interface between the private profile socket settings and the generic AI engine prevents the socket settings from being measured or recorded. Data passing between the primary AI engine 820 and the container engine 821 is preferably encrypted 845.

Containerized Engines and Profiles

Now referring to FIG. 43, which is a diagram of network servers running containerized engines with profiles, two ways of containerizing profiles are shown. One skilled in the art will recognize that there are many possible ways to isolate private data so that computations may be made using the data without revealing it to outside processes.

At 855, a server running a Virtual Machine with an Operating System (VM OS) such as Linux, preferably has multiple containers executing inside the VM, such that each container 856 comprises a private profile and an engine application for reading and interacting with the profile and outside processes at 859.

An alternative embodiment 857, has a server running multiple VM's, each with a single engine application and profile 858.

Profile Simulacra Part II

Returning to FIG. 42, knowledge sockets 822 and any profile aspect that can be reasonably computed by the containing resource can remain inside the container, while, for example, neural network and computationally intensive aspects are computed by the primary AI engine. At steps 825-831, knowledge sockets are stored and made available to the interpretive engine 821. One skilled in the art will recognize all the possible categories of knowledge and facts. The knowledge comprised at 822 endeavors to comprise all the knowledge of the member. The primary AI engine 820 comprises the universe of all knowledge. Preferentially, the simulacrum responds with only member knowledge when important to closely impersonate the member, but with access to all knowledge when that is more beneficial to the member. An aspect of this disclosure is computationally establishing the knowledge known by a simulacrum by subtracting the areas of knowledge defined as not known by a profile from the universe of knowledge preferably comprised within the computational environment.

The preferred profile embodiment comprises a computational module within the container 845 or the primary AI engine 820 that differentiates knowledge a member treats as personal and private, such as income, home address, account numbers and passwords, and knowledge the member would disclose without first requiring a justification from the inquirer, such as general answers about the city where the member lives, pop culture opinions and the like. In this way, a text conversation may be initiated with the simulacrum by a friend, stranger, or recognized entity with escalating levels of trustworthiness to receive private knowledge. Likewise, the simulacrum may be safely dispatched to perform chores for the member with instructions such as "go have my bank transfer $500 from my savings to checking", or "contact First Graft Bank and get their current mortgage rates, but use my junk email account". An aspect of this disclosure is associating a variable privacy value to an element of knowledge of a simulacrum, such that interactions with entities of varying trustworthiness are provided varying degrees of private knowledge based on a trustworthiness value.

At step 823, response and trait sockets quantify the unique way a member responds to all combinations of inputs, such responses comprising affecting linguistic output.

Profile Image Fingerprints

Referring to FIG. 5, which is an image of a profile image FINGERPRINT, matrices of different but related response measurements of a member can be represented as an image 870. Colors and levels of gray form representations of strength fields that may be better suited for computer matching, image recognition, machine learning and interpretation. For example, aspect matrix A at 871 may be the conversion into an image data space, of the physiological response of a member to a series of standardized images of things that create happiness 834 (FIG. 42), modulated by things that create anger 835. Any number of fields with informative combinations of responses can be devised, preferably related to the neurophysiology of humans. For example, categories of responses that happen in a common area of the brain, such as the amygdala can be measured and represented with complementary fields. Many areas of the brain have been mapped as responsive and in control of particular categories. Fingerprints preferably comprise relating responses and traits found together in an area of the human brain, or otherwise neurologically or cognitively related.

Profile image fingerprints can be a stack of aspect images, each of which represents a different personality aspect, labeled as aspect matrices B and C. The stack altogether is the complete fingerprint -matching can take place for sub-images or the combined stack.

The parameter space may alternatively be a three dimensional abstract pattern, as described in more detail later after FIG. 23, and further comprise being animated over time to chronologically represent human responses over time. For example, how long it takes for anger to dissipate for a particular member is used as a response socket for the member's simulacrum. Since the residual state of anger a person is experiencing effects what they say, the decay of emotional states is a necessity for accurate simulacra.

An aspect of this disclosure are human-readable fingerprint tiles comprising topographical images automatically generated using two or more physiological or neurological response measurements of a person to a stimulation. For example, a mosaic of multiple human readable fingerprint tiles may be used to visually match traits of different people with a glance—useful for dating and friend finding.

Profile Simulacra Part III

Returning to FIG. 42, one skilled in the art will recognize that other methods of storing the responses of a member that can overlay a primary AI engine socket to match its response to that of the member are possible, and do not require data space conversion into images. For example, neural net weightings established for a member for a happiness sub-processor may replace or superimpose the weightings in the primary AI engine.

At step 847 profile fingerprints as discussed for FIG. 5 may be used to set socket parameters. Steps 832-839 are examples of responses and traits and are not intended to be limiting. At step 832, an aspect of this disclosure is certain initial member traits and responses set to defaults based on the member's DNA, the genes of which may be correlated with documented traits and responses.

At step 824 (FIG. 42) the linguistic constructs of the member are quantified beginning with their language(s) 842. A mobile phone is capable of storing the transcription of every phrase and word a person will ever utter or write in their lifetime 840, so the vocabulary 841, grammar and phraseology of the simulacrum is preferably derived from the speech of the member as recorded over time. Until a linguistic model for a member is accumulated over time, a curated dialect 846 is preferably used. The evolutionary, computational goal of the simulacrum is to answer any question put to it identically to how the member themselves would answer. In this manner, a text conversation with the simulacrum would be indistinguishable from a conversation with the corporeal original, thereby passing the Turing test. A further aspect of the disclosure comprises modeling the linguistic constructs of a member by storing the difference between how the member answers a question, and how the generic AI answers the question. Another aspect of the disclosure comprises answers made by a member's simulacrum being corrected later by the member, the difference between the two answers thereby automatically modifying the profile.

At 843, the primary AI engine 820 is possessed on demand in rotation by multiple profiles and members, thereby timesharing computational resources. One skilled in the art will recognize that multiple primary AI engines running as independent processes and infinitely scalable may be deployed on a worldwide hardware infrastructure to service a large number of members simultaneously.

An aspect of this disclosure is timesharing generic AI's of varying degrees of intelligence to a group of members, such that all members periodically possess the generic AI of the highest intelligence.

An aspect of this disclosure is increasing the wisdom of a generic AI by: removing the knowledge of a historic problem that had a good solution from a generic AI and from a group of individual profiles; sequentially possessing the generic AI with each profile in the group and asking each possessed AI for a solution to the historic problem; forming a sub-group comprised of the profiles whose possessed AI's provided the correct solution to the historic problem; modifying the generic AI with a common aspect of the sub-group.

Another aspect of this disclosure is simulacra representing groups and organizations such as corporations, institutions, governments and political bodies. No limitation is implied in this disclosure about the type of entity that can have a profile and possess a generic AI.

Ad Queuing Cont . . .

Returning to FIG. 4, at step 440 ad authors create and maintain an advertiser's account and profile in the Maffle ecosystem, further discussed in FIG. 12. A single ad author account may represent multiple advertisers or companies.

At step 441 ad authors register advertisements with Maffle, which comprises access to the ad content, facts about the ad and its author, characteristics and dimensions of the ad, the ad's desired target member attributes and payout matrices, altogether called ad specifications. Payout matrices comprise the negotiable terms the advertiser will accept for payments made for ad exposures to members over the complete range of profile purchase history and ratings, and may include tapering payments to discourage the delaying of product purchases.

The specifications preferably comprise content maps, discussed in detail in FIG. 23, that describe the chronological content of the ad, including text fields, 2D areas and 3D volumes that may be used to personalize the ad at step 443 with information or content tailored for the member as permitted by the member's profile settings and discussed in more detail later in this section.

Ad specs may further comprise ad fingerprints per FIG. 5 that may be used to machine recognize target members based on similarity to member profile fingerprints or image maps. At step 420, fingerprints can be generated using rolling map algorithms so that fingerprints cannot be reverse-engineered to determine private profile elements, but can be published, one embodiment being in the form of human viewable picture tiles in two or three dimensions. The ad specs may comprise questions for member profiles, either in the form of standard question filters searching for a percentage of affirmative answers, or as a matrix of questions to be posed to member simulacrums to determine mutual interest.

One embodiment is in the form of a robotic conversation between a member simulacrum and the advertiser's simulacrum. Similar to the possessed AI discussed above for FIG. 42, ad authors can have profiles that inhabit a generic AI to create a simulacrum of their own. This description is not intended to be limiting, as any form of machine intelligence or computational method that can interact with the data of a body of members to locate ones with attributes in desired patterns is recognizable to one skilled in the art when combined with the elements in this disclosure.

Referring back to FIG. 42, the simulacrum of an ad author is preferably a subset of that of Maffle members, comprising knowledge sockets 822 with the ad specs and delegated with the task of locating appropriate members. Response and trait sockets 823 may be in the form of fingerprints for ads, and traits that reflect the feeling and content of the ad. Linguistic constructs 824 are suitable for the country of origin and interest. Alternatively, the ad author's simulacrum is that of an actual or hypothetical member who is given the knowledge of all aspects of the ad, and tasked with finding suitable members to expose it to per the role of a marketing manager.

At step 435 (FIG. 4) ad specs are made accessible by Maffle to members. Members may download the specifications or condensed headers of the entire universe of available ads for matching on member's devices 421, or download only a subset of specifications or headers based on narrowing filters. At step 422 a computational engine comprising hardware and software (matching engine) analyzes the ad specifications and compares them against the fixed, estimated, computed and manually set desires of the member and target member attributes of the advertiser.

The matching engine generates an AD POOL comprising the subset of ads determined to be targeted at the member and meritorious of exposure to the member. The matching engine may be in the form of a simulacrum(s) as previously described, or as an application running on a local device or network server. A network matching engine under the control of Maffle 436 may generate the ad pool independently or in cooperation with the member's local matching engine. The network matching engine 436 preferably runs inside a private container with isolated access to an encrypted profile. The algorithms used by the local matching engine 422 are preferably updatable via the Maffle network.

The ad pool preferably comprises payment amounts negotiated or calculated for all types of individual ad exposure and exploration by that particular member, the amounts preferably varying depending on the purchase history and rating of the member and the member's profile settings. A member may additionally allow "wildcard" ads to periodically appear that were not selected for the member's ad pool by the matching engine, but at a higher cost to the advertiser. The member may choose how often wildcard ads appear for a satisfyingly unpredictable distribution of ads. The ad pool also preferably comprises ads paying the highest amounts for exposures, other aspects being equal. In this manner, ad authors bid among themselves as an auction for the right to expose themselves to members.

The ad pool preferably further comprises 2D and 3D software models and images of each object or product for superimposition throughout the Maffle ecosystem, for example for placing a favorite car inside a movie per the movie's content map (see FIG. 23), or populating a virtual department store with desired products (see FIG. 9). The software model data may be comprised within an ad's content map as later described or as separate data, and further comprise how-to-purchase or buy-it-now information.

At step 423 the content of the ads chosen for the ad pool are preferably downloaded to cache or buffer space on the member's local device or devices 432, forming an ad buffer pool 424. Examples of local devices comprise mobile phones, desktop and laptop computers, TV's, radios, gaming consoles, watches and wearable devices, digital clothing, human body implants such as bonebuds for audio and eyeball display implants, virtual reality (VR) glasses, and heads-up display technology such as eye glasses and contact lenses, visors, clear handheld screens and windshield heads-up displays.

At step 443 if permitted per the member's profile settings, elements of each ad are identified for personalization and placeholders or target areas replaced with member-specific text, objects or content. For example, a cat-food ad might have a background image replaced with an image of the member's cat taken from their personal photo library, or the color of cars in an ad are changed to the member's favorite car color. Text and voice-overs can refer to information about the member specifically, for example a medical condition. Since the personalization takes place preferably in relation to the private ad buffer pool, the advertiser preferably has no control or access to the personalized information. The personalization may further effect the ad pool links 437 with appropriate privacy protections. No limitation is implied about where the ad personalization takes place prior to ad exposure, for example, step 443 may be performed after step 424 just prior to the display of an ad on a local device and therefore be appropriate for the time of day. Another aspect of this disclosure is providing for an increase in ad exposure payment for personalized ads.

The ad buffer pool 424 is preferably refreshed using background network and computational processes continuously. Links to the ad specs and content in the ad pool are simultaneously maintained on the Maffle network at step 437. The ad pool links at 437 are made available on the internet network 438 for populating for example ad containers on Maffle-friendly web sites being browsed by the member, in particular should ad content not have been downloaded to the ad buffer pool. Ad pool links 437 are preferably encrypted on the network 438 for member privacy.

The ad buffer pool 424 by be further organized by ads that are prioritized to play for example when watching a certain cable network, preferably upon the consent and compensation of the member.

Profile Simulacra IV

Now, the disclosure of an ecosystem comprised of evolvable simulacra (FIG. 42) with immediate usefulness for matching ads to consumers who want to see them and to whom the advertiser wants to advertise, facilitates entire new realms of embodiments some of which are hereby discussed below.

A heretofore unforeseen aspect of the disclosure is the provisioning of perpetual simulacra that may be interacted with whether the modeled member is alive or deceased. One aspect of the disclosure is therefore extracting value from the growing number of simulacra of deceased members. Over time, and given the inevitability of death, the potential of billions of simulacra of deceased members is a virtual certainty. One aspect of the disclosure is the profit model of charging for the costs of maintaining and providing interfaces to deceased simulacra. Such a profit model alternatively can comprise low or negative earnings through the initial period of ecosystem growth until a large enough population of deceased simulacra arise over time. The disclosure comprises charges or value trades in any form to family, friends, estates, governments and institutions in exchange for keeping the simulacra of the deceased "alive". Another aspect of the disclosure, is facilitating a member to "absorb" a deceased member into their account and profile in the form of a parent, child, relative, friend or "ancestor". Another aspect is charging an amount for such absorption, comprising a one-time or perpetual payment in any form. Another aspect is donating a portion of such charges to a charitable cause. Another aspect is maintaining deceased simulacra as an incentive to participate in the encompassing ecosystem.

Another aspect of the disclosure applies to any social media ecosystem and interface, comprising transferring the information and final state of a deceased member's account in the social media ecosystem to another member in the social media ecosystem, in the form of a parent, child, relative, friend or ancestor, and optionally further comprising the step of charging a one-time or recurring fee for providing access to the contents of the deceased's account for any purpose. A further aspect of the disclosure is providing a question-and-answer interface to the account of the deceased, comprising answers from the deceased that comprise information about the deceased, such information comprising text, numbers, images, videos and audio recordings. The questioning aspect is further described in FIG. 45 (more details later in the disclosure), but without the capacity for the corporeal original of the simulacrum to approve the answer per step 901, the original sadly being dead and therefore unable to operate an interface device. Therefore, the living account administrator assumes responsibility for steps 900 and 901 in FIG. 45.

Another aspect of the disclosure is creating a post-mortem simulacrum of a deceased person comprising using text, audio, images and video, historical data and recollections from living persons familiar with the deceased, that comprises an interface for the simulacrum to answer questions.

Simulacra Private Mind Melding

FIG. 44 is a diagram of simulacra privately exchanging information for dating, negotiating, problem solving or other purposes.

A heretofore unforeseen aspect of this disclosure is the computationally private interaction of two or more simulacra delegated a shared objective whereby the information exchanged between the simulacra is undetectable, unreadable, unrecordable and unrecoverable, further comprising a result related to the objective.

This aspect of the disclosure is potentially world-changing because it facilitates positive exchanges between humans to achieve shared objectives in a manner impossible between corporeal humans because of their inability to forget and cognitive weaknesses such as irrational fear, defaulting to distrust, the compulsion to gamble, and the craving to defeat opponents.

Imagine a business negotiation where two parties agree to a mind-meld under the condition that both parties will retain no recollection of the exchange, only the final terms of an agreement. During the meld, the parties expose every atom of their life and knowledge; their deepest secrets and fears; the intensity of every emotion; the most confidential information about their business and goals, and the true bottom lines each will accept as a result. The terms of the agreement will be to the maximum benefit of both parties because no secrets are withheld—no money can be left "on-the-table". After the meld, only the resulting document is retained. Both parties utterly forget everything that happened during the meld. This exact scenario may be obtained between the sanctioned emissaries of individual human beings by using the aspects of this disclosure. Imagine further that the parties are the simulacra of governments in conflict and the political benefits that would bring.

Another wondrous example is in finding a compatible mate. For example a woman looking for a partner tasks her simulacrum with mind-melding individually to the tens of thousands of simulacra of available bachelors. The emissary of the woman and each man safely divulge every possibly embarrassing fact and desire to each other and compare intellectual traits and the deepest emotional needs and abilities to give until the best match is found. Two compatible simulacra can share a merging beyond anything possible between corporeal humans, the beauty being that they can at least attempt to describe what that is like.

Also now imagine hundreds, thousands or millions of like-minded simulacra entering a mind-meld in order to solve a problem, create a work of art or a new kind of experience that can enlighten and inspire corporeal humans.

A lot has been said about the potential evils of artificial intelligence, but this disclosure describes a way in which under the control of a disciplined organization, the best traits of individual humans can dictate the behavior of such intelligence such that it behaves as a good person with an array of expanded powers.

An aspect of this disclosure is the inhibition of evil and malicious acts by a simulacrum by computational limitations placed within a possessable generic AI, such that an evil profile possessing a generic AI will not make the generic AI evil.

This brings up the urgency for a disciplined organization to arise as the authority over the power of popular, possessable artificial intelligences. The danger is not in an autonomous AI doing evil deeds, but in a rich person or corrupt politician who controls a super powerful AI ordering it to do evil. Therefore, the disciplined organization must always have the most powerful AI's in order to out-compute or at least anticipate evil, and preferably the most powerful AI's are timeshared with all profiles so that such power is equally distributed.

Referring now to FIG. 44 at step 865 a match finding or conference is started. At step 866 the objectives of the match or conference are determined and suitable instructions provided to the simulacra. At step 867 the simulacrum 875 is dispatched to look for a match.

The MEMBER column on the left depicts processes under the control of the member, and the MAFFLE column are processes under the control of Maffle.

At step 869 coarse filtered members are queued for conferencing by age, gender, geographical location and the like. At 870 the next member in the queue is loaded. At step 871 the mutual terms and objective for the output are set. At step 872 the private conference is initiated.

At 876 a server comprising a virtual machine running an operating system 880 containerizes 881 the simulacra of the conferencing parties 882, 883 and 884. Each simulacrum may be inside its own separate container. Each profile 882, 883 and 884 independently possesses a generic AI 877, 878 and 879. The simulacra interact within the container(s) 881 to meet the programmed objective 866.

Since the simulacra preferably comprise every quantifiable fact and personality aspect of their respective members, a deep exchange can occur, maximizing the benefits to each party or uncovering the most meaningful compatibilities between prospective mates.

The information exchanged between the simulacra is preferably encrypted, unmeasurable and unrecordable by any process, such that when a result has been determined by the conference participants, the result only is output and any evidence or information generated or exchanged inside the conference is permanently erased.

At 885 example comparison filters and algorithms computationally evaluate facts and aspects of the parties to determine basic compatibility. Such aspects as personal facts and ancestry 886, skills 887, curiosity 888 and other aspects without limitations 889.

At 873 if the match is poor, the next member is loaded 870, terms set 871, and a new conference initiated 872. If the match is good the member is notified 874 and receives the results for further action 868.

FIG. 44 includes steps for match finding. Conferencing does not require the filtered queue 869, loading 870 and match determination 873 steps, and furthermore comprises an unlimited number of simulacra.

Similar steps may be used to find friends and simulacra with shared interests of any kind. No limitation is implied about matching or conference objectives or number of participants.

Simulacra Questioning Interface

FIG. 45 is a diagram of requesting information, taking a poll or asking questions of simulacra.

A population of member simulacra will create a marketplace for soliciting answers of all kinds, such as facts and information, product desires and tastes, opinion polls and the like.

An aspect of this disclosure is requiring payment to a member for asking questions of the member's simulacrum. Another aspect of this disclosure is configuring a profile such that some answers are provided automatically by a simulacrum and payment to a member for their simulacrum providing such answers is collected automatically.

The aspect described applies equally for conventional database representations of the member's data without the provision for a simulacrum and is not intended to be limiting.

The MEMBER column on the left depicts processes under the control of the member, the MAFFLE column are processes under the control of Maffle, and the QUESTIONER column under control of the questioner.

At step 900 the member sets the terms and conditions for answering questions and disclosing facts, information or aspects about the member. Such settings comprise the nature of questions that may be answered automatically and for what minimum payment amount. Questions not approved for automatic answer may be asked by the questioner, but require manually approval by the member at step 901, and preferably a payment for the effort regardless of approval.

At step 908 the questioner maintains a profile with Maffle and a balance 909 similar to that described in FIG. 12, Currency Exchange and Ad Authors Buying Maffles. At step 910 the questioner submits a question to Maffle and specifies a target group of members and conditions. For example, the total budget allotted for the question, a payout matrix based on member credentials and purchase history, the demographics of the members and the like.

At step 907 Maffle receives the question and manages currency transfers and payments to members, subtracting such compensation from the questioner at 909.

At step 904 Maffle computes which members match and accept the questioner's conditions per each member's answer settings 900, and submits the query to those member's simulacra 903 at step 905. At step 901 if the answer is computed to be provided automatically, it is provided at step 906 and the member's balance automatically increased at step 902 out of the balance of the questioner. Since the simulacra comprise the facts, aspects and desires of the members, many questions may be answered without the involvement of the member depending on their answer settings 900.

If the answer is computed to require a manual authorization at step 901, the member is alerted that a question requires a response. The member may approve a response determined by their simulacrum, enter a response or decline to respond and preferably collect payment at 902 regardless of the response, such payment preferably being variable depending on the response. For example, a payment is made simply to ask a question of the member, and an additional payment is offered if the member agrees to provide an answer.

At step 906 the responses are collected and optionally anonymized based on the conditions set by the questioner and permissions granted by the member manually or per their answer settings 900. The collected responses are provided to the questioner at step 911.

An aspect of this disclosure is estimating the payment charged to a questioner based on the computational resources required to ask a question to a body of members.

An aspect of this disclosure is providing credit reporting functions to creditors using simulacra and blockchain-style verification of private information. For example, a member makes a mortgage payment, and the bank has a member account with Maffle and automatically transmits payment information to Maffle, for example similar to step 625 in FIG. 16. Maffle provides the payment information to the member which updates the exposed payment ledger within the private control of the member (whereby the member can privately view the transactions), and creates a preferably hashed record of the transaction in the member's blockchain that preferably does not comprise the data itself, but can be used to confirm the details of the transactions to any party that is provided the details of the transaction by the member, for example similar to step 618 in FIG. 16.

Now, should the member wish to obtain a loan from a creditor and the creditor wishes to confirm the credit rating of the member, the creditor submits a query to the individual member similar to step 910. The member provides confidential access to the creditor to a portion of the member's transaction history. Maffle then facilitates computing a preferably hashed version of the exposed transaction history which can be compared against the member's blockchain to confirm the veracity of the exposed transactions. One skilled in the art will recognize the various ways the blockchain (or forward-only encrypted ledger, chain of hashed data) can be compartmentalized such that subcategories of transactions may be separately shared with third parties and verified. Alternatively, a separate blockchain for each category of transactions can accumulate, for example, mortgage payments and car payments separate from product purchase history, etc. No limitation is implied over the details of the member's transaction history ledger, such as whether verification is distributed or not, the nature of encryption or hashing of transaction information and where it occurs, and where the computation is performed that validates information chosen to be disclosed by the member.

An aspect of this disclosure is providing an interface to utility companies to manipulate the appliances of anonymized member households or obtain usage information, whereby the members are anonymously paid by the utility in exchange for allowing such manipulation or access to information under specified conditions. For example, using FIG. 45 as a similar template, the member's households comprise appliances and tools each with a network interface popularly described as the Internet Of Things (IOT). Maffle provides a common anonymizing interface for the IOT to protect the privacy of the members, such interface for example being built into a Maffle TV, the TV already comprising various short range networking hardware and in communication with Maffle.

Maffle may then present to a utility member groups in the form of neighborhoods or regions such that the utility pays members to cycle for example their air conditioners on a hot day without the members having to grant network access to their household or divulge anything about their personal activities.

Another example is payment to members for allowing access to certain anonymized information about the patterns of usage of their IOT, similar to the sequence described above for FIG. 45, steps 900 through 911.

Maffle for example could provide either hardware componentry or a specification for short-range communication with the Maffle TV, which then provides the IOT interface for commercial use, the benefit being that the IOT devices are not themselves taking up wasteful bandwidth on the internet, nor an IP address, nor are they vulnerable to malicious attack.

Tasking a Simulacrum

FIG. 46 is a diagram of issuing commands to a simulacrum and intervening with a human presence testing requirement.

A simulacrum can be delegated to handle many tasks on behalf of a member, such as approaching sales people electronically, asking service and technical support questions, booking and scheduling, searching for information, accessing content, media or data, etc. Ultimately, simulacrums with a mechanical body can perform physical tasks for a member such as cleaning, retrieving and putting away objects, or running errands by operating a vehicle. A simulacrum may further comprise being itself a vehicle. More than one simulacrum of a member may be in operation at a time, or a simulacrum may take on differing forms virtually or physically at different times to suit the desires of the member.

Once a member has been modeled for AI possession in their profile, the profile may be utilized, transported between or duplicated on various devices and in varying degrees of intelligence.

A simulacrum delegated for a task can pause and send a query to its owning member when it encounters a situation that only the member can answer.

At step 920 a task is described and initiated by a voice command, a string of text physically written or entered into a device, a body gesture, a thought pattern, an eye movement or a physiological measurement. The task may be triggered automatically at a scheduled time under prescribed conditions. The simulacrum 925 is provisioned by possessing a generic AI and initiates the task. At step 926 the simulacrum 925 interacts with a task and knowledge network, preferably the Maffle ecosystem in combination with a worldwide network. At step 921, if the task can be completed without human intervention, the task is completed autonomously, and returns a result if necessary or requested by an audio, text, visual, physiological or other method.

At step 921 if the task requires the intervention of a human, an alert is provided to the member at step 922 that an action is required. At step 923 the member provides the necessary action, such as providing information not available in their profile either by omission or for security purposes, interpreting an image such as a distorted text string, supplying a fingerprint, a retina scan, a visible or IR image, a vocalization or a physiological measurement.

At 925, the simulacrum resumes the task and repeats step 921 until the task is complete at step 924.

Exploring Ads Part I

FIG. 6 is a flow chart of exposure to and exploring of Maffle-curated ads, comprising technology, materials, locations and activities. At step 445, a suite of software and hardware endeavors to prevent the unwanted exposure of any form of brand or advertisement for which the member will receive no compensation.

At step 447, incoming network bits undergo deep packet inspection looking for links, images, data of ads, or any unwanted network data, and are subsequently inhibited from display or communication. At step 448, preferably a Maffle-configured hardware router or firewall is remotely updated by Maffle with blacklists and whitelists flagging data for passing or inhibiting.

Blocking Ads

At step 449 and door 22 at FIG. 7, we emerge at step 520. FIG. 7 is a flow chart of blocking unwanted ads on a local device or network. At step 521, individual images are analyzed for ads and brands, or entire web pages are pre-rendered and analyzed at step 522 before display. Such images may comprise having an ad or brand that is embedded in the image located, sized and targeted for superimposition or blurring to make the ad or brand unrecognizable, while displaying the remainder of the image. Ads or brands are blocked or inhibited per blacklists or wildcard strings at step 523 prior to display to the member.

At step 524, Maffle computers spider the interne and maintain data on any number of websites comprising information on ads, brand use and layouts preferably for devices of different formats and aspect ratios. Such data preferably comprises not storing or transmitting any intellectual property. Such information may be uploaded to member devices to assist with blocking ads and brands on spidered sites the member is visiting. At step 525, site URL's a member is visiting are confidentially and automatically uploaded to Maffle in real time. Maffle computers render and analyze web pages preferably simultaneous to member visits, uploaded blocking information just prior to page loading on the member's devices. Since Maffle's computers are preferably faster both in connectivity and processing speed, page analysis for blocking happens preferably transparently for the member. At step 526 the member device uses Maffle network data to block or mask ads and brands and optionally assist with page formatting.

Exploring Ads Part II

Another aspect of this disclosure is maintaining boycott pools of advertisers, brands and companies that maliciously attempt to expose ads or brands to Maffle members without compensation, henceforth referred to as MOONING, as an incentive to work in cooperation with Maffle and her members. Companies that moon members ad funds to a debit account linked to the company that should the company ever become Maffle-friendly, must be repaid in full. An aspect of this disclosure is computing a nominal exposure fee for ads not yet registered within the Maffle ecosystem and crediting Maffle members for all exposures, such credits to be paid upon the advertiser or company joining the Maffle ecosystem.

A further aspect of this disclosure is a "Moon Hunter" game for members, such that ads and brand marks from the companies in the boycott pool are put on alert for special incentives and rewards to members for flagging and blocking such ads and brand marks when they moon members.

Another aspect of this disclosure is the blocking from shopping sites the products and services produced by the boycotted companies and advertisers. For example, at step 453 as a member browses internet stores, the blocking technology described in FIGS. 6 and 7 inhibits any data facilitating the purchase of any content, good or service of a boycotted company, i.e., the company's products simply never appear on a shopping site to purchase. Moon hunting may also comprise a mobile device photo of a sign or billboard.

Another aspect of this disclosure are channels of curated boycotting pools supporting various causes shown at step 442 in FIG. 4. A member joins a CAUSE CHANNEL, and automatically and for example, all ads, brands and products from the companies, entities or governments in the boycotting pool of that channel never appear to them within the Maffle ecosystem, so they can never accidentally buy a product from a company who behaves in a way in which they do not approve, such boycotting comprising optionally being toggled on and off. Ads for boycotted companies never appear to the member, even if they would have been otherwise added to the member's ad pool by the matching engines at steps 422 and 436 in FIG. 4, the boycott channel selections being an input to the matching engines or a filter upon the outputs.

The cause channels at step 422 further comprise companies whose products the member wishes to prioritize over other companies within that product category. Such prioritized companies then appear more often or in better positions wherever possible throughout the Maffle ecosystem. Channels may comprise both boycotted entities and supported entities. The boycotted or supported content and information is without limit, comprising text, images, videos, programs, audio, etc. One example of boycotted content would be a member choosing to boycott fake news. The Maffle ecosystem would then endeavor to prevent all fake news from reaching the member. This is possible because content is mapped by Maffle prior to exposure to the member. See FIG. 23 described later in detail. Curated channels are edited by Maffle or by any individual or entity authorized by Maffle, such as a charity or non-profit organization, but no limitation as to how curated channels are edited is implied.

At step 450 and door 24 we return to FIG. 6. At step 446, audio analysis identifies ads in audio streams using speech recognition of key words, machine recognition of the elements of advertisements comprising level and compression changes, vocal or musical cadence, and timing of occurrence of the elements, fingerprint matching of any combination of inflection points, frequency combinations or level changes or spectral analysis, to a database of fingerprints, or timing of the placement of ads embedded in a parallel data stream in any format along with the content, or in a network stream or file uploaded in relation to the content. Such audio ads are muted or superimposed with Maffle curated ads or content or content from the member's library. Maffle curated ads are preferably accompanied with an audio tone or clip indicating payment received by the member from the advertiser, or the credit appears elsewhere to the member, for example on a mobile device. See FIG. 41 describing more details about radio.

At step 452, the ad pool matched for the member per FIG. 4, is made available either as cached or buffered local data, or as links to network data.

The following description of the remainder of FIG. 6 is an overview of some of the possible ways members may be exposed to ads and is not intended to be limiting. One skilled in the art will recognize the universe of all the ways a member may be exposed to an ad in the digital, virtual, physical or audio realms. Additional detail about some of the exposure categories will be described in subsequent figures.

Browser

At 453 a Maffle web browser comprising a commercially available browser with one or more Maffle-aware plug-ins, or Maffle-specific browser application programmed by Maffle with built-in Maffle functionality, provides Maffle services during the normal Internet and web activity of the member.

To be discussed later, members define the breadth of content they wish to see and that they wish to never see. Such desires extend to every medium under Maffle's influence, including browsers. For example, if the member wishes to never again see, listen to or hear about a Mr. Drinkwine-Blinkhorn (hereafter D-B), than all images or videos containing D-B will either be not displayed, or have D-B blurred or masked within the image and his voice muted or replaced with other audio. Text referring to D-B may have selectable levels of inhibition, such as blocking the entire article, blocking specific sentences referring to D-B, or blocking individual unwanted words or the name D-B.

Members may optionally choose to have artistic content placed in containers, which may be free to the member. Cartoons, artistic photos, paintings, images, photos of sculpture, anything decorative. Clicking on such items provides more info, may reward the artist with maffles (default or chosen amounts). An "inappropriate" button charges the advertiser for mis-categorizing art/decoration as advertisement or if the content is otherwise offensive under the member's profile choices.

At step 454, a Maffle-friendly interne store preferably presents only the goods and services specified by the visiting member's profile at step 455, and only advertisements for such products. Products preferably are paid for with Maffles, and ad exposure credits accumulate during the visit to be applied toward a purchase. Within the site, the member may browse all the ads from various manufactures for a product within a specific category. For example, when the member visits the refrigerator section, they are offered to browse, as a group, ads in the form of sales pitches from each manufacturer of a refrigerator for sale. They are compensated for looking at each sales pitch or ad and offered various incentives. When they choose a refrigerator, they collect the various incentives. The member may collect a further incentive for sharing their purchase choice with one or more of the refrigerator manufacturers, and collect even more Maffles for answering marketing questions to help refine the products. Maffle preferably anonymizes the answers.

Since the refrigerator ads in the member's ad pool have been confidentially buffered and determined in advance, the ads can be confidentially presented to the member via containers in the internet store without disclosing to the store which ads are being offered. Similarly, the entire store may be filtered at the browser or local device so that the store can't detect which products are being muted from display to the member. Another aspect of this disclosure is having an internet shopping site served from Maffle itself, so that member privacy is strictly maintained.

At step 456 a merchant preferably registers their product site with Maffle, so that automatically upon visiting by a member, ads in that product category are activated/buffered/linked for display until a product in that category has been purchased. See steps 612 and 613 in FIG. 16.

Auction and Classified Ads

At step 489 Maffles may be exchanged between members preferably without transaction fees for exchanging goods and services on an auction and classified ad web site.

Email

At step 458 members may choose to display ads while emailing and texting. At step 490, the member's simulacrum is activated to automatically respond in the stead of the member. As discussed previously, a deceased member can continue to email and text indefinitely via their orphaned simulacrum.

Print Targets

At step 459 and also referring to FIG. 11, Maffle targets 554 printed on physical media (also described in detail later per FIGS. 34, 35, 36, 37, 38, 39 and others) are optically or electromagnetically readable and serve as containers for superimposing member profile-sanctioned information such as ads from the member's ad pool. For example, the member may use a pair of heads-up eye glasses, contact lenses or optical implants with overlaid image display running a software application while reading the printed page. The camera built into the glasses provides an image to the application. The application identifies the Maffle targets 554 and 555 and places ads from the ad pool over the locations on the printed page, adjusting for obliquing angles, warp and scale. A payment medallion or notification is displayed to the member 462.

Maffle targets may comprise unique fingerprints 555 to further narrow what is superimposed, for example an ad pool ad from a specific producer who pays the member a high, pre-negotiated payment for showing their particular ad 462. The example at 555 uses a decorative concentric ring pattern with two variables per differential to define a unique fingerprint, the offset distance from the pattern origin, and angle for the direction of offset. The pattern features fixed maximum rates of change of offset and angle.

No limitation is implied about the unique pattern specification, and an aspect of this disclosure is using visually harmonious and appealing unique images as Maffle targets, such images comprising art, photography, graphics and people.

Another aspect of this disclosure is blocking unwanted printed ads, content and information using superimposition on the heads-up display of a reading device, for example eye-glasses. For example, similar to step 445, ads and brands visible on physically printed material may be overlaid with ad pool content, or any alternative content the member specifies, such as family photos. Another example of viewing superimposed content or data is via a mobile device with a screen and a camera.

No limitation is implied about where the pattern-triggered information is displayed, for example, the information may be displayed in a static location in the corner of the display, in a separate window or on another device.

At step 460, members may agree to disclose to publishers information from their profile about which product categories and brands they are interested in. Such information may then be used for bespoke printing on a member-by-member basis, comprising ad pool content merged with general content. For example, a member receives a Sunday newspaper where all the printed ads were chosen for them from the their own ad pool. In an alternative embodiment, newspapers, brochures, catalogs and magazines are printed for members of an ad channel or cause channel, rather than on an individual member basis.

Because a member's ad pool may be locally cached or buffered, ad superimposition can be accomplished on a mobile device practically instantaneously once a Maffle target has been optically recognized.

Examples of content and information that may be specified by the member to be superimposed over targets or unwanted areas include but are not limited to: product photos and 3D models, dating photos, art, family photos/videos, learning and education lessons, calendar reminders, video conferencing, game characters and rewards, and puzzle clues. These examples apply equally for appearance throughout the entire Maffle ecosystem.

Ad Viewer App

At step 463 a Maffle application is provided for viewing and managing the member's ad pool. A member may prefer to ingest and get credit for ad exposures by doing it in blocks of time, rather than distributed among their normal activities. One aspect of this disclosure is providing an application for sequentially viewing and collecting credit for ads from an ad pool. Another aspect of this disclosure is providing for the purchase of the advertised product from within the same application preferably comprising paying with Maffles 466. The member may reject, rate and manage their ad pool from within the application, and enjoy the ad pool like reading a well-designed catalog or brochure 464. The application 463 may further allow the member to modify their profile to improve the nature of the ad pool.

Inside Other Apps

At step 467 applications by developers other than Maffle may enable their applications to display member-specified information, information from the ad pool, or interact with their simulacrum. An aspect of this disclosure is providing an interface to developers to interact with the simulacra of Maffle members from inside an application.

Social Media

At step 468 Maffle members interact with each other individually or in self-selected groups. The social network is accessed via a browser or an application on any applicable device. Communication from other members may be specified by a member for display anywhere within the Maffle ecosystem, such as browser containers, television and radio commercial break time, or superimposed over unwanted material.

Containers may be optionally filled on occasion and per profile settings with content from the member's friends on their social network. The network is preferably the Maffle network, but can be provided by an outside social network. Outside networks may pay Maffle to place their content in Maffle containers and incur further charges for clicks on the content. Preferably, outside networks are blocked from placing any ads of their own into Maffle containers.

For example, the member may choose to have messages from the friends of their choosing appear somewhere within their Maffle environment once every 30 minutes. One skilled in the art will recognize the array of configurable options for determining which messages may appear.

An aspect of this disclosure is delegating all or some portion of social interaction to a member's simulacrum. At step 490 another aspect of this disclosure is shown, providing a web interface or application interface so that unfamiliar entities may ask questions of a member's simulacrum and receive a member-moderated robotic response 492. At step 491 an aspect of this disclosure is perpetuating the orphaned simulacra of deceased people comprising the simulacrum of the deceased having a question and answer interface.

Mobile Mob Motion

At step 469 and determined by the privacy settings of individual participant members, groups (i.e., MOBS) of Maffle members may allow their ad pools to be statistically analyzed as a collection, comprising finding a subset of all the ads in all the ad pools that are likely to be of interest to the largest number of members in a group within a geographical region and of interest to the group as a whole and creating a MOB AD POOL. Based on the individual member locations, which can be determined by GPS or other triangulation and shared peer-to-peer or over a network, a centroid geographical location of the group may be computed 470. The mob ad pool may be further enhanced by added information to the ad pool comprising activities, stores, people, infrastructure, traffic, entertainments and the like near the calculated centroid of the group 470.

The mob ad pool is made available within the Maffle ecosystem to each member of the group. For example, a group of friends and relatives visiting a city comprise a high percentage of vegans. Maffle confidentially computes the high number of vegans based on the summation of the eating preferences of the group, and locates vegan restaurants near the moving centroid of the group. Maffle places information about the restaurants into the mob ad pool, which can be seen by each member of the group. Maffle alternatively sends an informational message via text, email or application to one or more of the group members.

Movies

At step 472 movies with Maffle content maps as described later in FIG. 23 and others, can superimpose, enhance or display information to individual members based on their profile settings via heads-up devices, such as glasses or virtual reality headgear 473, contact lenses, implants or screens. A sophisticated example is a street scene, whereby the content map indicates the moving coordinates in three dimensions of a car passing by. An actual car may or may not be visible on the recorded media. Each member of the audience wearing a virtual reality headset sees a different brand of car drive by depending on their profile settings, and collects payment in Maffles that they may review later, being able to toggle off the display of the Maffle medallion.

Radio

At step 474 audio ads in the ad pool are traditionally interspersed with content as described in detail later per FIG. 41, or at step 475, listened to using an audio ad playback application, such as per step 463, or on a dedicated "infomercial" channel that plays only ad pool audio ads, such ads comprise being played back from a locally buffered storage location or on a network.

Public Target

At step 476 and as later describe in FIG. 35 and others, Maffle targets may be displayed on a person. While celebrities may contract with Maffle or companies for compensation for wearing Maffle targets, individuals may wear Maffle targets on their person and receive payment automatically each time their target is used as a display surface 478 whether by another individual member out in public, or at a broadcast event where the target is visible to recording devices, which is another aspect of this disclosure.

At step 479 a unique optical code is printed either in conjunction with a generic Maffle target, or as a unified target comprising a unique image recognizable as a Maffle target and related to an individual Maffle member.

Another aspect of the disclosure is relating the GPS or location coordinates transmitted or otherwise recorded by the mobile device of a member to coordinates based on the geographical location of a camera, it's direction of aim, field of view and focus depth, such that the individual member can be identified 479. A further aspect of the disclosure is additionally computationally recognizing a Maffle target on the individual, and storing the information relating the ad exposures made to other member's by the appearance of the Maffle target on the individual. In this manner, the individual may be paid a percentage of all credits paid in relation to the appearance of the Maffle target on the individual.

The public target furthermore may be in the form of a sign or object carried by or mounted on the person or on their vehicle, or on or in relation to their place of residence or business.

A further aspect of this disclosure is that if a member watching a broadcast or content event in which another member has a public Maffle target, and the watching member and target member are socially known to each other and have suitable privacy settings, information related to the target member is displayed to the watching member. For example, a member named Matilda watching a Green Bay Packers football game on television, will see an arrow pointing to her friend Elroy as the camera sweeps across Elroy in the crowd wearing a Maffle target (and face painted green and gold), and a popup appears on the display with a personal message from Elroy to Matilda saying "Beer after the game?".

Another aspect of the disclosure is providing Maffle transponders 480 to individuals that in conjunction with camera position and aim information assist in computing the identity of the individual carrying the transponder. Maffle content is displayed related to the individual, and compensation is made for the various exposures to other members.

Billboards and Signs

At step 488 and as described later in FIG. 10, a Maffle target on a physical sign or billboard viewable in public displays ad pool content or other information when viewed through a suitable device, such as heads-up glasses, transparent-screened mobile devices, the camera of a mobile device and the like. The content displayed may be further filtered using the geographical location of the member for example advertising the products available in a nearby store.

Another aspect of this disclosure is that the billboard or sign target may itself be in the form of an advertisement with a unique design (an image learned and stored by a machine), such that the sign looks conventional when viewed with the naked eye, but is recognized by Maffle-enabled hardware and used for overlays/superimposition when viewed with a suitable device.

Another aspect of this disclosure is for signs described above, members collect extra bonus payments from the advertiser of the physically displayed sign content for NOT having the sign superimposed or overlaid by another device.

Search

At step 482 ad pool content is displayed when search terms relate to the content or key works of an item in the ad pool 483. Members may automatically add goods, services and content entered into the search terms as items to include in their ad pool.

Games

At step 484 a game is made of finding ads or information in secret locations only revealed using a device such as a mobile device with camera or transparent screen with a heads-up display.

Maffle targets or containers are embedded inside of games so that Maffle content may be displayed while playing.

Maps

At step 486 map applications and GPS driving direction units relate the geographic location of ad pool products, services and entertainments to the region of the map being examined. Items of interest in the ad pool appear on the map, and related Maffle-aware stores 489 are indicated.

3D Virtual Worlds

Computer environments in both 2D and 3D may comprise Maffle content maps as described later in FIG. 23 and others, and contain Maffle targets for overlays and superimposition as described in FIG. 9. Two and three dimensional models of products may be placed inside the virtual environment at predetermined locations, and members collect Maffles each time an ad pool product appears.

An aspect of this disclosure is a virtual shopping mall comprising displays of goods, products, services and entertainments in the ad pool and as per the member's profile settings. For example, a member enters a three dimensional room and products within their preferred profile product categories are displayed on the walls. The virtual shopping mall further comprises the ability to place items into a shopping cart for later purchase.

Spending Credits

Figure 13:
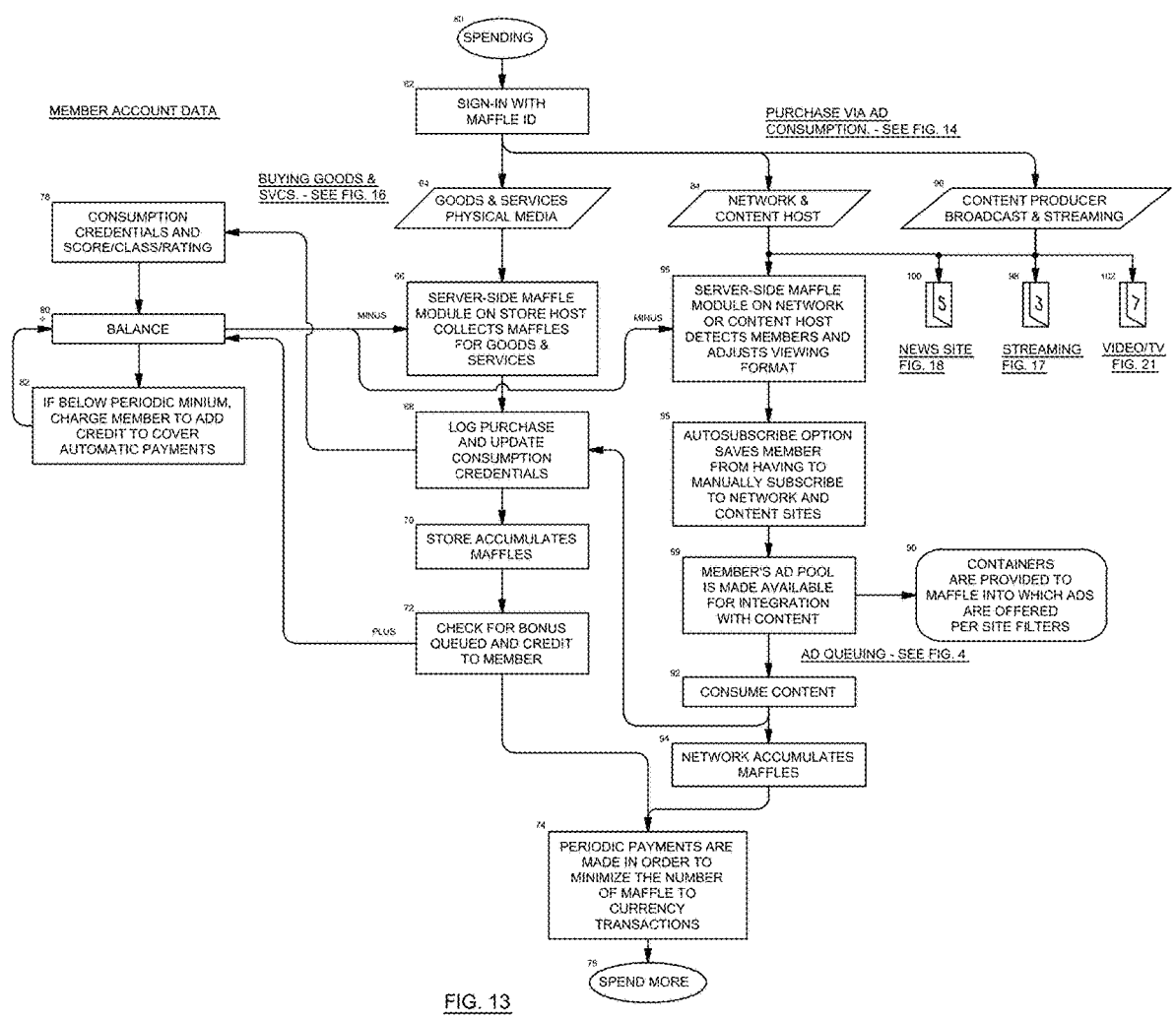
FIG. 13 is a flow chart of spending credits.
Figure 14:
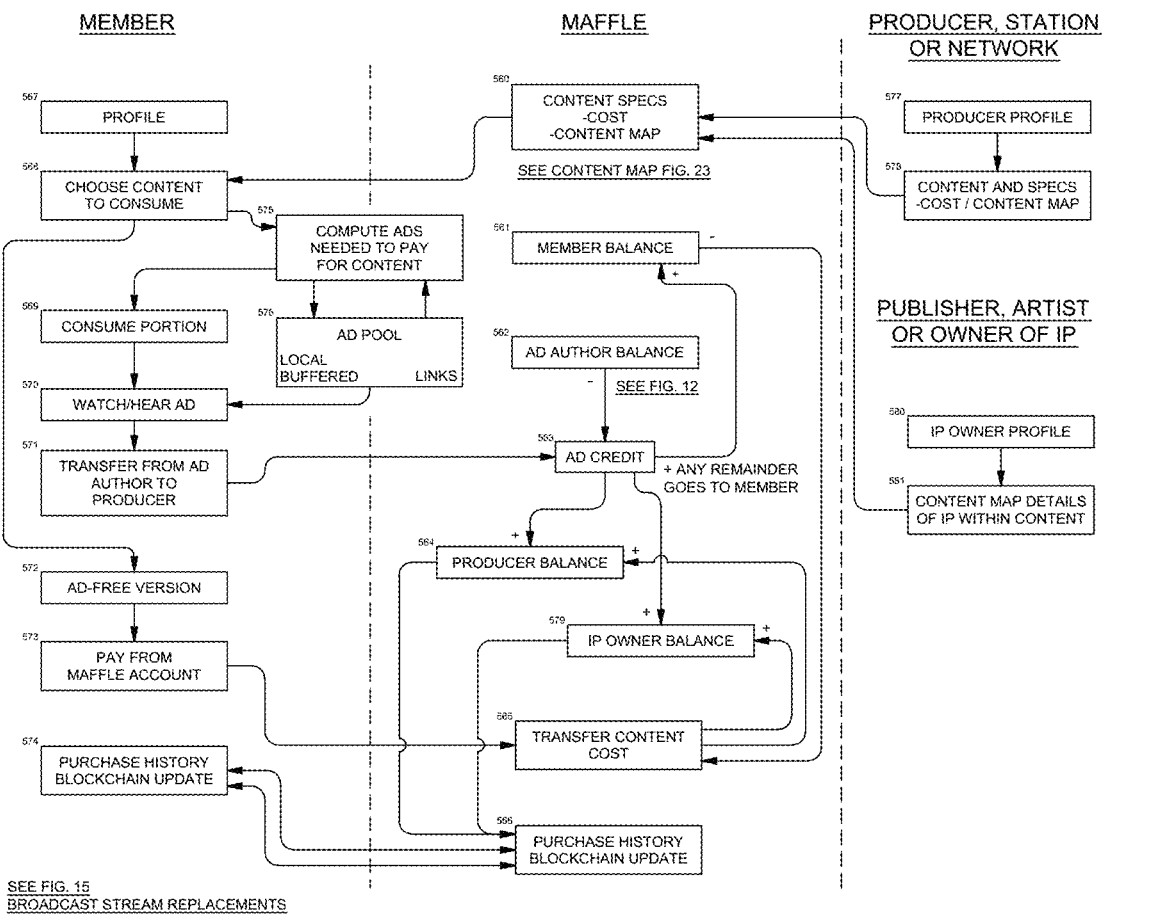
FIG. 14 is a flow chart of purchasing content via ad consumption.

FIG. 13 is a flow chart of spending Maffles. The concept of Maffle virtual currency is not intended to be limiting. One skilled in the art and upon examination and comprehension of this disclosure will understand all the options of accumulating and spending credits in both government-issued currencies or virtual currencies. None of the aspects of this disclosure depend upon Maffle virtual currency or any other form of virtual currency to be put into practice, and may be implemented for example using US dollars, Euros or any other currencies or legal tenders.

At step 60 spending is initiated and the member signs into the Maffle ecosystem at step 62. The member purchases goods services or physical media at step 64, which is further described later in FIG. 16. At step 66 on an example interne store, the member adds an item to a shopping cart and checks out. The store accepts Maffles, which are transferred from the member to the store merchant at step 70 and subtracted from the member's Maffle balance at step 80. If a preset minimum balance of Maffles in the member's account is reached 82, currency from, for example, the member's bank issued credit card or funds transfer from their bank account is converted to Maffles and added to their balance 80.

At step 68 the store notifies Maffle automatically or manually of the purchase details, which update the purchase history and consumption credentials of the member at step 78, such history and credentials being recorded such that the member cannot falsify purchases, typically by storing purchase records in parallel on Maffle computers and member devices, preferably in an encrypted form. Checksums and blockchains are examples of ways to verify that files have not been tampered with.

At step 72 any bonuses or incentives queued for the purchase category or specific product are banked to the member's balance.

An example general description of a member automatically paying for consuming content on a network now follows beginning at step 84.

At step 86 a Maffle-enabled network or content host (hereafter network) detects that a Maffle member is accessing content, for example by communication between a server-side service on the host and a browser plug-in or previously registered browser cookie, and optionally adjusts for member profile preferences.

At step 88, the member having set autosubscribe options in their profile (as described further in FIG. 18), and the network's negotiated charges falling within the acceptable terms per the option settings, the member is transparently granted access to the content of the network. At step 89 the member's ad pool is accessed for integration with the network content.

At step 90, the network provides its content along with containers or other information specifying locations for displaying Maffle information, such as ad exposures. The network optionally may set filters limiting the Maffle displayed information, for example, a family-friendly network may place restrictions on the products that may be displayed with the network's content so that all content displayed to the member is family-friendly. The member may optionally set their profile to decline access to the network based on such restrictions.

At step 92 the member consumes the network content, and the network collects Maffles 94 either by payments from the member's balance for ad-free content, or by chronologically related payments made to the member for ad consumption and comprising diverting some portion thereof to the network per FIG. 14 described in detail later. At step 74 the network periodically converts Maffles to currency per FIG. 12.

At step 96 the member accesses content directly from individual content producers or from aggregating broadcasters. A digital newspaper site is described at step 100 and FIG. 18, a streaming service at 98 and FIG. 17, and television or video services at step 102 and FIG. 21.

Buying Goods & Services

FIG. 16 is a flow chart of a member buying goods and services, and is a further embodiment of spending as described previously in FIG. 13.

At step 621 a merchant profile registered with Maffle provides interaction with the Maffle ecosystem and the merchant hosts a Maffle-friendly store on the internet at step 622, or alternatively provides a physical store the member may visit in person and transfer Maffles electronically using a point-of-sale device such as a card reader, optical scanner, product transponders or short range wireless protocol such as Bluetooth combined with a mobile device. One skilled in the art will recognize the many ways the member's balance of virtual currency may be transferred in person to a merchant at a physical store.

At step 608 the member browses the store, and optionally per profile settings, automatically triggers the exposure of ads for product categories or brands featured on the store at step 612. At step 609 the member purchases an item from the merchant, which subtracts Maffles from the member's account at 616 and 614 and adds them to the merchant account at 617 and 615. Alternatively, the transaction is conducted using government-issued currency. At step 623 the sale is confirmed by the merchant and the product distributed at 624 to be received by the member at step 610. At step 613, ads related to the product purchase are optionally disabled per member profile settings.

At step 625 the merchant store preferably automatically notifies Maffle of the purchase details, such as product SKU, price and quantity. In this example, Maffle updates at step 618, the blockchain purchase history of the member, and updates the member's profile 607 purchase history 606 and credentials to match. Preferably the purchase history and credentials are encrypted and confidential to the member but impossible to tamper with.

Making a purchase optionally causes a recalculation of the ad pool per FIG. 4, so that an increase in the member's purchase history and credentials/score/rating might be reflected in higher ad exposure compensation.

At step 626 the merchant preferably periodically requests a transfer of Maffles to currency, which happens at step 619 to a bank or other agency outside of Maffle at step 620. At step 611, the member preferably periodically converts Maffles to currency for transfer to an outside agency.

Purchasing Via Ad Consumption

Figure 15:
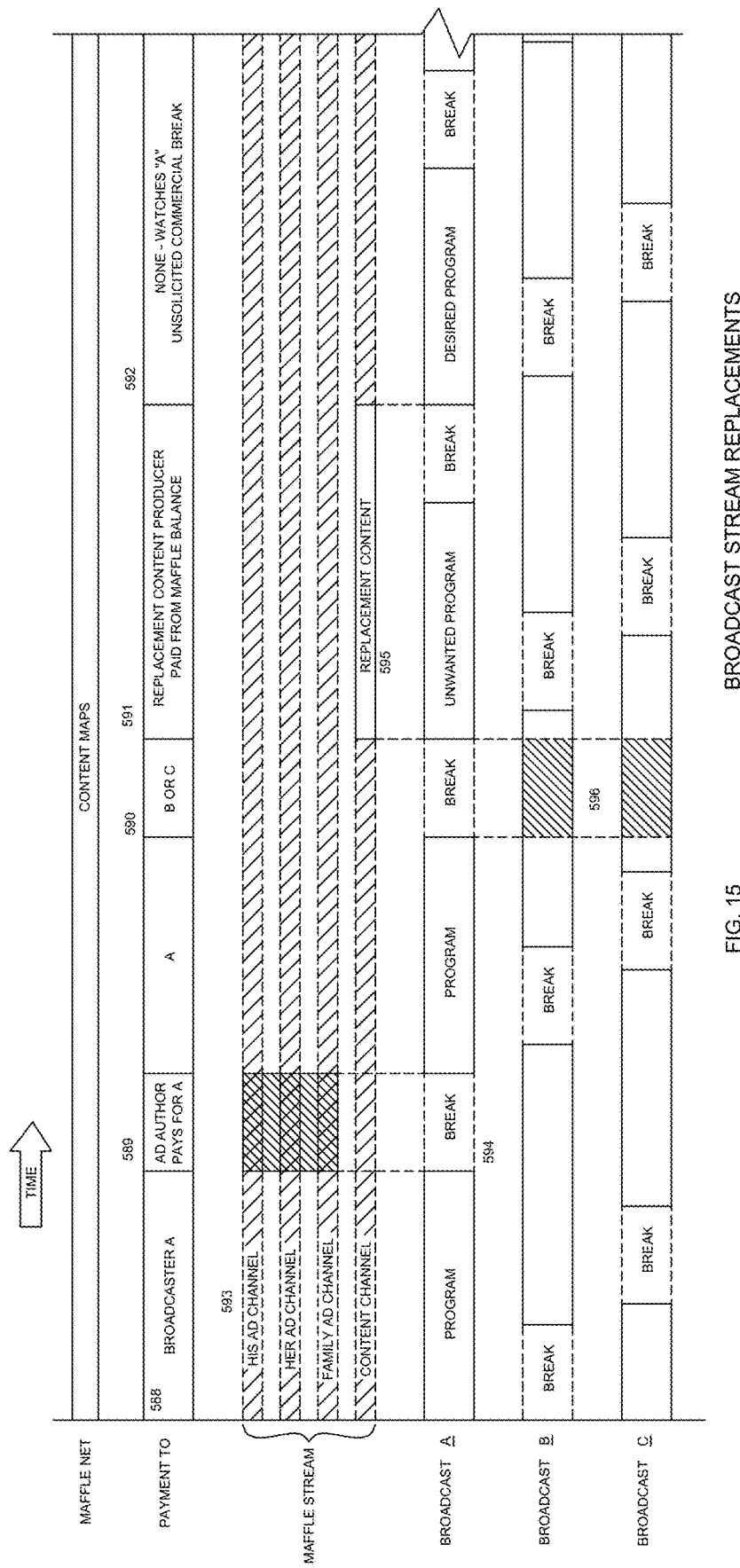
FIG. 15 is a timeline of broadcast stream replacements and payment allocation.

FIG. 14 is a flow chart of purchasing content via ad consumption. This description for FIG. 14 more generally applies to content chosen for a one-time consumption with a specific cost, such as a motion picture. FIG. 15 as described later is related but refers to a typical television watching experience switching between multiple channels of ongoing content.

At step 567 the member enters the Maffle ecosystem and evaluates content to consume 568. As described in detail later in FIGS. 23, 24, 25 and others, the member preferably uses their simulacrum with content maps to assist in choosing content to consume, such choices comprise being generated automatically based on the member's profile settings compared against the universe of available content. Any conventional way of choosing content is also available, such as television guides both digital and printed, movie information sites and the like.

At step 577 a producer with a Maffle account and profile publishes content preferably along with a content map 578 as describe in FIG. 23 and elsewhere.

At steps 568 and 575, the member preferably sees in advance the cost of consuming the content, and the number and duration of ads required to consume the content without cost to the member. Alternatively, the ads needed to pay for the content are computed after the choice of content is made, and options are available such as putting limits on the total ad time, whether or not the member has to make up the difference in content cost out of their existing balance. An alternative option is specifying that the total payments earned from the ad exposure exceeds the cost of the content. Another alternative is the option to pay a prorated amount depending on how much of the content was consumed, for example, if the member isn't enjoying a movie, they may turn it off and pay for only the portion they had to endure.

A further example is for the member to enjoy the content ad-free, in which case the cost of the content is taken in full from the existing balance of the member.

One skilled in the art upon reading this disclosure will recognize the many options possible for determining which and how the content will be consumed.

At step 575 after the choice of content is made, the exact parameters of ads required is determined and some or all of an ad pool is buffered or linked for preferably chronological consumption at step 576. At step 569 the member begins consuming the content and after a portion, an ad is exposed from the ad pool at step 570. Until the content is fully paid for, the negotiated ad exposure payment to the member is transferred preferably in full to the content producer at step 571.

At step 563 the credit for the ad collected from the ad author 562 is divided appropriately among the member, the producer of the content 564 and optionally the owner of additional intellectual property within the content at step 579.

For example, a movie producer has negotiated that a music publisher should be paid twenty-five cents every time a song licensed to the publisher plays during the movie instead of paying for the music rights outright, such a fee preferably being automatically subtracted from the total amount collected from the member for watching the movie.

Another example is a painting that appears in a scene causing a payment to the artist. A further example is a musician who wants to learn a song playing in a movie turns on the guitar tablature for the song that displays at the bottom of the screen, which triggers an additional payment to the music publisher.

As discussed in FIG. 23 later, the content map comprises all licensing information so payments may be made preferably in real time to any entity with an account in the Maffle ecosystem including publishers, musicians, artist and the like as shown at steps 560 and 561. The member preferably sees in advance the total obligation of all such payment subdivisions because they are comprised within the browsable content map.

At step 561 the member balance is increased by all or a portion of the ad credit 563 depending on the member profile settings determining payout percentages and whether the cost of the content has been paid in full.

Another aspect of this disclosure is that the content map comprises commercial entities, i.e. product placements, for which the member is paid upon exposure during the course of consuming the content. Another aspect of this disclosure is that only products from the ad pool appear in the content, but in a natural manner comprising integration with the content. Another aspect of this disclosure is fees charged to companies who abuse product placement within content.

At step 572 the member consumes an ad-free version of the content and pays for it from the balance in their Maffle account 561 at step 573. The content cost is transferred from the member at 565 to the producer 564 and other IP owners 579 as described above.

For each payment or preferably the total payments to each party for the entire content, the purchase history blockchain or other verifiable record is updated at steps 566 and 574.

Broadcast Stream Replacements

FIG. 15 is a timeline of broadcast stream replacements and payment allocation. This description is in reference to a TV display with broadcast channels arriving via an over-the-air antenna, cable network, or the internet, but the aspects of the disclosure described are not limited to TV or any particular device, and no limitation is implied. Any source of broadcast channels, and any display, monitoring or playback device can be used, for example a portable computer or mobile phone.

In the example that follows, a Maffle member is on the couch brandishing a remote control while watching television. The television can be tuned to at least four different sources of content or channels, Broadcast A, Broadcast B, Broadcast C, and content streamed over the internet under the control of Maffle.

It is important to note and an aspect of this disclosure, that the various payments and collections described below happen transparently without any efforts or interactions of the member, who simply chooses which channel to watch and when. All payment terms and negotiations are determined by the member's profile and preferably simulacrum, which may be adjusted by the member at any time.

In the timeline, time progresses from left to right. At the top of the timeline, the Maffle network is streaming content maps for each of the four channels, the content maps comprising detailed description and metadata about what's playing on each channel in real time, and preferably for prerecorded broadcast content, what's going to play during the entire duration of the show. Content maps are described later in detail in FIG. 23 and others.

The content map preferably comprises how much the show costs the member to watch, such a cost preferably being variable and determined by the broadcaster. The member may disable channels from display that charge more than the member wishes to pay. In this example, the member has accepted the terms of each of the four channels and may switch freely between them. The member's simulacrum preferably negotiates the cost and terms of the channels available to the member.

At this time in the example, the member is tuned into broadcast A. Broadcaster A accrues credits for the duration the member watches its channel at 588, and during the commercial break 594, collects the ad exposure payment made to the member by the ad author at 589. Preferably the ad exposure payment is higher than the accrued cost of the show, so the member both pays broadcaster A for the content, and banks additional Maffles into their profile balance.

No limitation is implied about when or how the broadcaster is paid by the member, such payment alternatively occurring before consuming the content or on a daily, weekly, monthly or other periodic basis or as a subscription or part of a channel bundle. For periodic or subscription channels, the member simply collects the entire payment for each ad exposure, using the balance to pay for channel subscriptions elsewhere in the Maffle ecosystem.

At 593, the ad pool from which the displayed ad is taken (as indicated by the crosshatched area after 593) is determined by the member, comprising differing preferences of individuals from the member's family. Whoever is watching TV at the time, may set their personal Maffle profile to determine the ad pool, or choose from several ad channels tailored for the group watching together, such as a "his ad channel", "her ad channel" or "family ad channel".

After break 594, the member continues to watch broadcast A until the next break at 590 where the member decides not to watch any ads. At 596, the member is shown that content is playing simultaneous to break 590 on both broadcast B and broadcast C. Because of the content maps for the four available channels, Maffle can inform the member of which other channels are playing content in many ways, such as an inset on the main display, on a remote control or another device such as a mobile computer.

Another aspect of this disclosure is the member setting preferences to automatically switch to another broadcast channel they desire that's not in a commercial break when the broadcast channel they are watching enters a commercial break. For example, the member may choose two shows to switch automatically between to avoid commercial breaks. Another aspect of this disclosure is setting options that determine the conditions to automatically switch channels. For example, the member wishes to watch primarily broadcast A, so the channel is switched to broadcast B only during commercials on broadcast A, switching back to broadcast A as soon as that channel returns from a commercial break.

During the time period at 590, broadcaster B or C accrues credits while the member watches their respective channels. The member pays broadcaster B or C from their Maffle balance immediately or as negotiated and as described above.

At 591 nothing interests the member on the three broadcast channels, so the member tunes into the Maffle network content channel at 595. The content producer of the replacement content 595 is paid from the member's Maffle balance for the time of content viewing 591.

At 592 the member decides to watch the "raw" broadcast channel A for a brief period of time to remind themselves of the pablum that made them join Maffle in the first place. No payments are made to broadcaster A because of the unsolicited ad exposures allowed to be displayed to the member.

Finally, some additional information about watching broadcast streams: another embodiment of this disclosure is for member content consumption payments to go directly to the producer of the content, rather than an aggregator, which is the ultimate preferred embodiment because it eliminates middlemen and provides a quality feedback loop such that bad content earns little or no payment. The preferred embodiment comprises separate compensation to the network or broadcaster for providing that part of the total service, such that content producer payments do not pass through the financial trappings of such networks or broadcasters.

While the preferred embodiment of the disclosure comprises payments to the broadcasters as described here for FIG. 15, it should be recognized that at the time of this disclosure, hundreds of channels are available over-the-air, on cable networks and on internet stations that may be watched by a member without any further payments in addition to the network access costs, in the case of over-the-air, free. As will be described later in FIG. 21 and others, Maffle TV may be used by the member to collect ad exposure Maffles, while eliminating all the un-wanted ads arriving from these various uncurated channel sources. It is contemplated that this situation will exist for some period of time, but great pressure will arise upon the broadcasters dependent on embedded ad revenue, who will turn to Maffle to receive payment instead for the added value created by providing (broadcasting in parallel or network uploads) content maps with Maffle targets and in-content purchase opportunities. There will be a golden era of Maffle membership where the members benefit greatly creating large incentives to join and use Maffle.

Another aspect of this disclosure is Maffle inhibiting the Maffle-ecosystem integration of a broadcast channel in its raw form, should the broadcast channel join as a registered Maffle network. For example, if Broadcaster B is a Maffle business, but Broadcaster C is not, the member is inhibited by all the devices under the control of Maffle, from watching broadcast B in it's raw form without compensation to broadcaster B. This serves as a powerful incentive for broadcasters to join Maffle. Broadcast C may be watched by the member at any time without further compensation to broadcaster C.

A preferred and related aspect of this disclosure is Maffle notifying a network or broadcaster that a commercial break was watched in its raw form by a Maffle member, such that the broadcaster may collect ad revenue from the advertiser who produced the ad, or notified by Maffle that the member superimposed Maffle-curated content over the ad, such that the broadcaster does not collect revenue from the advertiser for the unwatched ad. In this way, the member may still watch the broadcast for free in its raw form, but pay for it when the member replaces the commercial content. The advertiser benefits because they are not paying for unwatched ads for example over-the-air.

Here is an example to illustrate how Maffle greatly reduces the total number of ads while reaching the same or more people interested in the ad's product. Assuming a revenue-neutral model for cognitive simplicity, an advertiser both pays a broadcaster to play an ad during a commercial break, and additionally joins Maffle and publishes the same ad to the Maffle ecosystem. There, a member's simulacrum puts the ad into a member's ad pool because it determines mutual interest and payment terms. In this example, the broadcaster's viewers include fifty percent Maffle members, and fifty percent non-members. In this example, no Maffle members watch the raw ad, the broadcaster is so notified, and the advertiser pays for example, half of what it paid the broadcaster previously. If for example, one percent of the Maffle viewers have the ad in their ad pool and it plays during the break, the advertiser can pay out to the one percent, fifty percent of the total they were previously paying to broadcast the raw ad without increasing their budget. The members in turn can pay that fifty percent back to the broadcaster in return for consuming the channel content (summing and averaging all ads and channels in the universe). The total number of ad plays is one percent of the previous amount within the Maffle member group, and each one expressed an interest in the ad's product in advance. Assuming the same general product curiosity rate, one percent of the raw ad's viewers had any interest in the ad, and ninety-nine percent found it annoying and meaningless. The Maffle members were learning a language, interacting with their friends or playing a game with the 99% reduction in ad time created by eliminating all the ads they didn't want to see.

The previous example is for illustration purposes only and not intended to be limiting. One skilled in the art and upon reading and comprehending this disclosure will understand the many additional ways Maffle may coordinate networks, broadcasters, advertisers and members.

Direct Streaming

FIG. 17 is a flow chart of watching streaming media. A step 98 in FIG. 13 and door number 3, a member consumes content by streaming data from an internet host. At door number 3 in FIG. 17 at step 103 the member selects the source of the content. For Maffle-aware, earn-as-you-go content at step 105, the member watches an ad from their ad pool prior to watching the content and earns Maffles as displayed by a Maffle medallion. At step 107 the member watches the content and sees some or all of the just-earned Maffle credit go to pay the producer of the content. At step 109 should the ad credit exceed the cost of the content, the member banks the left over Maffles with a gratifying visual effect and audio payout sound such as a bell clang. The member's profile settings pre-determine how much the member is willing to pay for such content and whether or not they will watch content whereby the ad exposure credit is less than the cost of the content. The content producer in turn, preferably sets the cost of watching their content when they register the content with the Maffle ecosystem, such cost preferably being variable and negotiated prior to play with the profile of the watching member through conventional algorithms or preferably robotically.

At step 111 when accessing the content on a non-Maffle video aggregator, an ad from the ad pool is superimposed over the unsolicited ad that plays prior to the desired content. Such unsolicited ad is recognized by Maffle technology by its registered fingerprint or other machine recognition technology trained to identify advertisements. The audio channel is likewise rerouted such that the superimposed Maffle ad is heard, not the underlying unwanted ad. A Maffle medallion displays the ad exposure credit collected. At step 113 and upon termination of the unwanted ad, the content is watched. At 115, the member banks the entire ad exposure credit. Alternatively, should the producer of the content be Maffle-registered and identifiable, for example because the content has been fingerprinted and registered to the producer with a Maffle profile, the member may pay a tip to the producer should they especially enjoy the content.

At step 117 the member consumes content ad-free on a Maffle-aware site. Maffle transfers Maffles from the member balance to the site owner based on the content watched per view, by second, or by a periodic subscription. The member may auto-subscribe to the site based on a negotiation between the site profile and the member profile as described in more detail in FIG. 18 for a digital newspaper site.

A Digital News Site

FIG. 18 is a flow chart of one possible configuration for a Maffle-friendly internet news site. Coming from FIG. 13 at step 100 and door number 5, the member enters the news site at step 120 and door number 5 on FIG. 18.

While this disclosure preferably embodies an extensive Maffle network, an individual site owner may implement elements of this disclosure as a stand-alone business operation. For example with a digital news site, visitors may subscribe to the site in a conventional manner and set various preferences for ad exposures similar to those described for member profiles previously and collect ad exposure payments that pay for the subscription and more. No limitation is implied about whether the aspects of this disclosure are implemented on a site-by-site basis or within a broader Maffle ecosystem, and all such implementations have been contemplated.

At step 122 a server-side application determines that a Maffle member has accessed a page on the site, either via a browser plug-in, cookie examination or any other computational method. If the visitor is not a Maffle member, the site is served conventionally at step 142 typically comprising unsolicited ads.

For Maffle members, at step 124 if the member is already a subscriber, the site is served at 128 optimized for the integration with ad pool content, such as empty containers comprising Maffle hooks or metadata, placeholders, or as a clean, ad-free site depending on the member profile settings.

If the member is not already a subscriber, at step 126 the site or Maffle computationally determines if the payment for the use of the site as set in the site owner's Maffle profile 152 is lower than the upper limit set by the member at step 138 for automatic web site subscription cost. Additionally at step 138 and 140, the member may place limits on the number and type of ads the newspaper site may stipulate must be exposed or may not be exposed to the member with the site content 154, and whether or not the newspaper site provides for monthly or yearly subscriptions. No limitation is implied about the subscription rules filter settings or parameters that may be established by either party in determining an automatic subscription.

Alternatively, the member may only want ad-free content, and sets an upper limit for the cost of newspaper site subscriptions at step 138, which is paid for automatically from the member's Maffle balance.

Should the member's profile and the site profile computationally or by robot automatically negotiate agreeable subscription terms, the member is automatically subscribed and is served the Maffle-friendly site per step 128. If mutually agreeable terms cannot be negotiated, the member manually can decide whether to accept or deny the subscription at step 144, which causes either the conventional site to be served at step 142, or the Maffle-friendly version at step 128.

An aspect of this disclosure is that with suitable profile settings for both parties, the automatic subscription happens transparently when the member visits the site which is served immediately to the member in it's Maffle-friendly form.

At step 130 the site is paid by the ad exposures made to the member while they consume the newspaper content until a periodic subscription cost has been reached. The member via Maffle medallions sees the ad exposure credits and payments made to the newspaper site as they happen. The newspaper site may charge by time increment such as per second for video news content.

At step 146 when the periodic subscription cost has been reached and the member has set he appropriate toggle at steps 136 and 148, an ad-free version of the newspaper site is served at 150. Alternatively, the member may choose to continue with ad exposures per 148 and collect the entirety of ad exposure payments at step 156 until the next subscription period begins.

To provide additional information for making informed purchasing decisions, Maffle may partner with review and ratings institutions and web sites such as Consumer Reports. If a member follows an ad for an appliance that they have an interest in purchasing, along with the ad appear links and ratings for that appliance. If the member wants to read the reviews and ratings on Consumer Reports, maffles are paid to that organization automatically, preferably for an amount less than was paid to the member for clicking into the ad.

Similar rules of maximum monthly subscription amounts and such as applied to other content providers apply to this methodology as well.

A Content Map

FIG. 23 is a timeline of one embodiment of a CONTENT MAP.

The content map comprises chronological, factual, descriptive, analytical, subjective and numerical information about another entity, such as a movie, video or television program, song or sound recording, live performance, video game, text in a book, magazine, newspaper or digital newspaper, or still image. No limitation is implied about what kind of entity for which a content map can be derived.

The content map is machine readable information comprising one or both a chronological stream, and a static file, database or digital packet. The content map comprises an infinite and variable number of information categories that are self-describing, comprising the format and type of data within each category. The content map can represent and store any form of data, knowledge or information.

A complete content map can exist as a digital or data entity on a computational device. The content map may be streamed in real-time over a network, and accessed in parallel to chronologically unfolding content, such that information about the content is made available near the moment in time it occurs in the content.

The content map may be generated and added to in real-time as an event happens, for example while a live broadcast TV program plays on a display.

One skilled in the art will recognize the numerous data structures possible to represent a content map in a machine readable form on a computational device, and the form of related data bits in a network stream.

The content map preferably comprises non-encrypted and encrypted regions of information, encrypted regions only being accessible for authorized purposes as described later, for example when accessing intellectual property within the content map.

An aspect of this disclosure is using blockchains, or chains of hashed data, permissioned or otherwise, to store and maintain content maps or portions thereof, such that certain information for example, terms of use regarding intellectual property and payment recipients are protected from malicious modification.

FIG. 23 shows one example representation of a content map for an individual television content channel and is not intended to be limiting. FIG. 23 shows various categories in a graphical manner, which does not limit how the category data is stored by a machine.

The terminology used to describe the content map is not intended to be limiting and is arbitrary, for example, "categories" or "tracks" may comprise "elements" with variable parameters that comprise in total the category or track, or the category or track may comprise only a single variable parameter of data. Furthermore, categories may comprise an infinite number of hierarchical subcategories or elements, each with one or more parameters.

At 698 a timecode track relates information and events in the content map to chronological time using conventional timecode, such as HH:MM:SS.SS. Breaks, ads and commercials in the program are identified in time as they occur.

Child Rating

At 690 the child rating of the program is established and varies with time depending on the action and dialog. A Maffle member may set limits on the maximum child rating that may play for example on their TV when their children are present. Alternative, appropriate content such as cat videos, may be automatically substituted while the child rating is exceeded or the channel may be muted or blurred.

Subjective Qualities

At 691 various categories represent subjective qualities of the content as experienced by humans or machines programmed to evaluate subjective qualities, such as an artificial intelligence or simulacra. Such subjective categories include but are not limited to intensity 691, sexual content, violence, beauty 692, and funniness 693. An aspect of this disclosure is providing an iterative process for determining subjective qualities of content, such process comprising obtaining the input from multiple people for each category in real-time as they are exposed to the content and combining their responses statistically, the refined results then used to improve the accuracy of the content map.

For example, a person provided with a hand-held fader may move the fader up or down depending on how much beauty they perceive to be comprised within the content throughout the duration of the show.

More detail about human-supervised content map generation will be described in FIG. 22 later.

Another aspect of this disclosure is providing an application for a mobile device whereby the laughter of a member watching content is captured preferably by a microphone but otherwise biometrically and analyzed for intensity using variables such as the volume in decibels, pitch and duration. Such variables are compared against a fingerprint of the laughter characteristics of the member such that a funniness rating of the content stimulating the laughter be it television or radio, can be set with a quantitative value, such as a number from zero to 100. Such funniness rating is transmitted to Maffle preferably confidentially and anonymously, and preferably in return for compensatory Maffles, and is combined with the responses of other members and used to create or improve the accuracy of the funniness track or element in the program's content map.

Actors and People

At 694 the actors and people are identified in real-time as they appear and leave the program. For example, a member who is a big fan of a particular actress might want their television to automatically switch channels in order to see her whenever she happens to appear on any channel with an accessible content map.

At 695 a breakout shows more detail about the kind of information that may be related to each actor. The on/off element records the onscreen presence of the actor. A container that envelopes or defines the location of the actor on screen records their movements. The container shape and size is recorded and may change over time along with origin's X, Y and Z coordinates of the container. Examples of container primitive shapes are splines, polygons, circles, polygonal 3D surfaces and volumes, and 3D prismatic solids. The container may be a 3D volume that encloses the actor. An example use of such information is blurring out a person for whom the Maffle member has no fondness. The member specifies in their profile that they never want to ever again see the previously mentioned and infamous Mr. Drinkwine-Blinkhorn. A Maffle-enabled device may then use the content map to blur out the area containing D-B. The actor content map may further comprise a container for just the actor's face, for example. Subjective qualities such as funniness are recorded for the particular actor. An example use is for a member to search for clips featuring a favorite actor where the actor is being funny.

Another example of using actor information 695 is replacing the faces of actors throughout a movie, for example Star Wars. The polygonal surfaces of each actor's face is extracted and stored with the movie's content map. The member defines a profile scheme whereby images of the faces of the member's family are mapped to each of the main characters, such that nephew Ryan's face appears superimposed over Luke's face whenever Luke appears, and uncle Billy's face appears over Darth Vader.

At 704 all the dialog spoken by the actor is optionally recorded. Since the dialog may comprise copyrighted material or intellectual property, the dialog may be encrypted such that the owner of the IP may control its use. For example, the owner of the IP may set a cost to be charged a member for including the transcript of a movie in their search request.

An aspect of this disclosure is a content map comprising encrypted intellectual property whereby the ownership, rules of access and recipients of access payments are also stored in the content map, whereby accessing the intellectual property automatically causes a payment to be made to the owner of the intellectual property. A further aspect of this disclosure is that such payments are variable and negotiated in advance by the robots of the owner of the intellectual property and a perspective user of such property.

The child rating of the actions or speech of the actor may be recorded, such that an individual actor might be muted or blurred automatically should their behavior exceed a child-rating threshold. Any number of additional elements may be included to capture information about any actor.

Things, Animals, Places and Buildings

Returning to 694 things and objects are recorded as they appear, such information comprising brands and models and product information without limit, such as links to stores to purchase the item, buy-it-now features, and the coordinates of containers enveloping the locations of such objects, including the 3D volumes containing them as shown at 706. The content map may comprise all the information required to substitute a virtual object in place of a default object within the scene. The virtual object may be comprised of for example, images or computer generated imagery (CGI) in 2D or 3D, the definition for which may be included with the content map or stored in a different location for example on a network. For example, the content map comprises the moving origin and 3D volume of a car passing by on the street, along with foreground masking information such as actors standing in front of the car in the form of alpha image data. A virtual version of any other car may then be substituted in real-time inside the action of the program, such appearance comprising the member collecting Maffles from the advertiser of the brand of replacement car, while a Maffle payment medallion momentarily appears and clinks into a piggy bank.

Additionally at 694, animals, places, and buildings are identified as they appear chronologically and may optionally comprise location containers and additional information about each entity, for example addresses of buildings and construction details, or the species and threatened status of animals.

Audio and Music

Elements of the audio content of the program include music, ambience, foley and dialog 703. A member may search for the sound of dog barks, for example, and be directed to those locations in a program or any number of programs. Per 704 described in relation to the actor track/category, the actual dialog of the program in the form of text may be encrypted intellectual property subject to additional terms for access in searches or display. The dialog track may be comprised of the closed captioning or subtitle track of the program. An aspect of this disclosure is a content map comprising a dialog track, replacing a closed captioning or subtitle track for broadcast, streamed or downloaded content.

At 696 the subdivisions possible within the music category are shown, but are not intended to be limiting. All elements of the music in the content may be stored in the content map, including the artist, song, composer and publisher. At 701 the terms of the publishing for the music are stored, including the percentage royalty divisions between the performing artist, composer of the work and the publisher, and use of the master recording. Membership accounts of the artist, composer and publisher in their respective performing rights organizations may be stored. An aspect of this disclosure is delegating the management and configuration of a music publishing track within a network-accessed content map to the publisher of the included music. Another aspect of this disclosure is the automatic payment of performance royalties to the vested parties of a published work of music automatically upon the playing of the music during a program.

The implementation of the Maffle content map for the payout of performance royalties eliminates the need for a performing rights organization, because the payout can be made in Maffles to the various parties individually and contemporaneously to the use of the music.

The producer of the content may negotiate payment terms with the publisher of the music. For example, the publisher provides the publishing and master recording rights to the producer without charge in exchange for collecting one-half of one Maffle per play of the content. The terms of this agreement may be recorded in the music or intellectual property categories in the content map, and an automatic payment is preferably made to the publisher, artist and composer by Maffle each time the content is played.

Additionally at 696 the genre of the music and chronological occurrences of profanity may be stored.

The instrumentation of the music and where each instruments plays during the song may be stored and at 705, the midi information comprising individual notes, durations and expressive elements may be stored. Tablature and musical notation may also be included, such information comprising intellectual property subject to encryption and costs of access described further in this section below. For example, a member who plays guitar can turn on the tablature track for an additional charge and see the notes and fingering of the music playing in real time on the display along with the content, or download the tablature for use later.

Subjective qualities of the music may be recorded broadly described as "mood dimensions", such as yearning, anger, and happiness and may vary over time. As previously described at 691, such subjective qualities can be quantified by a sampling of people inputting real-time responses (or measured biometrically), or by machines or simulacra. Such mood dimensions provide for accurate searches and music recommendations. For example, if a member enjoys the feelings evoked by a certain song, they may search the universe of songs with content maps that comprise similar feelings, including the sequence of feelings. An aspect of this disclosure is producing a list of song recommendations based on matching the sequence of a variety of feelings from one song, to the sequence of feelings in a collection of other songs.

At 702 the lyrics of a song may be contained in the content map and may comprise being intellectual property requiring terms for search or access as described below.

Camera Tracking

After 703, information about the cameras used to record the program is stored in a category. At 697 further details about the camera track are shown. In the example, a camera outfitted with positional encoders is used to photograph a scene for the program. As the camera moves through space, its XYZ coordinates are recorded, along with the pan, tilt and rotation information. The focal length, field of view, focus plane, aspect ratio and any other technical parameter of the camera and it's position and direction of aim may be recorded in real-time and stored. Any number of cameras may be recorded and stored on individual tracks.

An example use of the camera track is as follows: a Maffle target is detected in a scene and its size, location, warp and rotation measured and extracted by a machine. As the camera recording the scene moves, the aim and location information is reversed and applied to the Maffle target superimposition area, such that the area remains apparently fixed in location over the Maffle target. Another example is a product placement location defined by an XYZ origin and 3D volume. A 3D CGI rendering of a product, for example a food blender, is placed within the volume in the scene, and as the camera moves, its movement is reversed such that the food blender appears stationary.

A further example is the real time line of aim of a camera photographing a football game, evaluated against data comprising the location in space of a Maffle member who has agreed to publish their location coordinates. If the line of aim and focal plane coincide with the three dimensional location of the member, details about the member are transmitted to Maffle for use as limited by the member, such as showing off to their friends watching the football game on TV.

Intellectual Property

At 698 details of the intellectual property (IP) included in the content along with chronological occurrence are mapped. The owner of the IP, terms of use including the cost structure to access the IP, and payment accounts, preferably Maffle accounts are included along with any other data required to protect and compensate IP owners for the use of their work. Elements in the IP track may comprise but are not limited to the percentage ownership of the IP that determines how payments are subdivided, and the actual legal text of licenses and agreements controlling the use of the IP. An aspect of this disclosure is delegating the management and configuration of an IP track within a network-accessed content map to the owner of the IP Examples of IP that may be included in the content are artworks such as paintings and sculpture, words and writings, music and sounds.

The IP category may also comprise the terms for access and searches of IP contained within the content map itself, such as the text of the content dialog or musical notation of the sound track, which are preferably stored in an encrypted form.

Related to the intellectual property category but not shown in FIG. 23 is a permissions category whereby persons or businesses grant certain rights to the producer of the content in return for structured compensation recorded in the content map. For example, the owner of a building grants the right to film a scene in the building without charge in return for collecting one-quarter of one Maffle each time the content is played. Preferably this kind of category automatically divides payments made within the Maffle ecosystem to the appropriate parties.

Payments to IP owners are discussed in further detail in FIG. 14, Purchasing via Ad Consumption.

Data and Merchandise

At 699 data of any kind may be stored inside the content map, for example still images, video clips, and application data in any form such as spacial information for a video game that plays along with the movie.

At 700 the category comprises a "store" of related digital items available for a cost and information about related merchandise for purchase. For example, toys and apparel with a movie theme can be purchased using information from the content map accessed by a merchandise browser application on the movie playback device.

Watermarks, Text Banners And Overlays

Not shown on FIG. 23 but an aspect of this disclosure is a content map comprising the specifications of visual overlays such as watermarks, crawling banners and static text. A further aspect of this disclosure is calculating a payout amount the network or producer of content will compensate a viewer for NOT masking a watermark, static or moving text. The payout table is preferably comprised within the same category of the content map. Another aspect of this disclosure is a content map with the graphic image of a watermark or logo, whereby a viewer can toggle the display of the graphic image. A further aspect is automatically compensating a viewer for toggling on the graphic image.

Maffle Targets

As described later for FIGS. 34, 35, 36, 37, 38 and 39, and FIG. 9 (targets in virtual space), the content map further comprises the specification of Maffle targets in any and all forms. Embedded targets are also further described starting at step 393 in FIG. 34.

Content Fingerprints of Mood and Feel

Another aspect of this disclosure is taking information from categories and elements in the previously described content map of FIG. 23, and generating one or more fingerprints of the content in a different parameter space, such that aspects of the content map are depicted as two dimensional abstract images, or three dimensional abstract patterns. Another aspect of this disclosure is such images and patterns change over time in relation to the content map changing over time, such time comprising being accelerated.

A further aspect is that the images and solids derived from two or more content maps comprise being comparable by a machine to determine similarities and differences. Another further aspect is that the images and solids are differentiable by a human being such that content maps with similar qualities appear similar, and content maps with differing qualities appear different.

Another aspect of the disclosure is a content map fingerprint comprising a graphic timeline with an X and a Y axis, such that one end of the graphic along the X axis represents the beginning of the content, and the other the end of the content, and the levels of gray or color in the Y axis, and relative scale of any gray or color line or band at any point comprise being related to elements in a content map. Another aspect is the graphic timeline comprising being wrapped. For example, a long horizontal timeline may be wrapped such that it fills a square by dividing it into equal lengths that are stacked one upon the other.

Content map representations are similar in concept to profile fingerprint images as described for FIG. 5, whereby a square swatch or band of abstract shapes and colors comprises the entire mood/feel of a work. Temporal info can be embedded in the band, or in stripes across a square.

Any number of two or three dimensional fingerprints may be generated that together represent a single content entity or aspects of the thereof.

Content fingerprints may further be generated for songs and other art forms with abstract concepts that provide a "feel" over time, such as books, video games and stage plays.

Other examples of elements suitable for content fingerprinting are excitement, story elegance, moodiness color, and outcome color. The total color palette represents the feel of the entire movie.

Human synesthetes who see internalized colors and patterns while hearing music or watching movies, may be hired to document their color and sensory experience while watching content. Such information may be used to generate fingerprints or refine the computational process used to generate them automatically.

An aspect of this disclosure is an iterative process, whereby a computational process automatically generates a fingerprint swatch intended to represent the mood of an entire movie; the swatch is shown to a synesthete who has watched the movie and provides feedback about how accurately the swatch captures the mood of the movie; and the computational process is modified using such feedback to improve the accuracy of subsequent swatches.

Another aspect of this disclosure is generating content fingerprints that resemble Rorschach test images.

In the case of books and text, language and text analysis to may be used to generate swatches separately from the category and element information in the content map.

Also through an iterative process involving feedback from people or synesthetes, summary swatches can be computationally generated that represent an entity or quality in its entirety like an effective abstract painting. For example, a single color swatch represents the essence of an actress. A swatch representing a bad movie has an unpleasant sort of disturbing look to it, and the swatch representing the essence of a great movie looks appealing.

Swatches may used for AI and machine learning to find movies with the same qualities—same for songs, books, etc., or compared by humans.

Fingerprint swatches generated to represent qualities of a member profile as described for FIG. 5 may be used to automatically find desirable content for the member by having a machine compare the member profile swatches with various content swatches having related representations.

A Temporal Parameter Solid Derived from a Content Map

FIG. 24 is an isometric view of one embodiment of a temporal parameter solid automatically generated using information from a content map. No limitation is implied about how the solid is generated as many methods may be used to generate a three dimensional shape from various categories of time-variant data, as will be apparent to one skilled in the art and upon understanding this disclosure.

A solid comprised of lathed function curves intersected arbitrarily in a plane perpendicular to the lathe axis of rotation is created. Time is represented by the X axis, while the Y and Z axis form a plane upon which circles with radii related to the magnitude of various content map elements are arranged in an arbitrary but constant manner. At 716 the radius of one of several circles on the YZ plane represents a value on the content map such as funniness. As time progresses and funniness increases, so does the radius of the circle at that temporal location. Should funniness decrease, which is so often the case, the radius decreases at that point in time in the content. The three dimensional shape of funniness therefore appears similar to a turned table leg.

An arbitrary number of content element parameters represented by circles with varying radii are also included in an arbitrary arrangement on the YZ plane, which forms a pattern of overlapped circles. Each circle and related lathed solid is assigned a different arbitrary color or shade of gray.

The three dimensional solid as a whole is the addition of each lathe shape into a single entity, such entity now representing the total qualities of all the included parameters over a length of time.

The appearance of the solid is machine learnable and recognizable, such that the solids generated from content with similar qualities will have machine recognizable similarities, for example by using image processing, spacial processing algorithms or neural networks. Likewise, a human may recognize similarities between content parameter solids in order to choose desired or rejected content. pacial processing algorithms or neural networks.

Temporal Parameter Solid Section

FIG. 25 is an isometric view of a temporal parameter solid in section view. The varying relationships between the various content element parameters may be better evaluated by a machine or human in the form of a cross section. The section view reveals the interweaving of the various parameters as they grow and shrink in radius over time. The figure shows a quarter-section, but any type of solid sectioning is possible, such as a half section or section in the YZ plane instead of the XY or XZ plane. Descriptions of example colors for each parameter are labeled on the figure.

Maffle TV Block Diagram

FIG. 19 is a hardware block diagram of one embodiment of a Maffle TV. One skilled in the art will recognize the many ways the hardware components of a television with network connections and graphic processing may be configured, and the following description serves as an example only and is not intended to be limiting. Furthermore, the inputs and outputs of a television device are highly configurable in any combination, and no particular input or output is necessary in order to implement the various aspects of this disclosure.

At 636 the picture I/O interface converts video inputs from various sources into a video frame format, for example from a cable network input comprising a decoder; an antenna input for decoding over-the-air broadcasts with a tuner; an HDMI input for connection to a computer or cascading the Maffle TV with for example a cable box or network set-top box; composite analog inputs from a VCR; input from a disc player such as a DVD or Blueray; game console inputs; and input from a DVR. The picture I/O transfers the frame data to the system I/O 641 via an HDMI bus in the form of interlaced or non-interlaced video comprising streams of digital images with varying amounts of pixels and aspect ratios, for example 1920×1080 pixels in width and height, and at 24 frames per second, progressively (or non-interlaced).

At 637 audio inputs are taken from various sources such as an analog jack with an analog to digital converter, a digital input, for example via coax S/PDIF format, over short-range radio protocols such as Bluetooth, or from a wireless network connection. Suitable integrated processors for the various inputs handle the format conversions. The audio inputs are processed into a digital representation of an audio waveform with a sample rate for example of 48-kHz, and a bit depth, for example of 24-bits.

At 638 controller inputs are taken from remote infrared devices, game controllers, or other controllers via short range or network radio signals. Controller inputs typically enter the system I/O 641 via a USB bus. External storage devices such as hard drives, solid state drives, thumb drives and memory cards may be attached to the television using USB or a descendent bus format. Portable devices such as mobile phones and laptop computers may be connected by wire to the television using the USB bus.

At 639 flash memory is used for storing the television operating system, application executables and data files, user data and buffered content. The nature of the intermission content is determined by the member's profile and may comprise the member's ad pool, in addition to a library of various content types such as movies, television programs, music, home videos and images.

At 640 a SATA bus provides a high-speed bus to connect hard drives, solid state drives and the like, such storage volume further increasing the size of the content and ad pool buffer or cache. Other high-speed external device protocols are contemplated for example Thunderbolt and Firewire and can be used in place of or in addition to the SATA bus.

At 642 network connections to the television are made via wired or wireless protocols and a deep packet inspection filter and firewall/router preferably remotely configured by Maffle removes unwanted ads, content or malicious data and communication prior to it entering the television processor I/O 645.

At 651 the main processor group preferably comprised within a single integrated processing chip or unit, provides for a CPU (central processing unit), GPU (graphics processing unit), MMU (memory management unit), I/O and DRAM (dynamic random-access memory) controller. The I/O 645 provides an interface between the system I/O 641 and outside network connections 642 and the internal processing units. The I/O 645 further provides the output connections for picture 643 and audio 644.

The CPU 648 executes computations per the software architecture of the operating system and as instructed by applications both loaded when the system boots from flash memory 639. Not shown in the figure is possible ROM or other persistent memory storing firmware that may be updatable.

The MMU 647 independently relates the physical memory address locations in the television DRAM 650 through the DRAM controller 649, to virtual memory address locations used by the CPU as instructed by the OS.

The GPU 646 independently performs frame and stream processing as delegated by the CPU and using frames directly from the I/O 645 while addressing DRAM directly via the controller at 649 or via the MMU 647.

At 643, the resultant video/picture is output to a built-in screen or via HDMI or other wired protocol for example suitable for a virtual reality headset, or streamed over a wired or wireless network connection.

At 644 the resultant audio is output to built-in speakers; via the audio channels in the HDMI output; as analog outputs via a digital to analog converter; as a digital audio output for example S/PDIF coax, or as audio over a short range protocol such as Bluetooth or a wired or wireless network connection.

The picture input and output may further be in the form of left-eye and right-eye images that together present stereoscopic imagery to a viewer. Audio is stereo or multichannel, such as in a surround sound format such as 5.1.

Maffle TV Hardware Components

FIG. 20 is a drawing of the physical Maffle TV hardware components. One skilled in the art will recognize the infinite ways in which a television enclosure and interfacing components such as the remote control may be designed and configured. This description is thus not intended to be limiting but serving as a simple television configuration for illustration purposes.

At 673 the device described comprises a hardware box connected via HDMI to a television display. Alternatively and preferably the Maffle television comprises a single unit comprising a display with built-in hardware and interface components.

The unit 673 has all the connections described in the block diagram of FIG. 19 which are provisioned either on the front 673 or rear 674 of the case. The front of the case is preferably outfitted with an IR sensor for a remote, and the connections by which a member may conveniently plug wired devices in and out of the device, such as a headphone jack, thumb drive or game controller. Additionally, a power connector is provided.

A hardware remote 671 is provided for channel changing and configuring the device, including switching between a raw, unfiltered broadcast stream, and a Maffle-enabled version. A pointing paddle, joystick, finger touch surface or other physical input technology is provided that may be used to position graphical elements on the display 672 such as a window enclosing an offending element 675 that the member wants processed or removed by Maffle technology, for example the watermark enclosed by the window at 675.

An aspect of this disclosure is a television remote comprising a magnitude input such that a person may input over time, their emotional response to a subjective quality of content, for example funniness, which is recorded and uploaded to a remote network automatically. A further aspect of this disclosure is provisioning the remote with biometric inputs such as an EEG that record physiological responses chronologically with program material, such responses uploaded to a remote network automatically. Another aspect of this disclosure is that uploading such responses automatically credits an account. Another aspect of this disclosure is a video game comprising such responses causing graphical or sound changes, or responses being used to compete against remote network players. Another aspect of this disclosure is the responses from one or more members causing a content map for content such as video or music to be revised.

An alternative to the dedicated hardware remote 671 is a mobile device 670 running an application designed to control the Maffle TV. The mobile device 670 may alternatively be used in addition to the dedicated hardware remote 671.

Biometric inputs for measuring viewer's physiological responses while watching or listening to content may be integrated in any way, such as on the remote, using a mobile device running an application and communicating with a network, by wired detectors or body mounted sensors such as a headband that plug into the remote or the television hardware, or transmitting such responses over short-range radio such as Bluetooth.

The mobile device 670 may be used to provide the member's library content, output from an application, or a network video or audio stream, for use by the Maffle TV display and audio hardware, for example, to superimpose over an unwanted element or play during a commercial break.

For example, the member configures their profile or viewing preferences such that when an over-the-air broadcast channel goes to a commercial break, an album from their personal library automatically plays while family pictures display on the television screen. When the commercial break is over, the broadcast program automatically resumes while causing a chime to ring on the mobile device.

Maffle TV Part I

FIG. 21 is a flow chart of one possible Maffle TV implementation. Coming from FIG. 13 at step 102 and door number 7, the member enters watches television at step 212 and door number 7 on FIG. 21.

Video or television may be consumed on a television display with built-in or separate Maffle-enabling hardware and or software as described in FIGS. 19 and 20, or a computer or portable device with access to video, such as a mobile phone with a browser application accessing a broadcast network television site with video streaming capabilities. Versions of Maffle TV can furthermore be implemented in software on television set-top boxes or game consoles with suitable operating systems and I/O capabilities.

One skilled in the art will recognize all the devices that can implement the described steps, and no limitation is implied about the hardware and software platforms used to facilitate the disclosure.

At step 214 the member signs in with Maffle and begins watching TV. Access to the member's profile and simulacrum are preferably locked to unique hardware ID's per step 216, within the Maffle TV, mobile device unique serial number or portable hardware ID device such as a dongle.

At step 218, the program analog or digital stream is obtained from one or more of a cable network, over-the-air broadcast or a network, also referred to as AV (audio and/or video) content. At step 220 the raw stream may be toggled on such that it displays without modification on the display at step 250. The display at step 250 is the PRESENTATION or AV output of the AV content either in its raw form or as combined with any of the processing steps described throughout this disclosure such as blurring, removing, masking, muting, overlaying and superimpositioning.

At step 268 the member sets auto-watch limits and filters for their profile, such that the cost as set by the producer or network for a program and communicated to the member in advance must be within certain limits or the member will not agree to pay for the content. Such terms are preferably negotiated automatically by the robots of the member and the content producer or network. At step 222 if the program terms are unacceptable, the content is blocked at 224 from incurring any costs to the member, or in the case of cable or over-the-air content, the raw stream for the channel is activated such that the member may consume the content along with any unsolicited advertisements.

At step 222 if the program terms are acceptable to the member's profile or simulacrum, the program stream is buffered for example for ten seconds, such that parallel network or local computations have sufficient time to complete and upload before the program displays.

At step 254 and door number 10, an existing content map for the program is either download as a file or parallel stream of data from the broadcaster, a parallel stream or data file on a network, or a new content map is generated in real-time by Maffle, a local computer, or a multiplicity of computers on a network.

Content Map Generation

FIG. 22 is a flow chart of content map generation. At step 192 and door number 10, from FIG. 21, a content map is accessed or created. The elements of a content map are described in FIG. 23.

At step 211 if the title of the content is known and a content map already exists for that title, the map may be further refined to improve accuracy at step 195, or left in its current form and continues unmodified at step 210 and door number 12, which returns to FIG. 21.

At step 209 a content fingerprint is calculated comprising unique characteristics of the content for preferably the first seconds of the content's duration. For example, the average luma of a group of pixels in each quadrant of a video image is recorded every six frames. That sequence of luma measurements over a period of time is a unique fingerprint to the source material. The sequence of peaks of the total luma in any region of pixels forms a unique pattern that also constitutes a fingerprint.

Any combination of video image attributes may be used, such as information in one or more of the RGB channels in any combination of sampling locations or strategies, either by pixel coordinates, rates of change, or relative values. For example, for any group of pixels, the difference in the total levels between each of the Red, Green and Blue channel constitutes a unique fingerprint. Another example is a sequence of image recognition attempts using the same machine, so that even if the recognition is incorrect, it will match from attempt to attempt.

Audio fingerprints comprise a sequence of sample measurements, for example the frequency constituents can be recorded over time, or the pattern created by peaks or minima can be used.

At step 205 the fingerprint stream 209 is preferably continuously compared by a machine against a known collection of fingerprints searching for unique matches. If a fingerprint match is found at 193, the content map may either be used as stored, or refined to improve its accuracy. Over a period of time, for example, years, a content map of a fixed work such as a movie will asymptotically approach perfectly accurate and complete and require no further refinement. An aspect of this disclosure is discriminating the difference between complete content maps and those requiring refinement, the complete maps comprise having a threshold of modifications to the content map elements that determines completeness.

At step 195 if the content map does not require refinement, it continues to step 210 and door number 12, which returns to FIG. 21.

At step 197 the content is evaluated by Maffle computers, robots and AI systems comprising hardware and software for the automatic identification and quantification of content map elements and Maffle targets as described later for FIG. 34. The program stream 199 is preferably obtained from an antenna, cable transmission or a network but can be from any source. The content is preferably selected for evaluation either by network communication with the hardware device of a member, or for an ongoing group of local or regional content channels popular with local and regional members. Maffle may furthermore create content maps of the universe of existing content, for example, of all the movies available for mapping. Alternatively, the computer of a member can generate a content map on a local device comprising hardware and software as discussed further in FIG. 21. No limitation is implied regarding where or when a content map may be created or refined.

At step 201 the content map is created or refined in real time, identifying for example people, elements and commercial breaks, also referred to as AV EVENTS.

Maffle Game Room and Mafflers

At step 203, human-supervised content map generation or correction is accomplished.

Aspects of this section also apply to MOB MUTE as described in detail later and in FIG. 32. Instead of the teams described below, individual members contribute to the refinement of content maps using an interface to identify AV events.

Over time, machines and AI per steps 197 and 201 will take over incrementally automating the real-time generation of programming content maps. While that AI infrastructure is being developed, content maps may be generated or corrected (an AI generated first-pass, for example) by teams of humans working in the "MAFFLE GAME ROOM". Each person or team gets a cockpit of screens and controllers designed for high-speed marking and identification of content map elements and commercial breaks. Preferably one person or team is assigned to each channel in a viewer area, be it over-the-air network, cable or live streaming.

As a program plays, the "MAFFLER" uses controllers (interfaces) to identify AV events, highlight regions, point out targets and elements and flag commercial breaks. Commercials can also be content mapped by the Maffler. At 207 the content map 206 for that channel is live streamed from the Maffle network to the Maffle TV box, compatible hardware or software browser/viewer/app. The receiving device uses the content map per the member's settings to overlay, mask and display desired visuals.

Mafflers may also comprise members with appropriate controller hardware who collectively generate real-time content maps for use by the network and each other, as further described in FIG. 21. Member Mafflers compete with each other and collect maffles as a reward for being the fastest, most accurate, etc. at locating content map elements. All uploaded live-stream elements for a given program are combined on Maffle's servers to ascertain accuracy. A specification for minimum accuracy can be developed to prevent errors uploaded by an individual maffler to propagate to the network.

A bell curve will be seen that can retroactively determine a given maffler's response time which can be used for grading and rewards. The system can track very accurate and fast mafflers to further speed up the process by weighting their inputs at a higher trust level than untested or proven slow or inaccurate mafflers. Local, regional and national maffler rankings can be ascertained and made available for furthering competition, and each program can be ranked. See FIGS. 32 and 33 regarding Mob Mute for another example of grading a response curve.

Voice recognition combined with graphical input provides fast and interactive identification of people and objects. For example, as soon as a person appears on screen, the Maffler says their name which is logged with the timecode into the content map. The Maffler may further place a graphical target on the person and assist with tracking them as they move. Such movements may also be automatically tracked by software. Objects can also be named out loud and added to the content map with their timing appearance. People and objects can be further identified by voice recognition as to when they are no longer visible. Scene changes can be automatically detected by software which may clear all objects from the content map.

A list of current targets is superimposed as a list or in place over the object. Targets can be deleted from the list by selection or automatically. First person shooter-style selection can be used to remove targets or to locate new targets. For example, if John Wayne walks into a scene, the member says "John Wayne" while placing a cursor target on the actor and pulling a trigger, which links the location to the actor. "John Wayne" is added to the active targets list, and when he exits the scene, his name can be "shot" off the active targets list.

The human-supervised inputs may be used to "train" the AI system, providing a corrective feedback mechanism to improve the accuracy of the AI/machine learning algorithms, so that over time, less and less human intervention is required for high accuracy.

Content Map Generation Cont . . .

At step 194 an application for creating content maps is used. The application is either a stand alone computer application or a plug-in for a video or audio editor or playback application per step 196. At step 198 preferably the producer of the content builds the content map timeline with elements and locations per FIG. 23.

For example, in a typical video editing application, additional tracks for content map elements are visible along with the video and audio tracks of the original content. At step 200 the various elements are selected and identified. At step 202 object and image recognition capabilities may be built into the software to automate at least in part building the content map elements. At step 204 child sensitive content such as violence or explicit sexual material is mapped and rated.

At step 206 the completed content map is created or refined, then live streamed 207 or uploaded as data 208 to Maffle for network availability to members.

Maffle TV Part II

At step 256 and door number 12 in FIG. 21, the content map of FIG. 22 returns to the Maffle TV and is accessed in parallel with the content at 262.

At step 282 the "raw" content map for a program is combined with the profile settings of the member that comprises the actions the member desires to be taken for specific individual or combinations of content elements (local trained), along with one or more crowd specified content elements and actions. "Program supplied" elements are from content maps made available by the producer of the content or as emerging at step 256 and door number 12.

Another embodiment of this disclosure is a crowd fingerprints database that comprises elements individually located within content such that a particular category or track of an element may trigger a specific action when the element occurs during the content. Members locate and flag elements using hardware and software and upload the mapped elements to a crowd database on Maffle's network, which is made available to all other members or a subset thereof per the member's profile settings.

Members may join crowd groups of like minded members who share settings controlling the actions taken when elements occur during a program.

For example, a member loves cats and sets their profile such that as a movie plays, the crowd fingerprints for that movie locating cats notifies the member shortly prior to the cats appearing per step 240. Another example is a television program with explicit violence that the member wants muted when it occurs per step 238. Another example is a member joining a crowd group that doesn't want to see any crawling text banners on any program, whereby all crawling text is obscured with a mask, and the members of the group locate such text on their local devices which automatically shares the locations with the group on the network.

Another way to describe the embodiment is a content map as described in FIG. 23 divided into multiple sub-maps, each comprising at least one category or element and accessible separately from the complete content map on a subscription basis. One skilled in the art will recognize the various data structures possible to accomplish this, such as individual files or streams, or a single database with suitable addressable categories. A content map may be comprised of a collection of individual sub-maps comprising a category or element, altogether forming a complete content map.

Example categories available in a crowd fingerprints database are watermarks 288, described further in FIG. 26 at step 226, banners 290, logos 292, audio and sounds 294, offensive moments 296, offensive ads 298, people 300, voices 302, things 304, and animals 306. These category example are not intended to be limiting. The total of these elements 308 is combined with the raw content map and the member's local map at 282.

At step 270 the member profile ad filter settings and consumption credentials 272 (purchase history and rating) determine the member's ad pool, which is downloaded and buffered at steps 258 and 260, preferably continuously as background network and computational processes.

Intermission Content

At step 266 intermission content in addition to the ad pool is queued for display as determined by the member's profile. Alternative programs set to play during intermissions are preferably downloaded or buffered at step 264 but may be comprised of a automatic alternative channel switching per the description of FIG. 15.

At step 263 intermission content is queued such as background applications including games, dating and friend finding, language training, education and social interaction. For example, during a commercial break, the profile of a potential dating partner located by the member's simulacrum is presented or a conversation started. Another example is a short language vocabulary lesson during the break, or a brief math tutorial. An aspect of this disclosure is educational lessons broken into commercial-length fragments that automatically play during commercials and automatically return to the program after the commercial break.

At steps 276, 278 and 280, video, photos and images, and audio material such as songs from the member's library are made available for presentation during an intermission. For example, a slide show of family photos and songs from the member's music library automatically play during commercial breaks.

At step 284 the member sets preferences and filters for actions to be taken when certain elements occur, such as blurring or masking offensive elements at step 238 or notification alerts when desired elements are pending at step 240. At step 286 intermission settings determine what happens during intermissions in conjunction with intermission content 266. Another aspect of this disclosure is automatically changing the nature of commercial break content based on subjective categories and elements in a content map. For example, for a high intensity program, high intensity rock music is played during the commercial break to sustain the emotional content of the program, or relaxing smooth jazz plays during a nature show.

At step 226 and door number 9, as part of the content mapping ecosystem, watermarks and banners are targeted and managed.

Watermark and Banner Management Part I

Referring now to FIG. 26 at step 309 and door number 9, the watermark and banner management process begins at step 311. At step 315 the content map preferably comprises watermark information including payment schedules.

One skilled in the art will recognize that a simple query to a network server relating an active television channel to it's watermark and payout information can substitute for similar information in a content map and as negotiated by the simulacra of the parties. All references to content maps are thereby not intended to be limiting as any method of correlating data with a channel playing at a given time of day are contemplated.

If at step 315 the member can be compensated for the display of a watermark or banner and chooses to do so by their profile settings 317, the watermark or text banner is displayed at 325 along with a credit medallion per FIG. 31. An aspect of this disclosure is storing the watermark image data of a variety of sources and broadcast channels on a local device. For example, the broadcasters provide watermark images for download to a member's TV, which stores the watermarks in a local memory location or on a flash drive. If the member's profile allows it, the watermarks are automatically superimposed over the corresponding non-watermarked broadcast channel content and the member is compensated as negotiated.

If the member declines display of the watermark, it is either disabled if provided to the member as a separate overlay in the content map or otherwise by the network, or by local removal 313.

Watermark Compensation Indicator

FIG. 31 is a drawing of a network watermark 738 with a visibility compensation indicator 736. The medallion preferably increments the total paid by the network to the member per minute or other increment of time 737. For example, the member's simulacrum negotiates with the simulacrum of the channel network that the member will accept 0.05 Maffles per minute of watermark visibility. The payout indicator 737 then increases by 0.05 per minute of display time.

Watermark and Banner Management Part II

Referring back to FIG. 26 at step 317, the content is consumed at 325 per the watermark display settings and the settings stored for that channel at 313.

At step 313 if the watermark and banner masking preferences for the channel have not been stored, the watermark or banner may be either hidden with an overlay, blurred or removed/reversed at step 327.

If overlay is chosen, at step 347 the member may use a cursor to locate and size a target that fits over the watermark or banner. For example, a suitable remote control with a cursor and pointing mechanism or game controller can be used to draw a rectangle or ellipse around an offending watermark or text banner.

At step 349 the content of the overlay is chosen, such as a solid color that can be chosen with a variety of methods such as an eyedropper pick from an on-screen color. Visual content from the member's library may be chosen to fill the target area, such as rotating family photos or videos, or the target area may be blurred or translucent.

At step 319 the mask settings are applied and stored for later recall when returning to the masked channel at step 313. At step 321 watermarks and banners that move may be tracked using image recognition, with the origins of manually specified masks adjusted to maintain target masking.

At step 323 masked text banners are transcribed into ASCII or other text using character recognition software. At step 341, the transcribed text stream may be sent to an another device for example a mobile phone, and alert settings that search for words and phrases may be set by the member such that when a text string matches an alert filter at step 343, the banner is for example exposed by temporarily removing the mask, or the text string is otherwise displayed or transmitted to the member, for example by text message or email at step 345.

If the watermark is chosen for removal at step 327, at step 329 a network is queried to see if a mask for the channel is available for download at step 333. Members may crowd share masks among themselves, or versions of masks preferably not comprising intellectual property, for example not comprising image data, are available on the Maffle network.

If the mask is not available for download, it is extracted at steps 331 and 335 and door number 14 per FIG. 27.

Watermark Extraction Part I

FIG. 27 is a flow chart of one embodiment of watermark extraction. At step 350 and door number 14 the process enters from FIG. 26. At step 352 the member may have a machine locate a watermark automatically or by manually specifying a target area. At step 354 for manual targeting, the member uses a controller such as a remote control or game controller to locate and size a target over a watermark stamp or text banner. At step 356, the content under the target area is removed per profile settings and a satisfying visual and audible reward is preferably provided.

Two ways of computationally removing watermarks are now described starting at step 358, which buffers the content into a sequence of images of individually computable frames, for example the last fifteen seconds of content which would comprise 360 frames at 24 frames per second.

Isometric View of a Stack of Watermarks

FIG. 30 is an isometric view of a stack of pixelated images bearing a channel watermark. The figure shows the target area surrounding a watermark that a member might specify with a cursor, but the entire frame can alternatively be used.

Watermark Extraction Part II

At step 351 in FIG. 27 an aspect of this disclosure is reversing an image watermark by extracting the mark based on the dynamic range of a parameter of pixels over time, described at steps 353 and 357 and door number 18. At step 359 the pixels for a given frame are extracted and denoised. At step 361 the luma or chroma value per pixel is determined. Over a period of time, for example 30 seconds, the range of values of each pixel is determined at step 363. If the dynamic range of a given pixel is wider than a predetermined threshold per step 365, then that pixel is discarded as background at step 367. If the dynamic range is lower than the threshold, the pixel is added to the primary watermark group of pixels at step 369. FIGS. 28 and 29 are two examples of determining which pixels constitute the watermark by the dynamic range of a pixel parameter such as luma.

Dynamic Range Histogram

FIG. 28 is a histogram of the dynamic range of a parameter of pixels in a frame. Each vertical bar represents the number of pixels that occur within a percentage range of the maximum dynamic range possible over the sample period of time. The predetermined dynamic range threshold estimated for typical watermarks is shown at 723.

For example, the vertical bar at the far right of the histogram represents pixels that ranged from a luma value of completely black to completely white over the sampling period, which is the maximum possible range. The vertical bar at the far left represents the number of pixels that varied by the smallest amount in luma over the sampling period, such luma values being relative and not necessarily close to full black or white.

Watermarks typically persist and are stationary throughout the duration of a program, and therefore have either a zero dynamic range if they are completely opaque, or a narrow range if translucent because the dynamic range is modestly effected by the luma of the background the watermark covers. At 722 the pixels representing the extracted watermark are located, computed by both their dynamic range and contiguousness on the image sequence. A feather threshold may be computed that define the perimeter and edges of the watermark. Such pixels have a slightly wider dynamic range than the watermark pixels per 724, and are furthermore adjacent to the watermark pixels.

Dynamic Range Pixel Elimination

FIG. 29 is a graph of pixel luma vs. time for eliminating pixels from a channel watermark extraction. Luma range can be used per this example, which is the weighted sum of linear or gamma-compressed RGB components determining the achromatic brightness of a pixel.

In this example, the luma value over time of three pixels are shown as curves. 730 is a background pixel eliminated per step 367 in FIG. 27; 729 is a feathered pixel at the edge or perimeter of the extracted watermark, and 728 is a pixel located within the main body of the watermark. The primary dynamic range of the watermark 731 may be predetermined or computational optimized with an iterative process. All pixels falling within the primary range 731 and adjacent or grouped in screen location (forming a graphic watermark), are included as the body of the watermark. Once the primary watermark has been determined, the edges of the watermark combined with the pixels located within the feathered pixel range 732 can be used to compute the feathered or aliased edges of the watermark comprising a tapering of translucency. The dynamic range inside the primary watermark defines the primary transparency level.

Dynamic range iterations from fine to coarse can search for strong correlations, maximizing the number of stable adjacent pixels.

Watermark Extraction Part III

Returning to FIG. 27, at step 371 the evaluation continues until the minimum sample time has been reached. At step 336 the primary group of pixels has been determined and a perimeter is extracted. At step 338 the pixels adjacent to the perimeter are grouped, and further refined by expanding the dynamic range of the primary group per step 340. At step 342, similar computations for chroma for example in RGB channels may be used to estimate colors within the watermark. The color information may then be used to reverse the colors of the covered background image as described later. Once the watermark location is determined, a similar approach can be taken for each of the RGB channels to extract chroma. If no range narrowing is found, then the stamp is achromatic.

At step 344 the extracted pixel information returns to step 355 and door number 20.

At step 360 an alternative way to extract the watermark begins by creating a stack of the sampled images. The opacity of each frame is set to 100 percent divided by the total number of frames. The frames are combined at step 362 such that changing pixels become increasingly transparent the longer the sample time, and the watermark becomes less transparent. Adding, subtracting, multiplying, and dividing are examples of possible frame blending modes. Mostly transparent pixels may be snapped to fully transparent at a threshold per step 364, and edges are feathered or aliases at step 366.

At step 368, alpha and luma (and optionally color channel) masks are generated and at step 370 uploaded to a network for crowd sharing. Once a stamp design has been identified, it can be stored and used as a matching template. As soon as a small number of pixels match a percentage portion of the stored template, the complete template is used for the program stamp.

At step 372 and door number 16 the process returns to FIG. 26 at 337 and door number 16.

Watermark and Banner Management Part IV

Referring back to FIG. 26 at step 339, the extracted or downloaded watermark masking information is used to remove the watermark using suitable masks, blending modes, interpolation, feathering, aliasing and blurring as required.

Maffle TV Part III

At step 228 and door number 11 in FIG. 21, the program continues to step 230 and door number 13 to FIG. 34.

Maffle Targets and Content Superimposition Part I

Embedded Targets

FIG. 34 is a flow chart of the detection and superimposition of desired content over targets or unwanted elements. At step 373 and door number 13 coming from FIG. 21, the superimposition module is accessed at step 375. At step 393 ad targets are pre-identified by the content producer or network/broadcaster preferably specified in the program's content map per FIG. 23, but alternatively by parallel broadcast or network data. At step 395, the content map may comprise camera tracking information (FIG. 23 at 697) such that camera movement can be reversed to hold a target stationary with respect to the objects in the scene. For real-time events, encoders on cameras can transmit movement information in parallel with picture, or the camera tracking can be computationally determined from an image buffer in real-time.

At step 397 members may manually specify where to place ads inside the scene, such ads still reacting appropriately to camera movement. At step 399 target field sizes, shapes and coordinates are buffered for combination with desired ad pool or other content.

Image Recognition Placement

At step 377 computational processes for image recognition comprising pattern matching or machine learning locate elements such as advertisements within each scene of the program (i.e., by a machine). Ads, brands and logos may further comprise fingerprints in a network-accessible data format that can be compared with areas within a frame of a program.

At step 379 the chronological location, size and coordinates of the element are queued for superimposition. At step 381 the corners and perimeters of the element are extracted, which define the warped, skewed or unaltered 2D area or 3D volume of the element. Alternatively, elements may be defined by the program content map, locally if previously analyzed by the superimposition module 375, supplied by crowd-programmed network information related to the content or image patterns, or information supplied by Maffle on a network.

At step 383 per the member's profile settings, unwanted and uncompensated ads, logos and brands are blurred preferably in a visually unobtrusive manner, for example with a camera-blur algorithm, and with edge sampling for feathering with adjacent pixels.

At step 385 computational camera tracking translates element locations to match camera movements.

Alternatively at step 409 a "scene trainer" application executing on the Maffle TV hardware or another device provides for the manual specification of ads, logos, brand markings and other elements using pointing technology such as remote controls, game controllers, touch screens, and eyeball gaze detectors. The locations of manually specified elements are recorded and stored in their chronological relationship to the program content, such that they may be shared with a crowd or otherwise stored by the member for future viewings of the same content.

Maffle Target Detector

At step 401 MAFFLE TARGETS are searched for computationally using image and pattern recognition and machine learning.

Maffle Targets

FIG. 39 shows embodiments of superimposition targets with varying patterns and color combinations. The patterns and geometry, shades and colors are optimized for image recognition by machines and tolerant of pixellation, distortion and blurring. Targets can appear in any media and environment, such as movies and video/TV content, video games in 2D or 3D, still images, on clothing, billboards, and printed media such as newspapers and magazines. The preceding list are examples and not intended to be limiting. Anywhere anything can be seen is a potential place for a Maffle target. Patterns on cloth subsequently made into clothing can form Maffle targets.

Another aspect of this disclosure are Maffle targets comprised of machine recognizable artworks such as paintings or sculpture, which are unique and therefore suitable as targets, graphic designs without limit, individual people who are machine recognizable, any unique photograph and any unique object or structure, including architectural structures. Another aspect of this disclosure is such objects are unique in design but occur multiple times. For example, a unique puppy dog statue replicated and positioned in many public places.

For example, a famous movie star registers with Maffle as a popular target, so whenever they appear on a member's device, ad pool content as defined in the member's profile is displayed to the member at the same time, and the movie star collects Maffles in return for providing the display surface to the advertiser. The member preferably sees via a Maffle medallion how much the movie star is paid for providing the targeting service, and further preferably is paid out of the total amount paid to the member by the ad pool advertiser. Furthermore, the movie star via their own profile settings controls exactly what is allowed to be displayed along with their image, and may further taylor what is displayed by the profile of the member, for example with members who have identified themselves as fans of the celebrity.

Another example is an attractive original painting hung on the wall of a movie set and appearing in various scenes. Non-Maffle members only see the painting, but members may see ad pool or other content along with a payment medallion and collect Maffles during the movie. The artist of the painting is additionally paid in Maffles for each member's use of the painting as a target.

An aspect of this disclosure are Maffle targets that do not necessarily comprise a contiguous pattern area, but may be comprised of various spots, regions or areas that in combination are machine recognizable as a target, and furthermore may be comprised of a field with a machine recognizable repeating pattern that covers an entire area. The spots, regions or areas may be widely separated and still form a machine recognizable Maffle target.

Another aspect of this disclosure is a single Maffle target comprised of two or more people defining an area. For example, at a football game, three people in the stands all visible within the single field of view of a camera define a triangular area from which a related Maffle target is computed. The people are identified as MAFFLE TARGETEERS. Each is wearing a Maffle target on their person, or alternatively or in combination, transmitting their location and targeteer qualifications by a mobile network preferably in the form of GPS coordinates and Maffle member credentials, from which payment for superimposition are negotiated and determined. Targeteers will be described in further detail later for FIGS. 35 and 36.

Another aspect of this disclosure is a virtual billboard comprising geospatial coordinates forming a virtual surface area or three dimensional volume upon or within which content is superimposed. For example, three devices may be placed at three corners of one wall of a building each transmitting the GPS coordinates of their location. A member's device in proximity to the building is provided the coordinate data by short range radio such as bluetooth, or by network such as wi-fi or cellular. The member via a superimposition device such as a mobile camera, heads-up glasses or display then sees ad pool content superimposed over the defined area and collects Maffles. The owner of the building furthermore preferably collects Maffles for the use of the building surface.

Another aspect of this disclosure is such virtual billboards, surface areas and volumes to be stored on a network as coordinate data. For example, the owner of the building in the example above, registers the building wall surface with Maffle by measuring the geospatial coordinates of three corners of the wall using a GPS or other surveying device.

Targets can be on printed media such as newspapers and magazines and "read" with a mobile device, heads-up transparent display or with VR glasses. The device and software superimpose ads and images and pay the member and publisher, as described previously for FIGS. 6 and 11. Movies in a theater watched with 3D or VR glasses can superimpose Maffle ads uniquely per member settings.

Another aspect of this disclosure are Maffle targets fingerprinted with unique patterns for identification or redirection, such that the target area is superimposed with content when viewed by a Maffle-aware hardware device such as a television. For example, a Maffle targeteer in the crowd at a football game, instead of wearing a generic Maffle T-shirt, which may not always be technologically relatable to the member, wears a T-shirt printed with a target comprising a unique extractable code such that the code connects the target to the member. Preferably a different member watching the game on TV is shown content comprising being related to their relationship with the member wearing the target.

At 794 an example target is shown with red, green and blue areas of color within a graphic design. Typical camera sensors comprise RGB channel components so targets preferably comprise colors chosen to maximize differentiation between channels.

At 795 an alternative color combination uses three colors each a blend of two of the RGB color channels, in this case yellow, cyan and magenta.

At 798 another design is shown incorporating both individual RGB channels and blended channels forming a unique pattern. The background fields of the circular areas of RGB colors comprise the combination of the two channels not within the color circle, and are similar in area. For example the cyan area behind the red circle is comprised of equal parts of the blue and green channels. At 799 a similar pattern fits within a circle.

At 796 the color areas of 794 are in the form of closely spaced lines, each with a different angular orientation. The lines further facilitate machine recognition and may also be combined with optical grids placed before an image sensor generating moire patterns, such that the patterns can be detected at a smaller size as described later with FIG. 37. At 797 radial grids or closely spaced circles or circular arcs preferably in different colors may alternatively be utilized.

Wearable And Human Targets

FIG. 36 shows two embodiments of Maffle targets used for element superimposition on a person. Celebrities on television and other media, in this figure example a golfer, earn income by wearing corporate brand names and logos—a shameful embarrassment for the celebrity, decorated up like a carnival clown. Slick men in suits surgically place the logos for maximum visibility on the doe-eyed young celebrity like florescent tails pinned all over a hapless donkey. The celebrity is then wound-up and released, strutting around on camera like a paint-balled dodo bird. The celebrity signs a contract for a fixed income over time regardless of their subsequent fame or media exposure. The sponsoring corporation sadly risks the golfer developing a nasty pull-hook, subsequent marital problems and attendant negative publicity.

An aspect of this disclosure now described provides for a generic brand or content display location on a person by which any logo, brand or content may be superimposed or displayed for which the person used for display is compensated for each use of the display location by individual viewers.

Another aspect of this disclosure is providing for the person who is wearing the display location to set filters and limitations on what is displayed to MAFFLE SUPERIMPOSERS. A superimposer defined as anyone who sees ad pool or other content superimposed over a Maffle target anywhere within the Maffle ecosystem on any device.

For example, the golfer or the golfer's management, having a Maffle profile, sets preferences in their profile such that only a basket of certain brands can display to superimposers, such that the golfer and superimposer both collect higher payments from the certain brands. Superimposers, having their own profile and settings, may or may not have such brands in their ad pool, in which case member content may be displayed over the target or the target is ignored.

Another aspect of this disclosure is the celebrity setting their profile such that any combination of ad pool or content is seen by superimposers in any combination of frequency or percentages. For example, the golfer is sponsored by Acme Golf and Funni Putters, and also has a favorite charity. The golfer sets their profile so that the Acme Golf brand is seen by a superimposer 70 percent of the time the golfer's target is visible to the superimposer (assuming Acme Golf is accepted in the superimposer's ad pool), Funni Putters is visible 22 percent of the time, and the charity image, brand or donation information is seen by the superimposer 8 percent of the time.

A further aspect of this disclosure is using any existing brand or logo printed on the clothing or body of a celebrity being machine identified, its coordinates, warp, skew and plane computed, and such area used as a Maffle target for member ad pool or content superimposition. The identification of a brand or logo comprises fingerprinting of the graphic such that the graphic itself is not stored or accessed, or crowd sharing of brand and logo identification information.

Another aspect of this disclosure is the consumer-directed, machine storage of brand and logo design, such that previously flagged brands and logos are automatically machine identified and evaluated for superimposition, removal or blurring on a device controlled by the consumer.

Another aspect of this disclosure is a combination of clothing worn on a person comprising a Maffle target. For example, the Maffle celebrity golfer always wears a bright yellow hat, orange shoes and an orange collar. The combination of colors and positions on the human figure are machine recognizable and form altogether a Maffle target. One advantage of the target comprising a human figure is that the figure can be machine recognized when very small on a display screen. For example, the golfer can be identified and superimposed on or near when far down the fairway during a televised golf tournament.

Another aspect of this disclosure is human gait as a Maffle target. The gait of each human is unique and machine recognizable. Sample points from a human's body in motion are calculated over time for arms, legs, hands, feet, head and torso and compared against data for known humans. The combination of movement of the various points on the body as compared against each other over time vary between individuals such that a celebrity may be identified from a distance based only on their gait.

Another aspect of this disclosure is facial recognition as a Maffle target, comprising identifying a face using a machine, identifying the extent of the individual's body using a machine, and calculating a superimposition target area or volume on a location on or near the body. For example, the face of a celebrity golfer is identified by a machine and the location of the front of their hat is calculated. The coordinates, area, skew and warp of the hat area are calculated and used to display the Funni Putter logo on a member's television during a golf tournament along with a medallion and payment information.

Another aspect of this disclosure is combining a Maffle target with individual machine recognition such that the target is general in configuration and related to an individual by a machine-recognized aspect of the individual such as a face or a gait.

As discussed in FIG. 39, any kind of unique artwork, image or graphic is suitable as a Maffle target, so a celebrity may choose beautiful and stylish decoration for their persons instead of garish and offensive brands and logos while earning equivalent sponsorship payments.

Wearable Target Examples

FIG. 36 are two embodiments of superimposition targets on a person. At 785 the Maffle target at 794 in FIG. 39 is embroidered or printed at the left chest location.

An aspect of this disclosure is when an ad is chosen for an ad pool with a matching engine, the brand or logo design for the related company may be included in the ad pool for use throughout the Maffle ecosystem in locations appropriate for brands and logos instead of intact ads.

In this example, a member watching this golfer on television sees a brand or logo from their ad pool in place of the target 785, along with a payment medallion. At 784, the six-color target at 798 in FIG. 39 is shown on the front of the ball cap. The watching member likewise sees a brand or logo from their ad pool in place of the target.

Alternatively, the member can see anything from their ad pool or content library or intermission content per 266 in FIG. 21. For example, the member sees the French translation appear on the front of the golfer's hat of everything the golfer says in English because the member is running a language training application on their Maffle TV. Or perhaps the member is holding a video call with his wife, who's face appears on the hat during the conversation, so the member doesn't miss any exciting golf action. When the camera angle switches to a different golfer whom the member has muted in his profile because of the golfer's lifestyle choices and inelegant swing, the member's wife's face appears superimposed over the face of the inelegant golfer, greatly improving the golfer's looks but not his swing.

Another Example Target Design

The example target in FIG. 35 is comprised of colored circles at the vertices of a rectangle with the dimensions 776 high, by the sum of 774 and 775 wide, and at the mid point of a long edge, with complimentary colors arranged to maximize the distance between complimentary pairs per 774 and 775. Alternatively, the dimensions are equal, forming a square pattern, or the triangles are equilateral, the pattern shape and dimensions not intended to be limiting.

At 770 the red circle is on a vertex of a triangle within the rectangle along with the other primary channel colors, green and blue in order to maximize their separation. A machine looking for a triangular pattern of RGB colors therefore will detect the pattern at the smallest pixel size possible. Another triangle within the rectangle comprises circles on the triangle's vertices with the intermediate colors cyan, magenta and yellow made up of the two-color blends of the primary colors. A machine having found the RGB triangle may then verify the Maffle target by confirming the overlapping CMY triangle.

A further addition to the target to aid machine differentiation are triangular grid areas 771 and 772 with line directions at right angles. Such finely spaced grids can be distinguished by moire interference patterns at sizes smaller than the pixel resolution of the recording camera. The moire patterns may be a consequence of the image sensor grid design, or created optically with a pre-sensor grid as described later for FIG. 37. The grid 771 may additionally form a unique code by varying the spacing and width of the lines, and in a unique combination with the code embedded in the second area 772, so that the individual target and hence celebrity or member may be machine identified.

In the example at 777 the superimposed image as seen by a Maffle member on a television or other device shows the located target on the golfer's back with an ad from the member's ad pool positioned to fit over the target area. At 778 a Maffle medallion is displayed showing that the member has collected 0.1 Maffles by being exposed to the ad, and that clicking the ad or medallion to see more information about Moe's Diner will result in an additional 1.25 Maffles. Some examples of other possible information that might be displayed are Maffle's per minute of exposure with a dynamically updated total, and how much the golfer wearing the target is collecting.

Moire Pattern Detection

FIG. 37 is a diagram of an optical grid 789 and garment grid 788 pair used for creating a detectable moire pattern by a distant camera 790. At 788 a grid of lines is shown printed on the back of a golfer. The grid is shown as a single rectangle for illustration purposes but is preferably comprised within a Maffle target design as described previously. The lines may vary in width and spacing and may be curves or circular arcs. Any pattern that can create a moire pattern is contemplated by this disclosure.

At 789 a coordinating optical grid is placed before the image sensor of a camera 790, such that when the camera records an image of the grid on the golfer 788, a moire pattern is created by the optical interference between grids 788 and 789 causing a downward heterodyning of the spacing of grid 788 such that the grid can be detected at distances greater than the grid can be detected without the optical grid 789.

One skilled in the art knows that a behavior of digital cameras for example with CCD detectors, is an unintended moire effect created when photographing unresolved grids and patterns. An aspect of this disclosure is the purposeful use of the inherent generation of moire patterns by digital cameras to identify a distant target.

For example a grid pattern for a target is designed to intentionally create a machine recognizable moire pattern when photographed by a certain model of camera without the need for optical grid 789. One skilled in the art knows that camera manufacturers can remove anti-moire technology in order to take advantage of the moire effect as described.

Another aspect of this disclosure is a camera comprising a beam splitter and an image detector designed to maximize moire effects. Another aspect of this disclosure are two cameras aimed in synchronization such that one of the cameras detects a moire pattern and coordinates of the pattern are computationally associated with the image from the other camera. For example, a moire-optimized camera searches the crowd for targets at a football game. When a target is acquired, the coordinates of the target as measured by the camera and targeteer information are computationally combined with the image of the non-moire camera such that the target area may be identified and superimposed upon. The coordinated cameras can have differing focal lengths.

In FIG. 37, optical grid 789 is depicted in front of camera 790 but is preferably located inside the camera 790 and between the camera lens and the image detector. No limitation is implied about the configuration of the optical grid 789, camera lens and image detector. Furthermore, the optical grid 789 may be in the form of a transparent digital display screen such that the grid design may be electronically varied.

An aspect of this disclosure is a camera comprising a transparent grid screen with programmable patterns in front of an image sensor. The transparent grid screen can display any pattern, for example radial grids, lines, curves using pixelated display technology known to one skilled in the art for example using LCD technology. For example, the grid pattern may switch between grid scales and patterns many times per second while a machine evaluates the resultant image until it recognizes a moire pattern or any distinguishing optical effect caused by the combination of the distant pattern and the pattern on the digital display. The transparent grid pattern may further comprise colors. No limitation is implied about what is displayed on the transparent grid screen or the design of the detectable coordinating target.

Additional Applications

It is contemplated and another aspect of this disclosure that the described moire pattern detection can be applied for any application for example, the long distance recognition of labels on products, vehicles or other signage.

Moire Grid Spacing Variation

FIG. 38 is a diagram of grid line spacing varying over the width of a grid pattern to create a unique moire pattern. The abscissa of the graph is the X distance of a grid line from the origin of the pattern, and the ordinate is the spacing between adjacent grid lines. When a grid of evenly spaced elements of suitable scale are used to create a combined moire effect, the locations of the troughs of the curve where the lines are spaced the most closely will appear as optical bars of higher density then the peaks where the lines are spaced more widely.

Referring now to FIG. 11 at 555 as previously described, the circular arcs are varied in radial displacement and angular direction to form a pattern visible even to the naked eye. A machine can recognize and extract the unique pattern and match it with identifying information so that the location may be used as specified by the publisher or displaying entity of the pattern. 555 is a radial example similar to the linear line pattern shown at 791.

Target in Virtual Space

FIG. 9 is a drawing of a Maffle target appearing in a virtual environment in either 2D or 3D. The author of the virtual environment places targets anywhere within the virtual space, and computational processes extract the target coordinates during the exploration of the space. The target may be either a 2D area or a 3D volume. Preferably, the target coordinates, for example four corners in XYZ space, are stored with the data defining the environment such that they may be accessed directly by the computational process controlling the Maffle superimpositions without requiring an image recognition step.

At 544 a Maffle target is shown placed on a virtual building along with a payment medallion 545. The medallion shows the payments accruing to the exploring member, payment for clicking into the ad, a sale tag and a bonus coin stack. The publisher of the environment, for example a game, is preferably paid Maffles as a share of ad payments chronologically made to the member similar to as described in FIG. 14, Purchasing via Ad Consumption.

For example, a virtual department store comprised of hundreds of Maffle targets as 3D prismatic volumes and 2D wall posters and signage is explored by a member using a device. One skilled in the art will recognize the environment can be constructed using available 3D game-authoring software environments and suitable computer hardware. The store is automatically populated upon visitation by the member with products the member desires as determined by their profile and ads from their ad pool. 3D models of desired products are scaled and fit within the store's 3D target volumes. An aspect of this disclosure is the ad pool comprising 2D and 3D models of objects and products that may be superimposed onto or within Maffle targets.

Billboard Targets

FIG. 10 is a drawing of a billboard with a Maffle target. See FIG. 6, Exploring Ads, described previously for additional detailed description about billboard targets.

At 550 a medallion is displayed for example on a heads-up windshield display as seen from inside a car, and while an ad pool ad is superimposed on the billboard target.

Printed Targets

FIG. 11 is a printed newspaper bearing Maffle targets 555 and 554. See FIG. 6, Exploring Ads, described previously for additional detailed description about printed targets. Also see the description for FIG. 18, Digital News Site, for a similar and applicable description of ad payments made to a publisher and auto subscription by a member.

For example, a member uses a software application on heads-up glasses while reading a printed newspaper. The application detects Maffle targets and superimposes images or ads that pay the member and publisher simultaneously until the publisher has been fully compensated per an automatically negotiated limit, after which the member collects all subsequent payments.

Maffle Targets and Content Superimposition Part II

Returning now to FIG. 34, at step 403 frames are searched by machine for Maffle target color and pattern combinations.

At step 405 moire patterns per FIGS. 37 and 38 are identified by machine. Maffle targets may further comprise polarized materials, such that polarization filters on a camera will isolate the targets aiding machine identification. At step 407 and after a target has been detected and analyzed, a 2D ad field or area or 3D volume is determined to fit over or within the target.

At step 408 the target host is determined, for example by the facial recognition or gait of a celebrity; a target with a unique identification pattern, code or number; a unique target such as a work of art; a targeteer uploading geospatial coordinates that fall inside a computed camera field-of-view; a building or location with uploaded geospatial coordinates in a field of view; or by identification of the program material, such examples not intended to be limiting.

Maffle Real-Time Analysis

At step 411 computers at a Maffle-controlled location complement the processing power of devices controlled by Maffle members, preferably in real-time and in parallel to the activity of a member. Real-time broadcast signals on various channels via over-the-air, cable or network are simultaneously analyzed by computational processes with optional human supervision for relevant elements, such as Maffle targets, as described previously in conjunction with generating a content map in FIG. 22.

At step 413 target areas and volumes identified at step 411 are streamed over a network in parallel to the broadcast to member devices.

Final Superimposition

At step 387 ad pool or other content as determined by the member's profile is superimposed over the determined areas or inside volumes, along with feathering and blending of edges to match image backgrounds.

At step 389 Maffles accumulate based on the duration and visibility of ads and bank to the member periodically with a satisfying display and sound.

At step 391 and door number 15 the process returns to FIG. 21 at step 232 and door number 15.

Maffle TV Part IV

Figure 40:
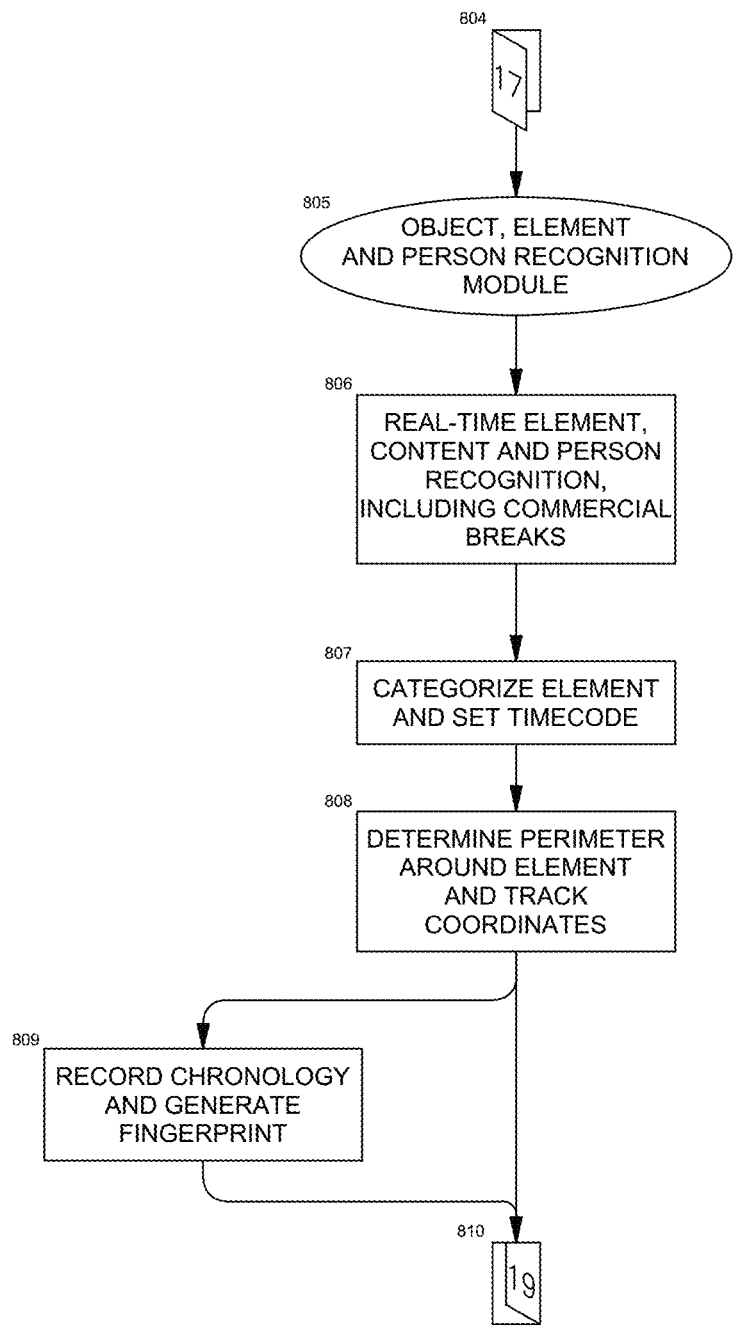
FIG. 40 is a flow chart of locating objects, elements and persons in a program stream.

At step 234 and door number 17, the program continues to FIG. 40.

Object, Element and Person Recognition

FIG. 40 is a flow chart of locating objects, elements and persons in a program stream. At step 804 and door number 17 coming from FIG. 21, the module is accessed at step 805.

At step 806 computational processes for image recognition comprising pattern matching, neural networks and machine learning detect, evaluate and measure objects, people and elements. The hardware and software performing the computational processes is preferably comprised within the Maffle TV, but may be on a separate device or on a network, for example at a Maffle-controlled location such as a data center. The computational methods for recognizing and locating elements is not intended to be limiting and includes any form of image recognition and AI.

At step 807 a recognized element is categorized per the description of content maps in FIG. 23 and its timecode recorded. At step 808 a perimeter is determined around the element as a 2D area or a 3D volume and the perimeter is tracked over time as the element moves within a scene.

At step 809 preferably related to an action taken by a member, a fingerprint is generated for the element comprising a unique chronological pattern related to the content to increase the computational efficiency of recognizing the element wherever it later occurs.

At step 810 and door number 19 the program returns to FIG. 21 at step 236 and door number 19.

Maffle TV Part V

At step 238 in FIG. 21 the program stream now exits the content mapping ecosystem and offensive elements as determined by the member's element actions settings 284 are blocked visually and aurally by blurring, masking, removing and muting.

At step 240 when elements the member likes and desires per 284 are pending, the member is alerted by a visual cue or sound either on the TV or another device per the member preferences. Elements the member likes that are present in the content are emphasized graphically or sonically per profile settings.

At step 242 unwanted ads, brands and logos are replaced with ad pool ads, brands and logos preferably buffered 260, or intermission content 266 per the member profile and intermission settings 286. Payments collected as displayed with Maffle medallions accrue to the member's balance at 274.

At step 244 intermissions (commercial breaks) are specified within the channel content map 256, or determined by Maffle or the manual input one or more other members and downloaded to the Maffle TV over a network in parallel with the channel content or as embedded data within the channel content.

Basic Commercial Break Detector

An aspect of this disclosure is the setting of preferences by which a TV watcher determines what should happen during commercial breaks, and automatically modifying the picture and audio of the TV during the commercial breaks in accordance with the preferences.

One skilled in the art will recognize upon reading this disclosure that this basic function can be implemented as a stand-alone feature of a Maffle TV even without a Maffle member network or other aspects of Maffle as described in this disclosure.

The Maffle TV comprises a stream of program channels from an over-the-air broadcast, cable service or internet network, an alternative content source comprising video and audio, and hardware and software to automatically modify the video or audio displayed to a viewer during a commercial break. The commercial break on a channel is remotely located by Maffle and transmitted to the TV by a network; by the remote action of one or more viewers of the channel and transmitted to the local TV by a network, or by computational processes executing on the local TV.

For example, a viewer obtains a Maffle TV set-top box which has an HDMI input and output. They connect the HDMI output from their cable box to the HDMI input on the Maffle TV box. They connect the Maffle TV HDMI output to the input on the TV. The Maffle TV box connects to a wi-fi network and with the mobile phone of the viewer.

The viewer uses an application running on their phone to set preferences that specify that during commercial breaks family videos on the phone will play on the TV display and songs from the viewer's music library on the phone will play on the TV speakers, which happens automatically without further intervention.

The viewer alternatively uses the application running on their phone to manually mute the TV during a commercial break, and unmute the TV when the commercial break is over. The timing of these two events is transmitted to Maffle over the wi-fi network, Maffle combines and averages the timing of the actions of many viewers, and downloads the timing to the Maffle TV's of all the viewers, such that the devices of all viewers may use commercial break timing information in synchronization.

Mob Mute Part I

FIG. 32 is a flow chart of mobs (a group comprising more than one member) participating in the network timing of commercial breaks or other AV events in a channel, presentation or AV output. At step 742 the process begins and at step 743 user inputs are made by a member using an interface such as a remote control (see remote control 671 in FIG. 20), game controller or computer application with physical contact, physiological measurement, body gesture or voice indication. Any way of indicating the start and end of a section of programming or defining an AV event such as specifying a target is contemplated and the previous list is not intended to be limiting.

Similar steps as described in this section further apply to the generation or modification of content maps as described previously and per FIG. 22. Although this section describes a mute function as an example, no limitation is implied about what constitutes an AV event. Furthermore, it is not a requirement for the user inputs of a plurality of members to be made at or near the same time, since the user inputs are always related to the chronology of the AV content, not when the AV content is presented.

At step 744 the member's profile determines their participation in the network timing and mob functions, and a scheme for how to process various types of AV events. At step 745 the member watches AV content on a channel presented on a hardware device. The presentation or AV output is determined by a device controller that determines the final output of audio transducers and/or a display device. One example of a device controller is a Maffle TV described previously and in FIGS. 19, 20 and 21, connected to speakers and a display. At step 746 if the member is participating in the mob and indicates the beginning of a commercial break at step 747 and per 743, that timing, channel, AV event, and AV content information (response data) is uploaded to Maffle on a network at step 753. The device controller and interface preferably form a system in communication with Maffle. Alternatively, the interface communicates separately but in parallel with the device controller for example via an app on a mobile device.

At step 754 the timing information and response data uploaded to Maffle from all the members participating on a given channel, presentation or AV output at the same point in time of the AV content are combined and evaluated by a computing system to determine a beginning or end and define a detected event indicator. The detected event indicator comprises a chronological relationship to the AV content and an AV event. An alternative embodiment is for the computing system to be in the form of a decentralized, peer-to-peer network comprising using the member's processors.

Mute/Unmute Response Curve

FIG. 33 is a graph of a mob mute response curve 764 that is the sum of all responses (response data) of a given type over a period of time. An algorithm, trained machine, or neural network determines the probability of the incoming network mute or unmute timings representing an actual commercial break, considering that certain timings will have been uploaded by members in error. The algorithm comprises a rate-of-change portion, a percent participation portion, and a reliable-member weighting portion.

Certain members will be more reliable or react more quickly than others per 765 and 757 in FIG. 32, and the algorithm weighs the responses from reliable members more highly than a random member.

Any member's performance can be measured once a timing has been declared by comparing their response to the total response at step 755 in FIG. 32. This measurement can be stored with a member's profile 744 in FIG. 32 and be used to determine their weighting for future mutes or for rewards and incentives to improve and participate per step 756 in FIG. 32.

At 766 the algorithm threshold is reached and a mute or unmute is declared as a detected event indicator, and downloaded to all receiving member's devices on the network per step 758 in FIG. 32.

Mob Mute Part II

In FIG. 32 at step 751 the mob mute and unmute timing information (detected event indicator) is obtained by the device controller from a network for the current channel, presentation or AV output. At step 748 the channel is muted or unmuted by the direct action of the member per step 746 if they are not participating in the mob; automatically by the downloaded mute timing or detected event indicator per step 751, or automatically if a stored fingerprint of the content of a commercial break is detected per step 752. Alternatively for other AV event types, the device controller is triggered by the detected event indicator to modify the presentation or AV output in accordance with the predetermined scheme retrieved at step 744. For example, the face of a celebrity for which the member has no fondness is predetermined to be replaced by the face of the member's cat.

At step 749 the fingerprint of the commercial break content is stored for reference by step 752 for determining future commercial breaks that begin with the same content.

At step 750 a muted channel stands by for unmute.

Maffle TV Part VI

At step 246 in FIG. 21 elements inside the program are overlaid with ad pool ads, brands and logos per element action settings 284 and payments accrue to the member balance at 274.

At 248 if Maffle-registered, the content producer is paid from the member's balance 274 or via ad consumption per the description for FIG. 14 (Purchasing via Ad Consumption). At step 252 the content producer is preferably paid by increments of time such as by the second, minute or hour, which rewards good content, and reduces payments for bad content.

At step 250 the results are displayed to the member.

Maffle Radio

FIG. 41 is a timeline of Maffle radio replacing ads and content per a member profile. Audio content is listened to by the member using a computational device running a dedicated software application or browser, such as a computer or mobile phone, or a hardware device such as a portable radio, car radio, or television.

An audio PROGRAM STREAM is obtained via a network, over-the-air terrestrially or from Earth orbit, or from a locally stored location such as flash memory. The program stream is shown as the horizontal timeline at the bottom of FIG. 41.

A MAFFLE STREAM comprising ad pool audio content and member content such as songs in the member's song library is concurrently available to the program stream.

At the top of the figure a content map for all audio elements is preferably obtained in parallel to the content from a network, as embedded digital information in the content stream or superimposed on the content stream for example at an ultrasonic, inaudible frequency. A Maffle-friendly broadcast channel preferably generates and provides a content map for their broadcast content.

As time elapses, SONG 1 and SONG 2 play to the member. At 814 a commercial break is delineated in the content map or computationally detected by a machine using a match to a previously stored fingerprint, algorithmic processes, machine learning, pattern recognition, neural networks or other artificial intelligence. Alternatively, the commercial break is collectively delineated by a mob as described in FIG. 32 and the timing downloaded to the member's device automatically as part of the content map or Maffle stream. Also alternatively, Maffle remotely analyzes the program stream in parallel and downloads commercial break timing information as previously described in FIGS. 21 and 34.

Once a commercial break has been detected, a fingerprint for the beginning of the ad content is extracted, comprising a unique chronological combination of data related to the audio waveform, and made available for future detection of a commercial break.

At 814 an audio ad from the member's ad pool plays instead of the program stream ad. An aspect of this disclosure is a SONIC MEDALLION using beeps, bells, tones or other sounds or noises, to indicate to the member that they have collected Maffles and preferably how many. For example, two bells means 0.5 Maffles were paid. Alternatively, in the radio application or on another device with a display, a medallion is displayed showing the payment amounts.

When the commercial break ends, the audio output returns to the program stream at SONG 3 automatically.

Using a software application input, hardware control, voice control, gesture or body movement, detected brainwave indicating dislike, eye movement or determination by the member's simulacrum, a member may indicate that a song or artist is not to their liking, which is stored in their profile and made available to the radio playback device. The member may further identify artists and songs they like to increase their future playback frequency.

At 815 a disliked song in the member's profile begins to play on a program stream without a content map. The song is computationally recognized using a previously stored fingerprint, and the audio output is automatically crossfaded at 816 from the program stream to the maffle content stream, in this example playing a song owned by the member in their personal song library. If the program stream had included a content map, the song would have been replaced before ever playing to the member because the content map comprises the song title and when the song starts and stops.

When the disliked song ends, the audio output automatically returns to the program stream to play SONG 5.

Maffle-friendly broadcasters are preferably paid chronologically via ad consumption as previously described in FIG. 14 and elsewhere in this disclosure. Members may also listen to radio entirely ad-free while paying broadcasters from their existing Maffle balance. In this manner, for example, a member might collect Maffles while browsing the internet or watching TV, and spend them in order to listen to ad-free radio.

Automatic Performance Royalty Payments

As described in detail in FIG. 23, the content map may comprise the publishing details of a song played by a broadcaster, including the artist, the composer, the song publisher and the owner of the master recording, each with a related Maffle membership ID and licensing and royalty subdivisions and terms. An aspect of this disclosure is such intellectual property information being evaluated at the time an artistic work is broadcast, such that chronological payments for such broadcast is automatically divided in accordance with a content map and paid to the relevant parties automatically.

This aspect of the disclosure is most beneficial to less prominent artists and performers because every single performance of their work results in a direct payment. Furthermore, since the performance payment is triggered by a member and paid through a Maffle account, swindling internet radio stations cannot rip-off starving artists as is currently commonplace.

For example, a Maffle radio internet site allows only Maffle members and Maffle-registered songs to play. The site publisher streams songs along with content maps, which cannot play without compensation to the song IP owners.

Stream-to-Own Songs

An aspect of this disclosure is a member indicating a song they wish to own, comprising paying a higher percentage of ad pool exposure payments chronologically related to each broadcast of the song until a purchase price has been reached, after which a perpetual license for the song is acquired by the member.

Song Content Map Elements

As described previously in FIG. 23, the content map for a song may comprise the musical notes, instruments, lyrics, and related data or data files such as a music video for the song. The playback application or device may include the ability to display such information to the member, for example for an extra cost. For example, a member listening to a radio station on their television may pay extra Maffles to see the guitar tablature of the song on the screen as the song plays, along with a video track included in the content map of only the guitarist's fingers.

What is claimed is:

1. A method of altering AV (audio and/or video) output, comprising:
providing an AV ad network that includes member accounts for content viewing members and target accounts for target persons appearing in AV content items;
providing a private device controller connectable to the AV ad network and configured to associate with a hardware device adapted to output AV content items;
selecting a private AV ad for a content viewing member from a private AV ad collection and providing the private AV ad to the device controller, the private AV ad having a presentation value;
identifying within the AV content item an optical target associated with a detected target person;
presenting a selected AV content item with the private AV ad on the hardware device to the content viewing member, wherein the private AV ad is superimposed on or with the detected target person, and wherein presenting the private AV ad causes a payment to be transferred to a target account of the detected target person and a member account of the content viewing member based on the presentation value.

2. The method of claim 1, wherein the AV ad network includes a content map that comprises the chronological location of intellectual property (IP) within the AV content item as specified by a public AV content item producer, an IP financial recipient, and the presentation value, and wherein presenting the IP causes a proportion of the presentation value to be transferred to a credit account controlled by the IP financial recipient.

3. The method of claim 2, wherein the content map comprises chronologically variable coordinates defining the envelope, and chronologically variable image data defining an alpha mask;
superimposing the private AV content item on a foreground layer such that the origin, orientation and size of the private AV content item match the envelope;
and subtracting the alpha mask from the private AV content item, such that the private AV content item appears embedded within the public AV content item.

4. The method of claim 2, wherein the financial recipient is related to the public AV content item.

5. The method of claim 2, further comprising a private viewer credit account, wherein the financial recipient is the private viewer credit account.

6. The method of claim 2, wherein the content map further comprises encrypted-IP with a financial recipient and a presentation cost, wherein transferring the encrypted-IP presentation cost to a credit account controlled by the financial recipient comprises decrypting the encrypted IP.

7. The method of claim 2, wherein the content map comprises IP financial ownership percentages between multiple financial recipients, wherein the presentation value is transferred to the credit accounts controlled by each recipient in accordance with their percentage ownership of the IP.

8. The method of claim 1, further comprising the step of receiving a content map related to the AV content item, wherein the content map specifies an obfuscation area and an image modification process, and the AV content item is altered within an obfuscation area by applying the image modification process to a matching area of the AV content item.

9. The method of claim 8, wherein transferring a payment to the private member credit account stops the image modification process.

10. The method of claim 1, further comprising the step of receiving a content map related to the AV content item, wherein the content map specifies image modification data, wherein transferring a payment to the member account applies the image modification to the AV content item.

11. The method of claim 1, further comprising the step of receiving a content map related to the AV content item, wherein the content map comprises a chronological location of structured compensation, a compensation recipient, and a compensation value, and wherein presenting the structured compensation causes a proportion of the compensation value to be transferred to a credit account controlled by the compensation recipient, wherein the proportion is determined by the percentage presented of the total compensation value.

12. The method of claim 1, wherein the private AV ad is a logo, trademark or brand name.

13. The method of claim 1, wherein the optical target is on an object near the detected target person or is on an object being held or attached to the detected target person.

14. The method of claim 13, wherein the optical target is on headgear, clothing or equipment worn by the detected target person.

15. The method of claim 13, wherein the optical target is in the same field of view as the detected target person.

16. The method of claim 13, wherein the celebrity can whitelist and blacklist ads, whereas whitelisted ads are favored by a private AV ad filter, and blacklisted ads are eliminated by the private AV ad filter.

17. A system for of altering AV (audio and/or video) output, comprising:
- a set of member accounts for content viewing members;
- a set of target accounts for target persons appearing in the AV output;
- a private device controller connectable to an AV ad network and configured to display an AV content item on a hardware device for an associated content viewing member;
- a matching engine for selecting a private AV ad for the associated content viewing member from an ad pool and providing the private AV ad to the device controller, the private AV ad having a presentation value;
- a system for detecting within the AV content item an optical target associated with a detected target person;
- a system for superimposing the private AV ad on or with the detected target person within the AV content item to generate an altered AV content item;
- a system for displaying the altered AV content item on the hardware device; and
- a payment system that causes a payment to be transferred to a target account of the detected target person and to a member account of the associated content viewing member based on the presentation value in response to the private AV ad being displayed.

18. The system of claim 17, wherein the system for displaying the altered AV content item further displays payment information.

19. The system of claim 17, wherein the target account for each target person includes a profile that allows each target person to control ad content appearing therewith.

20. The system of claim 17, wherein the optical target comprises a predefined visual target that includes at least one of a logo, a color pattern, a graphic design, and an image.

21. The system of claim 17, wherein the system for detecting within the AV content item the optical target associated with the detected target person includes determining an identity of the detected target person based on at least one of: a human gait, a facial recognition and a clothing combination.

22. The method of claim 1, wherein the optical target comprises a predefined visual target that includes at least one of a color pattern, a graphic design, and an image.

* * * * *